(12) United States Patent
Yun et al.

(10) Patent No.: US 6,696,011 B2
(45) Date of Patent: Feb. 24, 2004

(54) EXTRUDING AND BLOW-MOLDING METHOD FOR FORMING A PLASTIC PRODUCT

(75) Inventors: Sun Young Yun, 36-2, Chongdam-dong, Kangnam-ku, 135-100 Seoul (KR); Jae Wook Lee, Seoul (KR)

(73) Assignee: Sun Young Yun, Seoul (KR)

( * ) Notice: Subject to any disclaimer, the term of this patent is extended or adjusted under 35 U.S.C. 154(b) by 0 days.

(21) Appl. No.: 09/897,353

(22) Filed: Jul. 2, 2001

(65) Prior Publication Data

US 2003/0003252 A1 Jan. 2, 2003

(51) Int. Cl.$^7$ .............................................. B29C 49/04
(52) U.S. Cl. ....................... 264/564; 264/515; 264/154; 264/163; 264/173.16
(58) Field of Search ................................ 264/564, 163, 264/154, 155, 273, 171.1, 173.16, 173.17, 279, 515; 425/531, 532

(56) References Cited

U.S. PATENT DOCUMENTS

| | | | | |
|---|---|---|---|---|
| 3,504,396 A | * | 4/1970 | Button et al. ................ 425/534 |
| 3,844,698 A | * | 10/1974 | Zanca ......................... 425/155 |
| 4,063,828 A | * | 12/1977 | Mukai et al. .................. 401/96 |
| 4,393,023 A | * | 7/1983 | Schurman .................... 264/150 |
| 4,560,340 A | * | 12/1985 | Younkin et al. ............. 425/526 |
| 4,839,131 A | * | 6/1989 | Cloeren ................. 264/173.12 |
| 5,209,880 A | * | 5/1993 | Miwa .......................... 264/445 |
| 5,497,594 A | * | 3/1996 | Giuseppe et al. ........... 52/730.4 |
| 5,648,036 A | * | 7/1997 | Glang et al. ................. 264/261 |
| 5,965,075 A | * | 10/1999 | Pauley et al. ............. 264/176.1 |
| 6,210,616 B1 | * | 4/2001 | Suwanda ..................... 264/151 |
| 6,251,332 B1 | * | 6/2001 | Nakagawa et al. ......... 264/513 |
| 6,368,000 B1 | * | 4/2002 | Park et al. ...................... 401/6 |

* cited by examiner

Primary Examiner—Michael Colaianni
Assistant Examiner—Monica A Fontaine
(74) Attorney, Agent, or Firm—Bachman & LaPointe, P.C.

(57) ABSTRACT

A plastic product, and method and device for producing such plastic products are disclosed. The present invention produces a plastic product having a completely sealed sidewall defining at least one cavity therein, or a plastic product filled with a filler, such as urethane foam, in the cavity, or a plastic product having both a sidewall with both open end portions and a filler contained in the cavity. The plastic forming process and device of this invention effectively produces a variety of plastic products, such as a variety of panels, pipes, channels, columns, boats, oil tanks, door panels, vehicle door panels, bumpers, vehicle hoods, and small-sized submarines, which are not produced by conventional plastic forming processes or devices. Such plastic products of this invention are produced through a continued process in commercial quantities, and are preferably usable as interior or exterior materials for a variety of applications, such as automobiles, ships, airplanes, buildings, structural frames, and other industrial applications since they have desired thermal insulation property, desired light transmitting effect, desired buoyancy, and desired durability.

6 Claims, 39 Drawing Sheets

(a)

(b)

(a)

(b)

(a)

(b)

(a)

(b)

(c)

(d)

(e)

(f)

(g)

(a)

(b)

(a)

(b)

(a)

(b)

(a)

(b)

(a)

(b)

(a)

(b)

(a)

(b)

(a)

(b)

(a)

(b)

EXTRUDING AND BLOW-MOLDING METHOD FOR FORMING A PLASTIC PRODUCT

FIELD OF THE INVENTION

The present invention relates to a production of plastic products through a molding process and, more particularly, to a plastic product having desired thermal insulation property, desired light transmitting effect, desired buoyancy, and desired durability, and to a method and device for producing such plastic products by extruding a melted plastic material to form a plastic structural body, and sequentially blowing, filling and molding the structural body before the hardening of the body to produce resulting plastic products.

BACKGROUND OF THE INVENTION

In a conventional extrusion molding process, plastic material is melted at a predetermined temperature to become a half-melted gel. The half-melted plastic material is, thereafter, fed to an extrusion head by means of a feeding unit, such as a feed screw, and so a plastic structural body having an outer shape determined by the shape of a dice mold provided in the extrusion head is produced.

A conventional extrusion-molding device for performing such an extrusion molding process comprises a plurality of cores provided in the housing of an extrusion head. A dice mold, having a shape corresponding to a desired shape of resulting products, is set in the terminal of the housing. A water-cooling unit is provided outside the extrusion head for cooling the structural body discharged from the dice mold.

In a conventional extrusion molding process using such a conventional extrusion-molding machine, the shape of the resulting products is determined by the dice mold when the melted plastic material passes through the dice mold. In such a case, a plastic structural body is discharged from the dice mold while being initially cooled by a primary cooling unit provided around the dice mold, and is then cooled by a water-cooling unit longitudinally installed along a feeding passage extending from the dice mold. The structural body is, thereafter, cut by a cutter installed at the terminal of the passage.

The above-mentioned conventional extrusion molding process has been preferably used to form a variety of plastic products having the same cross-section, such as wires, rods and panels. As the plastic products produced by the conventional extrusion molding process are hollow members, they are preferably lightweight. However, the plastic products may be undesirably weak in their structure for an impact, particularly when they have thin walls.

In addition, the extrusion-molded plastic products are produced by cutting a linear structural body, and so each product has cut surfaces at both end surfaces of the product, with a cavity longitudinally formed in inner-space of each product. The longitudinal cavity has to been opened at both end portions.

A conventional extrusion molding process of producing such plastic products comprises the steps of: melting a plastic material; extruding the melted plastic material to feed the plastic material into a molding cavity defined by the housing and cores of an extrusion head; shaping a plastic structural body by extruding the plastic material through a dice mold installed at the terminal of the extrusion head housing; initially cooling the plastic structural body by a primary cooling unit provided around the dice mold; then cooling the structural body by a water cooling unit longitudinally installed along a feeding passage extending from the dice mold; and cutting the plastic structural body by a cutter installed at the terminal of the passage. Therefore, it is impossible to produce plastic products having shapes different from that of the dice mold through a conventional extrusion molding process.

A variety of plastic products, each having a completely sealed and completely continuous sidewall, a sealed cavity defined within the sidewall, and a shaping part having a desired shape and formed in the cavity, are preferably usable for a variety of applications in a variety of industrial fields. However, it is impossible to produce such plastic products through a conventional extrusion molding process or a conventional injection molding process.

In a conventional injection molding process, melted plastic material heated to a predetermined temperature is injected into a cavity defined between the open able top and bottom molds of an injection-molding machine. After the product is hardened, the top mold is separated from the bottom mold prior to ejecting the product from the cavity using an ejection unit. Therefore, the plastic products produced through a conventional injection molding process do not have a sealed cavity, but are open in their structures in the direction of mold opening.

In addition, even though plastic products are produced through a conventional injection molding process with a variety of cores, it is impossible to form a desired shaping part, such as a rib, in the cavity of the products.

It is also impossible to produce the above-mentioned plastic products, each having a completely sealed and completely continuous sidewall, a sealed cavity defined within the sidewall, and a shaping part having a desired shape and formed in the cavity, through another conventional forming process, such as a blow molding process or a vacuum forming process which is used for producing tubes, containers or a variety of casings in the prior art.

SUMMARY OF THE INVENTION

Accordingly, the present invention has been made keeping in mind the above problems occurring in the prior art, and an object of the present invention is to provide a plastic product, which each have a completely sealed and completely continuous sidewall, at least one sealed cavity having a single or multi-layered structure and defined within the sidewall, and a shaping part having a desired shape and formed in the cavity.

Another object of the present invention is to provide a plastic product, which has an air suction valve and an air exhaust valve on its sidewall to perform a respiration action through the valves in response to thermal expansion or contraction of a sealed cavity inside the sidewall, thus being protected from undesired deformation or breakage regardless of a change in atmospheric temperature.

A further object of the present invention is to provide a plastic product, which has an integrated structure having filler, such as urethane filler, welded to a sealed cavity of a plastic structural body of the product.

Still another object of the present invention is to provide an extrusion molding method and device, which produces a plastic product through a continuous blow molding process and/or a mold forming process, the product consisting of a plastic structural body having a completely sealed sidewall, with a plurality of ribs formed on the sidewall to form a plurality of cavities in the structural body;

Another object of the present invention is to provide an extrusion molding method and device, which produces a plastic product through a filling process, in addition to a continuous blow molding process and/or a mold forming process, the product consisting of a plastic structural body having a completely sealed sidewall, with a plurality of ribs formed on the sidewall to form a plurality of cavities in the structural body, and a filler integrally filling each of the cavities;

Another object of the present invention is to provide an extrusion molding method and device, which produces a plastic product by continuously injecting a filler, such as resin foam, into the cavity of a plastic structural body of the product while forming the product, thus integrating the filler with the sidewall of the product.

Another object of the present invention is to provide plastic products including panel type, pipe type, channel type, door panel type, boat type, and column type having a specifically designed structure with a completely sealed and completely continuous sidewall and at least one sealed cavity defined inside the sidewall, thus having desired thermal insulation property, desired no flammability, desired light transmitting effect, desired buoyancy, desired durability; being preferably usable as interior or exterior materials in a variety of applications, such as automobiles, ships, airplanes, buildings, structural frames, and other industrial applications; and to provide an extrusion molding method and device for producing such plastic products through a continued process in commercial quantity.

In order to accomplish the above object, the present invention provides a plastic product of the panel type, boat type, column type, beam type, channel type or other structural frame type, comprising: a plastic structural body formed through an extrusion molding process, a blow molding process and/or a mold-forming process, and having a sealed sidewall defining one or more sealed cavities therein to form a single- or multi-layered cavity structure.

In present invention, said sidewall may have a single-, double-, triple-, or multi-layered structure consisting of two or more walls, with a plurality of ribs formed in the multi-layered structure of the sidewall to form a plurality of cavities in the structure of the sidewall, and a plurality of hollow portions defined inside the wall of said multi-layered sidewall.

In the plastic product, a communication hole may be formed at each of said ribs to allow the cavities to communicate with each other. In addition, an air suction valve and an air exhaust valve may be set in the sidewall so as to suck or exhaust air into or from the cavities in response to an expansion or contraction of the cavities.

The plastic product of this invention may be designed to be used in place of a conventional double-layered or triple-layered glass panel, or used as a structural beam, a window frame, or a door panel having openings for holding a window glass frame and accomplishing a ventilation effect. When necessary, the plastic product having a multi-layered sidewall structure may be formed of a transparent plastic material so as to accomplish a desired light transmitting effect higher than that of a conventional resin film or a conventional pair glass, and so the product of this invention may be preferably used as a material for greenhouses. The plastic product of this invention is sufficiently low to effectively prevent heat loss, and is high in its heat radiation effect, thus having high thermal efficiency and a high thermal insulation effect. This product is not expensive, and so it does not force a user to pay excessive money to buy it.

Another advantage of this product resides in that it is usable almost permanently.

In the product of this invention, filler, such as urethane foam, may be injected into the cavities of the structural body to be integrated with the sidewall and the ribs of the body.

As The cavities of the structural body may be filled with a filler during an extrusion forming process, it is possible to produce a plastic product having the filler injected into the cavities being opened at both end portions and welded at inner surface of the cavities.

Since it is possible to produce a variety of plastic products having a flat panel shape, a corrugated panel shape, a boat shape, a channel shape, a tubular shape, a door panel shape, or an oil tank shape, the products of this invention may be usable in a variety of industrial fields.

The present invention also provides a method of forming a plastic product, comprising the steps of: extruding a plastic structural body having one or more cavities from a manifold of an extrusion head; continuously feeding the structural body to a mold-forming unit to seat the structural body in the mold-forming unit, and perforating a plurality of holes on the sidewall of the structural body using a plurality of perforating and injecting units of the mold-forming unit; and blowing the structural body by injecting hot air into the structural body and/or injection-molding the structural body by injecting a melted plastic material into the structural body at the mold-forming unit, thus producing a desired plastic product having one or more sealed cavities inside its completely sealed and continuous sidewall.

In the method, a rib thickness-adjusting unit may be installed at the manifold of the extrusion head so as to form a communication hole at each rib inside said structural body when the structural body is extruded from the manifold. After the extrusion molding process, the structural body is continuously fed to the mold-forming unit, and is subject to the hole forming process, the blow-molding process and/or the injection-molding process, and so the desired plastic product having the sealed cavities inside its completely sealed and continuous sidewall is produced.

In another embodiment of the present invention, the structural body is subject to the blow molding process and/or the injection-molding process at the mold-forming unit, and is also subject to a filling step of injecting a filler into said cavities through the hole made by said hole forming process using a perforating and injecting unit at the mold-forming unit, thus having the completely sealed and continuous sidewall with the sealed cavities filled and integrated with said filler.

In a further embodiment, the structural body is seated in the mold-forming unit provided with a movable core, and is subject to the hole forming process, the blow molding process, the injection-molding process and/or the filling process at the mold-forming unit, and so the structural body has the completely sealed and continuous sidewall with the sealed cavities filled and integrated with said filler.

In still another embodiment, the plastic forming method produces a desired plastic product by extruding a plastic structural body having one or more cavities in its sidewall, injecting a filler from a filler supply unit into the cavities through an injection pipe, thus integrating the filler with the sidewall and the ribs of the body, and seating the body in a mold-forming unit so as to perform an injection-molding process capable of forming sealed end walls of the structural body.

In a detailed description, the plastic forming method comprises the steps of: extruding a plastic structural body from the manifold of an extrusion molding unit, with one or more cavities formed inside the sidewall of said structural body; injecting hot air into the cavities of the body through a hot air injection pipe connected to the manifold, thus expanding the structural body; cutting the both end portions of the structural body after feeding the expanded structural body from the manifold to a mold-forming unit; forming one or more holes on the sidewall of the structural body using one or more perforating and injecting units provided at the mold-forming unit; injecting hot fluid into the cavities of the body, thus blowing the body; injecting low temperature air into the cavities of the body using the perforating and injecting units, and spraying low temperature air to the interior or exterior of the mold-forming unit by an air spraying unit, thus cooling the structural body; and ejecting the structural body from the mold-forming unit, whereby a desired plastic product having one or more sealed cavities inside its completely sealed sidewall is produced.

The present invention also provides a device for forming a plastic product, comprising: an extrusion molding unit used for extruding a plastic structural body having one or more cavities inside its sidewall; an injection pipe connected to the extrusion head of said extrusion molding unit, and used for injecting hot air into the cavities of the structural body to expand the structural body; a mold-forming unit installed to seat and mold the structural body fed from said extrusion molding unit; a plurality of perforating and injecting units provided at the mold-forming unit for forming a plurality of holes on the sidewall of the structural body, and injecting hot air into the cavities of the structural body to expand the structural body, and injecting a filler into the cavities of the structural body; and a feeding unit used for feeding the structural body from the extrusion molding unit to the mold-forming unit, whereby the device continuously performs one or more processes selected from an extrusion molding process, a blow molding process, a mold-forming process and a filling process, thus producing a desired plastic product having one or more sealed cavities inside its completely sealed and continuous sidewall.

In the present invention, a manifold is installed at the extrusion-molding unit, thus primarily extruding the desired plastic structural body having one or more cavities inside its sidewall. Thereafter, hot air is injected into the cavities of the structural body to expand the structural body. The expanded body is fed from the extrusion-molding unit to the mold-forming unit while maintaining its expanded shape. At the mold-forming unit, hot air is injected into the body to perform a blow molding process. In addition, a melted plastic material may be injected into the cavity of the top and bottom molds of the mold-forming unit, thus performing an injection molding process when necessary. A core may be installed at the mold-forming unit to form a shape on the structural body by the forming part of the core when necessary. Therefore, it is possible to produce a desired plastic product having one or more sealed cavities inside its completely sealed and continuous sidewall.

In the present invention, the plastic forming process cools the plastic product through an air-cooling process in place of a conventional water-cooling process at the mold-forming unit. Of course, it should be understood that it is possible to cool a specific part of the top and bottom molds using a conventional cooling liquid. The air-cooling process may be accomplished through a natural air cooling process or using an air spray nozzle installed at a desired area to spray highly pressurized air.

The plastic forming process of this invention using hot air or cool air for heating or cooling the plastic structural body is very different from the conventional extrusion molding processes or the conventional injection molding processes using water for cooling the products.

The plastic forming process of this invention effectively produces a plastic product, which is completely sealed at its six walls and has sealed cavities, with filler integrated with the structural body into a single structure. It is impossible for the conventional forming process to produce such a plastic product. Of course, it is impossible for the conventional forming process to produce a plastic product of this invention filled with filler, such as urethane, in the cavities sealed at its four walls and opened at both end portions. In the prior art, it is impossible to produce a plastic product, filled with such a filler in its cavities, in commercial quantities through an extrusion molding process since the conventional extrusion molding process primarily cools the product using water, and finally cools the product within a cooling tank while slightly elongating the product after a sizing process. Therefore, it is well known to those skilled in the art that the method and device for forming such plastic products is newly proposed and very effectively usable.

In the conventional extrusion molding process, the shape and size of a product is determined by a dice mold before the product passes through a water tank to be cooled. Such a conventional extrusion molding process can produce a single-layered panel or a single-layered pipe, but is not used for filling filler, such as urethane foam, in the cavity of the product due to a limit caused by the use of the dice mold and the water-cooling process. However, in the present invention, the plastic structural body extruded from the manifold of an extrusion-molding unit is directly seated in the cavity of a variety of molds without passing through a dice mold or a water tank. In the present invention, hot air and cool air may be preferably injected or sprayed to the mold-forming unit when necessary to adjust the production rate of the products.

In the present invention, a rib thickness adjusting plate or a rib thickness adjusting member are hinged to the manifold such that it is open able as desired to form a communication hole at each rob of the structural body. Due to the communication holes, the cavities communicate with each other, thus allowing the structural body to be fed from the extrusion-molding unit to the mold-forming unit while maintaining the uniformly expanded shape. This also allows the structural body to be uniformly formed during the blow molding process or the filling process performed at the mold-forming unit.

In the present invention, the communication holes are easily formed at the ribs of the structural body, and the shape and size of the resulting product is determined within the mold-forming unit designed to cool the product through an air-cooling process in place of a conventional water-cooling process. In the process of this invention, hot air is injected into the structural body inside the mold-forming unit by the perforating and injecting units installed at the mold-forming unit, thus finally expanding the body prior to feeding cool air to the body so as to quickly cooling the body. The process and device of this invention thus effectively produces a variety of desired plastic products, including panel-type or pipe-type products, or products filled with urethane foam as filler.

In addition, the rib thickness-adjusting unit installed at the manifold of the extrusion-molding unit is usable for controlling the thickness of the ribs as desired, in addition to forming the communication holes at the ribs. This rib thickness-adjusting unit is particularly usable for forming a beam-type or column-type plastic product having a specifically designed appearance.

The perforating and injecting unit installed at the mold-forming unit is commonly usable for forming the holes on the sidewall of the structural body, injecting hot air into the body, or injecting filler into the body as desired.

The plastic product of the present invention also has an air suction valve and an air exhaust valve on its sidewall to perform respiration through the valves in response to thermal expansion or contraction of a sealed cavity inside the sidewall, thus being protected from undesired deformation or breakage according to the variation of atmospheric temperature. This allows the product to be usable almost permanently, and so the present invention preferably conserves natural resources, in addition to preventing environmental pollution.

The plastic product of the panel type completely sealed at its six walls according to the present invention is preferably usable as a material for greenhouses, in place of conventional single-pair glass panels or double-pair glass panels. In the case of a plastic product having a two- or multi-layered cavity structure, a communication hole is formed at each rib to allow the cavities arranged in each layer to communicate with each other. In such a case, the cavities in the upper and lower layers do not communicate with each other since no hole is formed at the wall between the upper and lower cavities. Therefore, it is possible to further improve the thermal insulation effect of the plastic product. In the present invention, it is preferred to form the communication holes at the ribs such that the holes are misaligned from each other to reinforce the structural strength of the ribs, in addition to allowing air and filler to uniformly fill the cavities.

The plastic product of the panel type sealed at its six walls and filled with a filler, such as urethane foam, in the cavities defined within the walls according to the present invention has high thermal insulation effect, high buoyancy and high structural strength, in addition to effectively resisting corrosion, thus being preferably usable as an interior or exterior material of buildings. This product is also effectively usable for a desired lengthy period of time.

The plastic forming method and device of this invention particularly and easily produces a simple plastic product, which is sealed at its four walls and opened at its both end portions, and is filled with a filler, such as urethane foam, in its cavities, through a simple process.

BRIEF DESCRIPTION OF THE DRAWINGS

The above and other objects, features and other advantages of the present invention will be more clearly understood from the following detailed description taken in conjunction with the accompanying drawings, in which:

FIGS. 1 to 9b are views of a variety of plastic products produced in accordance with the present invention, in which:

FIG. 1 is a partially broken perspective view of a plastic product of the panel type produced in accordance with the primary embodiment of the present invention;

FIG. 2 is a sectional view showing the construction of both the air suction valve and air exhaust valve included in the plastic panel of FIG. 1;

FIG. 3 is a partially broken perspective view of a plastic product of the boat type produced in accordance with a modification of the primary embodiment of the present invention;

FIG. 4 is a partially broken perspective view of a plastic product of the oil tank type produced in accordance with the fourth embodiment of the present invention;

FIGS. 5a to 5g are sectional views of a variety of plastic products produced in accordance with the present invention;

FIGS. 6a and 6b are a partially broken perspective view and a sectional view of a plastic product of the panel type produced in accordance with the second embodiment of the present invention;

FIGS. 8a and 8b are perspective views of a plastic product of the flat panel type and a plastic product of the corrugated panel type produced in accordance with the fifth embodiment of the present invention; and FIGS. 9a and 9b are sectional views of two plastic products, respectively having a double-layered cavity structure and a triple-layered cavity structure, produced in accordance with the present invention;

FIGS. 15 to 40 are views of plastic forming devices in accordance with the present invention, in which:

FIG. 15 is a plan view of a part of a plastic forming device in accordance with an embodiment of the present invention;

FIG. 16 is a front view, showing both a feeding unit and a mold-forming unit included in the plastic forming device of FIG. 15;

FIG. 17 is a side view, showing both the feeding unit and the mold-forming unit of FIG. 16;

FIGS. 18a and 18b are views, showing both the feeding unit and the mold-forming unit of FIG. 16 with the plastic structural body of a product carried on the feeding unit, in which: FIG. 18a is a front view, and FIG. 18b is a sectional view taken along the line A—A of FIG. 18a;

FIGS. 19a and 19b are views, showing both the feeding unit and the mold-forming unit of FIG. 16 when a feeding guide roller is lowered and a feeding bar is moved along with a truck unit after the plastic structural body of the product is carried on the feeding unit, in which: FIG. 19a is a front view, and FIG. 19b is a sectional view taken along the line A—A of FIG. 19a;

FIGS. 20a and 20b are views, showing both the feeding unit and the mold-forming unit of FIG. 16 when the plastic structural body of the product is installed in a mold-forming unit by both the feeding bar and the truck unit, in which: FIG. 20a is a front view, and FIG. 20b is a sectional view taken along the line B—B of FIG. 20a;

FIG. 21a is a front view, showing the plastic structural body of the product installed in the mold-forming unit of this invention;

FIG. 21b is a front view, showing the top and bottom molds of the mold-forming unit of this invention when they are closed to each other;

FIGS. 22 to 33 are views, showing both a manifold and a rib thickness adjusting unit included in the plastic forming device of this invention, in which:

FIG. 22 is a transverse sectioned view of the manifold and the rib thickness-adjusting unit;

FIG. 23 is a longitudinal sectioned view of the manifold and the rib thickness-adjusting unit;

FIGS. 24a and 24b are rear views, showing the construction of the outlet construction of the manifold and an operation of the rib thickness-adjusting unit of this invention;

FIGS. 25a and 25b are views, showing the operation of the rib thickness-adjusting unit of this invention;

FIGS. 26 to 32 are views, showing both a manifold and a rib thickness-adjusting unit in accordance with another embodiment of this invention, in which:

FIG. 26 is a partially broken perspective view of the manifold and the rib thickness-adjusting unit;

FIG. 27 is a longitudinal sectioned view of the manifold and the rib thickness-adjusting unit;

FIG. 28 is a plan view of a core unit and the rib thickness-adjusting unit;

FIG. 29 is a sectional view taken along the line C—C of FIG. 28;

FIG. 30 is a sectional view taken along the line D—D of FIG. 28;

FIGS. 31a and 31b are views, showing the operation of a communication hole-forming unit included in the plastic forming device of this invention;

FIG. 32 is a perspective view of the communication hole-forming unit of FIGS. 31a and 31b;

FIG. 33 is a sectional view, showing the construction of a rib thickness-adjusting unit in accordance with a further embodiment of this invention;

FIG. 34 is a partially broken perspective view of a plastic structural body of a product having a communication hole and produced using the extrusion-molding device of the present invention;

FIG. 35 is a perspective view, showing the construction of a mold included in the mold-forming unit of the present invention;

FIGS. 36a and 36b are views, showing the operation of the mold-forming unit of the present invention;

FIGS. 37 and 38 are perspective and longitudinal sectioned views of a perforating and injecting unit included in the plastic forming device of the present invention;

FIGS. 39a and 39b are longitudinal sectioned views, showing the operation of both the mold-forming unit and the perforating and injecting unit in accordance with another embodiment of the present invention; and FIG. 40 is a longitudinal sectioned view, showing the construction and operation of a mold-forming unit having double cutters in accordance with still another embodiment of the present invention.

DETAILED DESCRIPTION OF THE INVENTION

Figure 1:
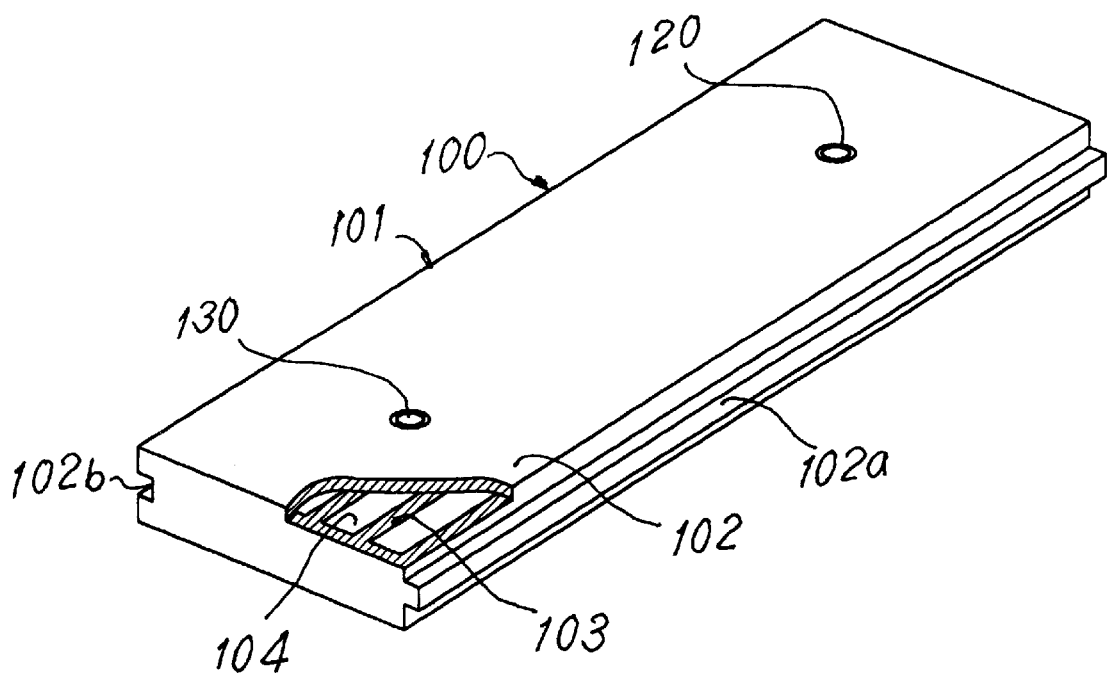

Reference now should be made to the drawings, in which the same reference numerals are used throughout the different drawings to designate the same or similar components.

Figure 5:
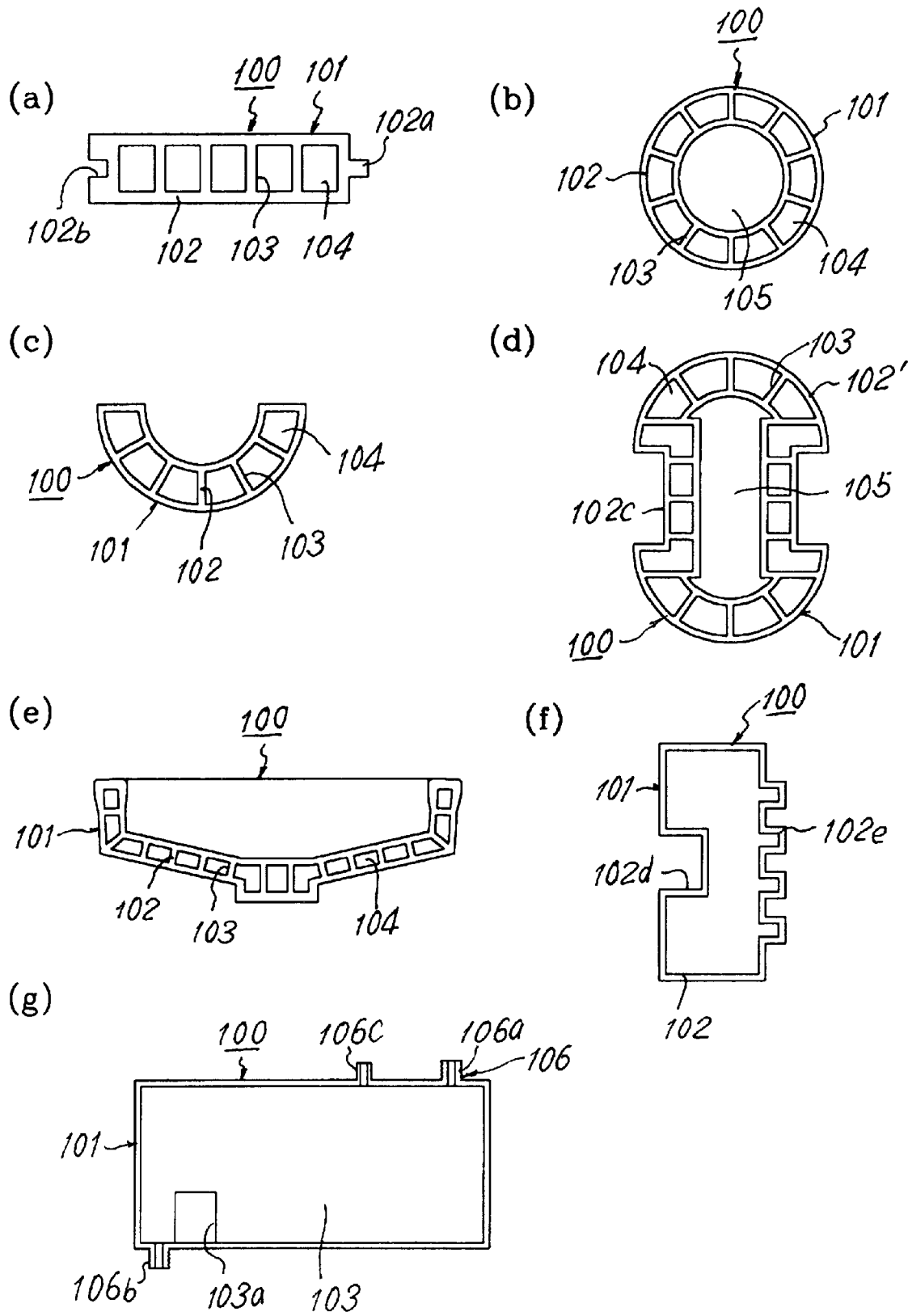

FIGS. 1 and 5a shows a plastic product 100 designed to be used as a panel in accordance with the primary embodiment of the present invention. This plastic product 100 consists of a panel-shaped rectangular structural body 101 made of plastic, with a plurality of ribs 103 integrally formed in the interior of the body 101 to form a plurality of cavities 104 inside the body 101. The cavities 104 of the body 101 are sealed with a double-layered sidewall 102.

A fitting rail 102a is longitudinally formed along the central axis of one surface of the sidewall 102, while a fitting channel 102b is longitudinally formed along the central axis of opposite surface of the wall 102. When a plurality of such plastic products 100 are used for the material of the wall of a building, the products 100 are assembled together by fitting the rails 102a into the channels 102b.

Figure 2:
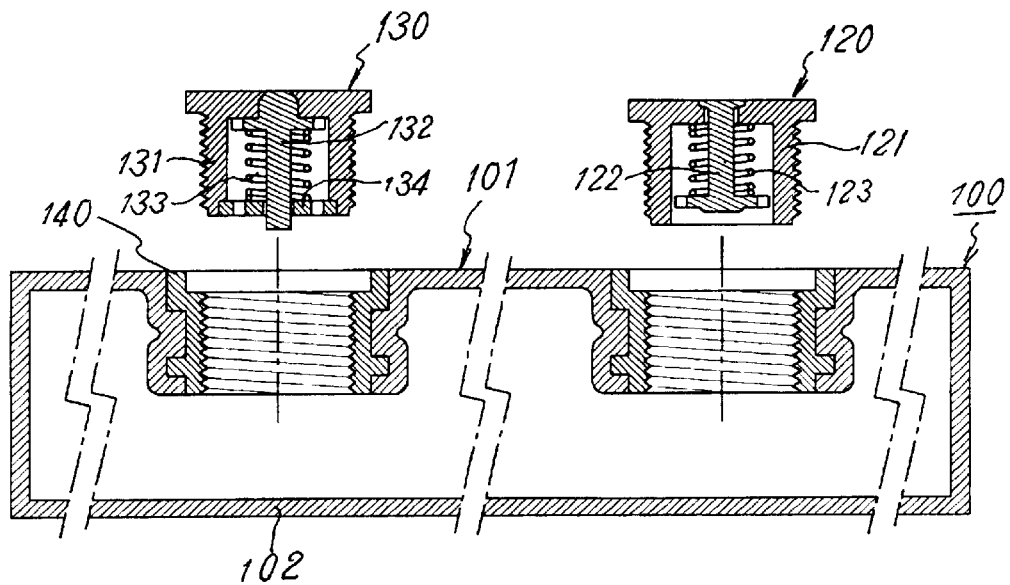

As shown in FIGS. 1 and 2, an air suction valve 130 and an air exhaust valve 120, produced through an insert fixing process, are set in two valve locking rings 140 of the wall 102 at appropriate positions allowing the valves 120 and 130 to commonly communicate with the cavities 104. Therefore, air is sucked into or exhausted from the cavities 104 from or to the atmosphere through the suction valve 130 or the exhaust valve 120 in response to a thermal expansion or contraction of the cavities 104 during a winter or summer season.

The air exhaust valve 120 consists of a hollow valve housing 121, with a valve body 122 set in the valve housing 121 so as to be movable in opposite directions relative to the fixed valve housing 121.

A coil spring 123 is fitted over the valve stem of the valve body 122 inside the valve housing 121b so as to normally bias the valve body 122 in a direction toward the interior of the structural body 101. When the cavities 104 of the structural body 101 are thermally expanded to enlarge their volumes, in addition to an increase in air pressure inside the cavities 104, the valve body 122 is pushed upward by the air pressure while overcoming the restoring force of the spring 123 to exhaust a predetermined quantity of air from the cavities 104 into the atmosphere. The air suction valve 130 consists of a hollow valve housing 131, with a valve supporter 134 closing the lower end of the valve housing 131. A valve body 132 is set in the valve housing 131 so as to be movable in opposite directions relative to the valve supporter 134. A coil spring 133 is fitted over the valve stem of the valve body 132 while being stopped by the top wall of the valve housing 131 and the valve supporter 134 at its opposite ends, thus normally biasing the valve body 132 in a direction toward the outward. When the cavities 104 of the structural body 101 are thermally contracted enlarging their volumes, in addition to a decrease in air pressure inside the cavities 104, the valve body 132 is pushed downward by atmospheric pressure while overcoming the restoring force of the spring 133 to allow a predetermined quantity of atmospheric air to flow into the cavities 104.

The above-mentioned plastic product 100 of FIGS. 1 and 5a has a high thermal insulation property, and so it is preferably usable as a unit module of a wall structure for a variety of buildings or greenhouses.

The above plastic product 100 performs a respiration through the air suction and exhaust valves 130 and 120 in response to thermal expansion or contraction of the cavities 104, and so the product 100 is protected from undesired deformation or breakage regardless of a change in atmospheric temperature.

Figure 3:
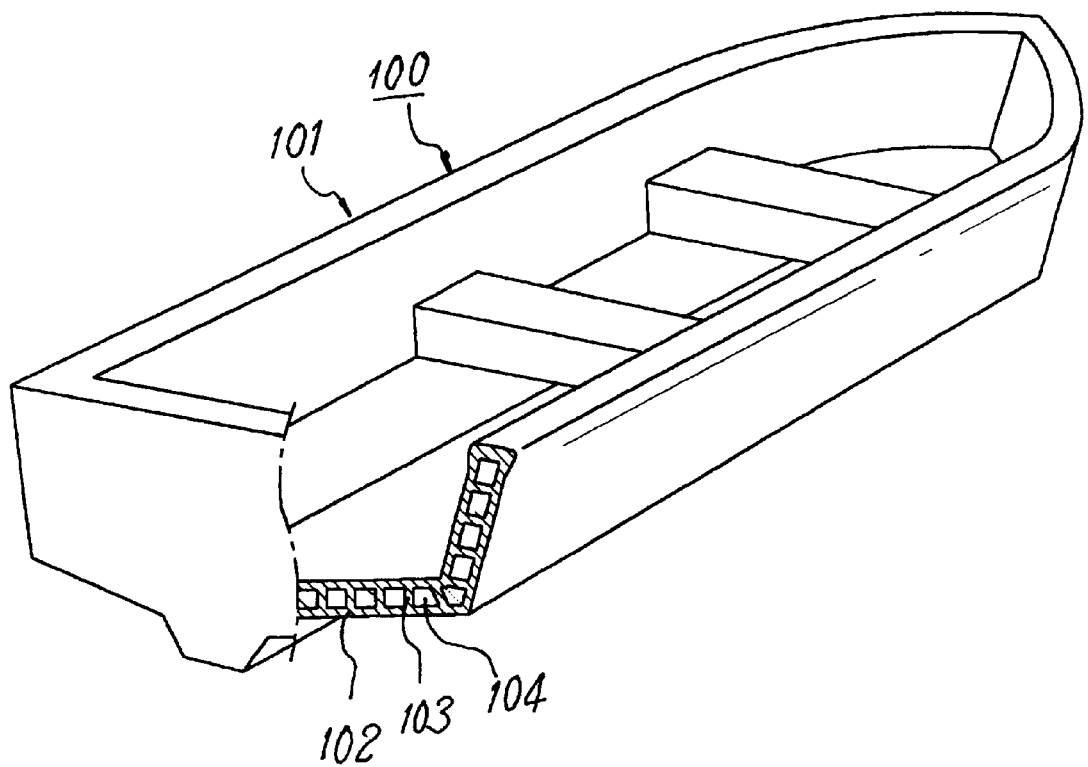

FIGS. 3 and 5e show a plastic product 100 designed to be used as a boat in accordance with a first modification of the primary embodiment of the present invention. This plastic product 100 consists of a boat-shaped plastic structural body 101, with a plurality of ribs 103 integrally formed in the interior of the body 101 to form a plurality of cavities 104 inside the body 101. The cavities 104 of the structural body 101 are completely sealed by a sidewall 102.

FIG. 5b shows a plastic product 100 having a tubular shape in accordance with a second modification of the primary embodiment of the present invention. This plastic product 100 consists of a tubular plastic structural body 101 formed by a double-layered sidewall 102 consisting of two concentric walls, with a plurality of ribs 103 integrally and radially formed in the structure of the wall 102 to form a plurality of cavities 104 within the wall 102. A cylindrical bore 105 is defined inside the inner wall of the tubular body 101. This tubular body 101 has a circular cross-section, but it should be understood that the body 101 may have a rectangular, hexagonal or other cross-shape in place of the circular cross-section without affecting the functioning of this invention.

FIG. 5c shows a plastic product 100 having a channel shape in accordance with a third modification of the fourth embodiment of this invention. This plastic product 100 consists of a semicircular plastic structural body 101 formed by a double-layered sidewall 102 consisting of two concentric walls, with a plurality of ribs 103 integrally and radially formed in the sidewall 102 to form a plurality of cavities 104 within the structure of the sidewall 102. The structural body 101 of this embodiment has a semicircular cross-section, but it should be understood that the body 101 might have another cross-shape in place of the circular cross-section without affecting the functioning of this invention.

FIG. 5d shows a plastic product 100 designed to be used as a coupling member in accordance with the fourth modification of the primary embodiment of this invention. This plastic product 100 consists of a plastic structural body 101 formed by a double-layered sidewall 102' consisting of two evenly spaced walls, with a plurality of ribs 103 integrally formed in the sidewall 102' to form a plurality of cavities 104 within the structure of the sidewall 102. A flat bore 105 is defined inside the inner wall of the structural body 101. Two fitting channels 102c are externally formed along the body 101 at opposite surfaces for engaging with the edges of panels. This plastic product 100 is preferably used as a coupling member for coupling a plurality of flat frames, such as panels, to each other to form a wall.

FIG. 5f shows a plastic product 100 designed to be used as material for a window frame in accordance with the fifth modification of the primary embodiment of this invention. This plastic product 100 consists of a plastic structural body 101 formed by a completely sealed sidewall 102, with a cavity 104 formed in the sidewall 102. A fitting channel 102d is longitudinally formed along the central axis of one side surface of the wall 102, and is used for firmly fixing the window frame to a target building wall. A plurality of window guide rails 102e are longitudinally formed along the opposite side surface of the wall 102 for holding a plurality of window glass frames while allowing the glass frames to move along the structural body 101.

Such plastic products 100 according to the fifth modification are produced with an inclined edge at each end thereof, and are easily fabricated into a single window frame prior to installing the window frame on a target-building wall.

The plastic products 100 according to the primary embodiment of this invention may be preferably used for applications requiring a high thermal insulation property, high light-transmitting effect, high buoyancy, and high durability.

Figure 6:
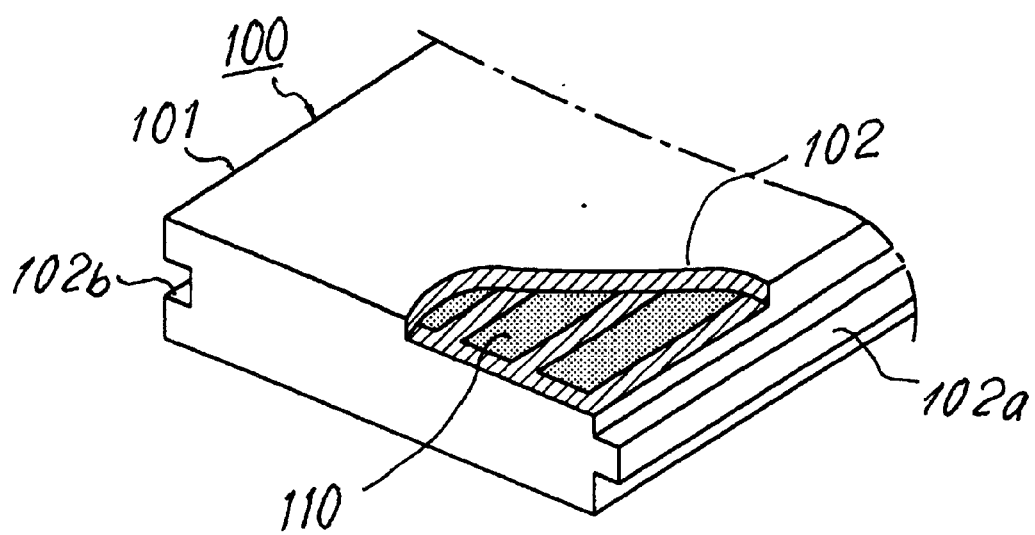
Figure 6:
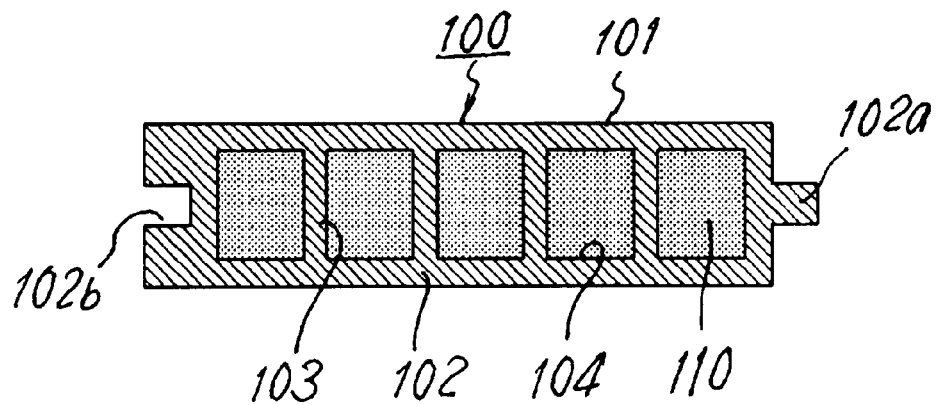

FIGS. 6a and 6b shows a plastic product 100 of the panel type in accordance with the second embodiment of the present invention. This plastic product 100 is formed by completely filling filler in the cavities 104 of the product of FIG. 1. That is, filler 110 fills the cavities 104 while being welded to the ribs 103 and the sidewall 102 to form an integrated body.

Figure 4:
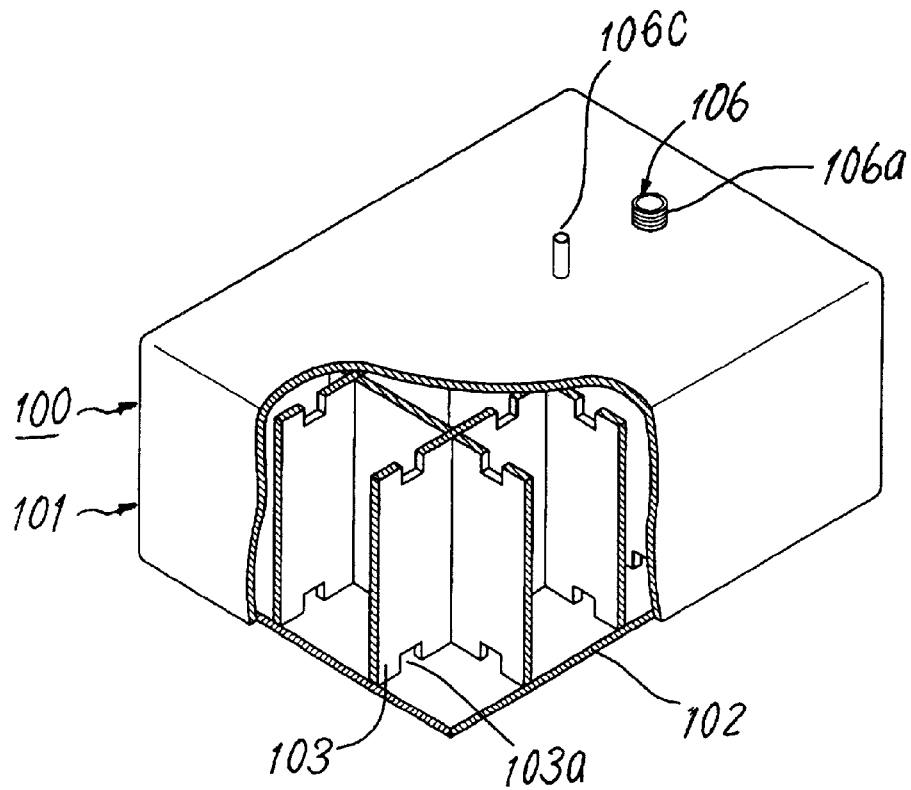

Of course, it should be understood that it is possible to produce a variety of plastic products having such filler 110 in the cavities 104 of the products of FIGS. 1, 3 and 4.

Figure 7A:
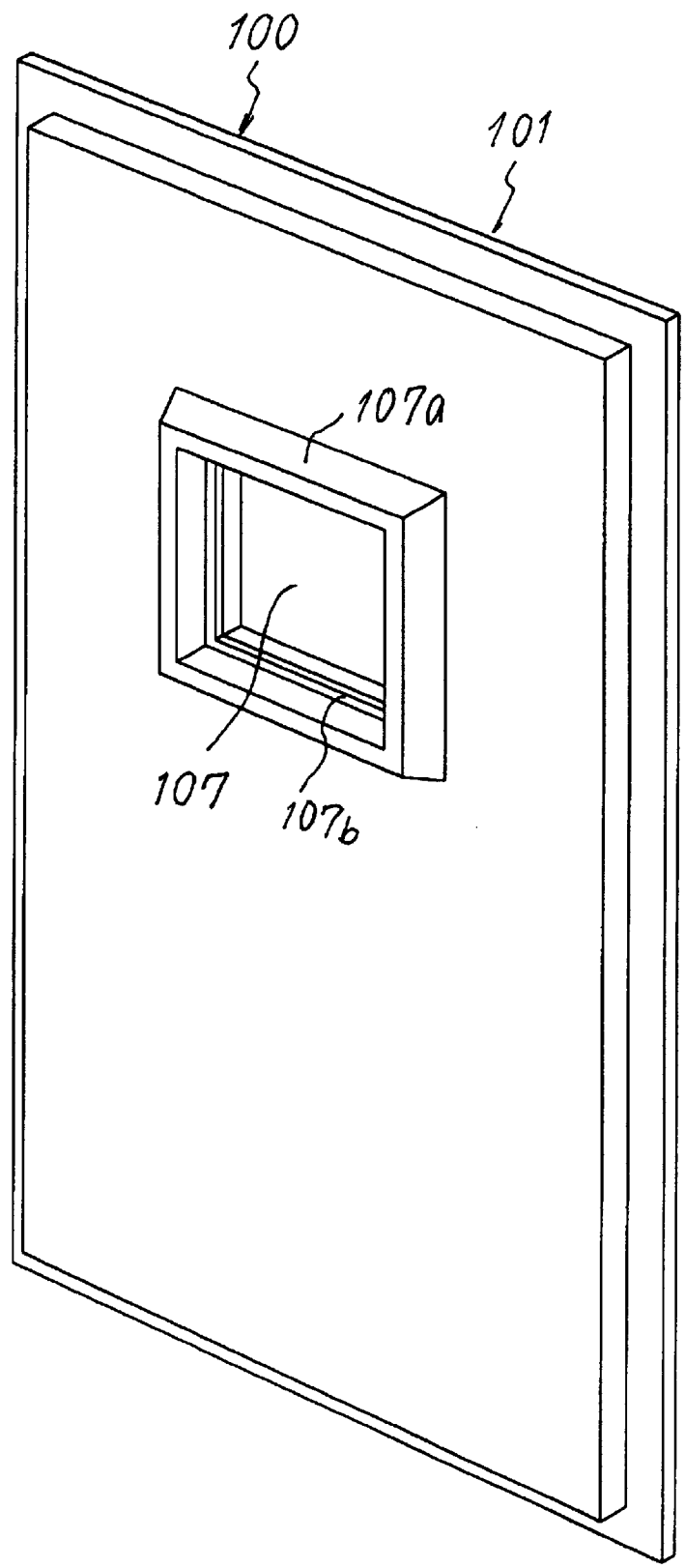
FIGS. 7a and 7b are a perspective view and a sectional view of a plastic product of the door panel type produced in accordance with the third embodiment of the present invention.
Figure 7B:
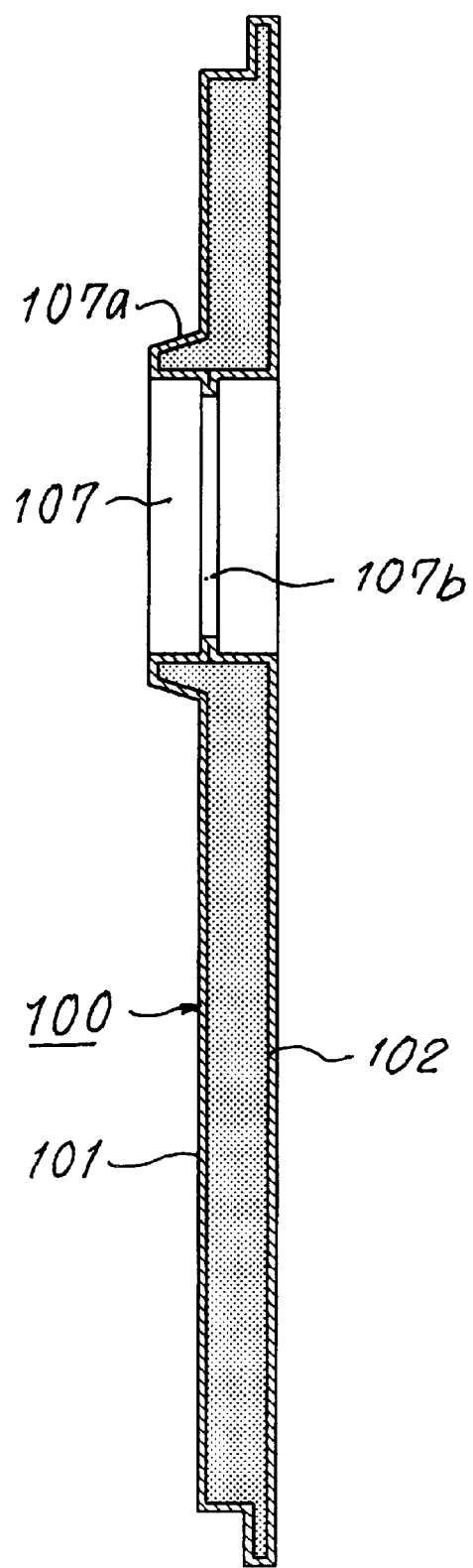

FIGS. 7a and 7b show a plastic product 100 of the door panel type produced in accordance with the third embodiment of the present invention. This plastic product 100 consists of a rectangular structural body 101 as shown in FIG. 7a, with a filler 110 filling the cavities 104 inside the sidewall 102 of the structural body 101 as shown in FIG. 7b. The structural body 101 of this product 100 has a rectangular opening 107 used for installing a window frame on the body 101.

The edge of the above opening 107 is defined by an inclined projection frame 107a, with a rail 107b formed along the four inside surfaces of the frame 107a for holding a target window frame inside the opening 107.

The above plastic products 100 of the door panel type are easily and simply produced with high productivity, and are easily and simply installed at desired positions on building walls. Since the products 100 have an integrated structure, the products 100 have high durability.

FIGS. 4 and 5g show a plastic product 100 used as an oil tank for automobiles in accordance with the fourth embodiment of the present invention. This plastic product 100 consists of a structural body 101, of which the interior defined by a sidewall 102 is provided with a plurality of ribs 103 to form a plurality of cavities 104 in the body 101. A communication hole 103a is formed at each rib 103 to allow the cavities 104 to communicate with each other. A plurality of holes 106 is formed on the sidewall 102 of the body 101. That is, an oil inlet hole 106a is formed at the top wall of the body 101 for introducing oil into the body 101, an oil outlet hole 106b is formed at the bottom wall of the body 101 for discharging oil from the body 101, and a plurality of mounting holes 106c are formed at the top surface of the body 101 for installing a plurality of functional units, such as an oil sensor.

When oil flows into the body 101 through the inlet hole 106a, oil uniformly fills the cavities 104. Since the oil is uniformly contained in the cavities 104 as described above, oil is prevented from excessively moving from side to side in the body 101 during movement of a vehicle. The ribs 103 also reinforce the structural strength of the tank, thus allowing the tank to be protected from external impact and to be usable for a desired lengthy period of time.

FIGS. 8a and 8b show a plastic product 100 of the flat panel type and a plastic product 100 of the corrugated panel type produced in accordance with the fifth embodiment of the present invention. Each of the plastic products 100 consists of a structural body 101, of which the interior defined by a sidewall 102 is provided with a plurality of ribs 103 to form a plurality of cavities 104 in the body 101. Filler 110 is filled in the cavities 104.

In the above products 100, the ribs 103 may be removed from the bodies 101. In such a case, each of the bodies 101 has one cavity 104 filled with the filler 110.

That is, it is preferred to form a plurality of cavities 104 in the body 101 of each plastic product 100 of FIGS. 8a and 8b. However, the body 101 may have one cavity 104 instead of the several cavities without affecting the functioning of this invention. The formation of one cavity 104 in the body 101 may be adapted to another type of plastic product 100.

The integrated plastic product 100 having the filler 110 filling the cavities 104 according to the fifth embodiment may be cut into pieces having desired lengths to form resulting products.

The panel-type plastic products 100 of FIGS. 8a and 8b may be preferably used as a material for buildings or greenhouses.

In the prior art, a plurality of corrugated panels is laid on a greenhouse ceiling. After installing the panels on the ceiling of the greenhouse, a urethane resin is layered on the products, and an epoxy resin is layered on the urethane resin-layer to improve the thermal insulation effect of the greenhouse. However, this conventional process is very difficult, and increases the construction cost of the greenhouse. The use of the corrugated plastic products 100 of FIG. 8b significantly reduces the time taken and construction costs of the greenhouse, in addition to accomplishing the desired thermal insulation effect and desired durability.

The plastic product 100 according to the fifth embodiment of FIGS. 8a and 8b is produced by filling the filler 110 in the cavities 104 of the body 101 through a foaming process, and has desired thermal insulation property, desired light transmitting effect, desired buoyancy, and desired durability, thus being preferably used as a structural panel for a variety of applications. It is also possible to produce a nonflammable plastic product 100 according to the fifth embodiment by using a nonflammable material while disregarding the light transmitting effect of the product.

Figure 9:
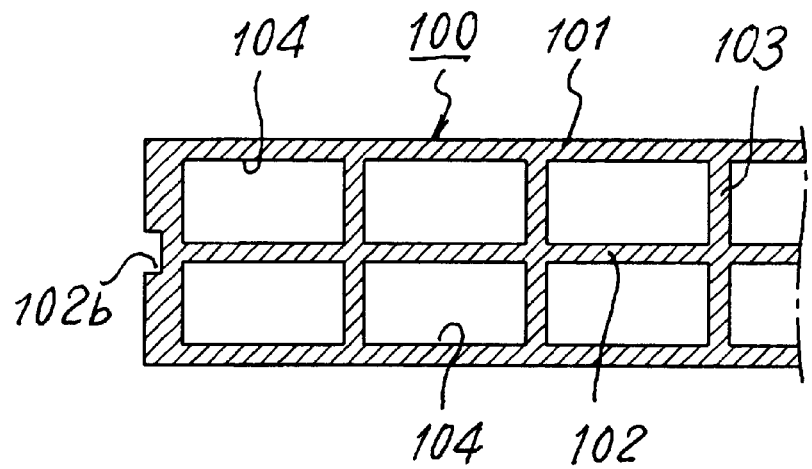
Figure 9:
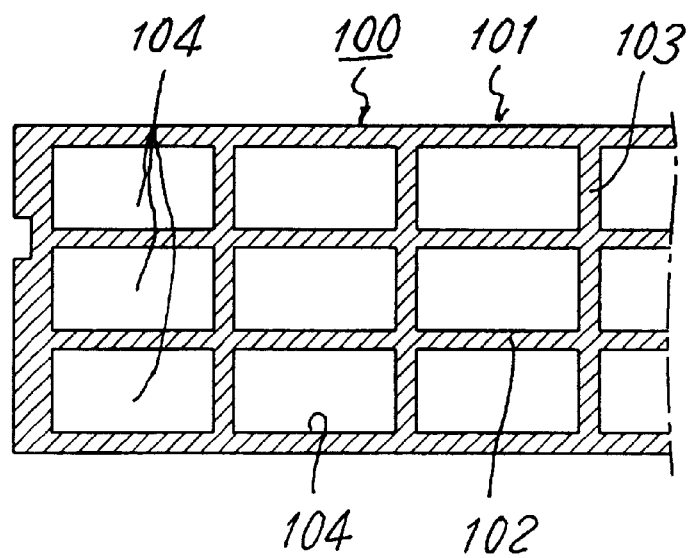

FIGS. 9a and 9b are sectional views of two plastic products, having a double-layered cavity structure and a triple-layered cavity structure respectively, produced in accordance with the present invention. The product 100 of FIG. 9a has a plurality of cavities 104 arranged in a double-layered structure, while the product 100 of FIG. 9b has a plurality of cavities 104 arranged in a triple-layered structure. Of course, the cavities 104 of the plastic product 100 of the present invention may be arranged in a four- or multi-layered structure without affecting the function of this invention.

Figure 10:
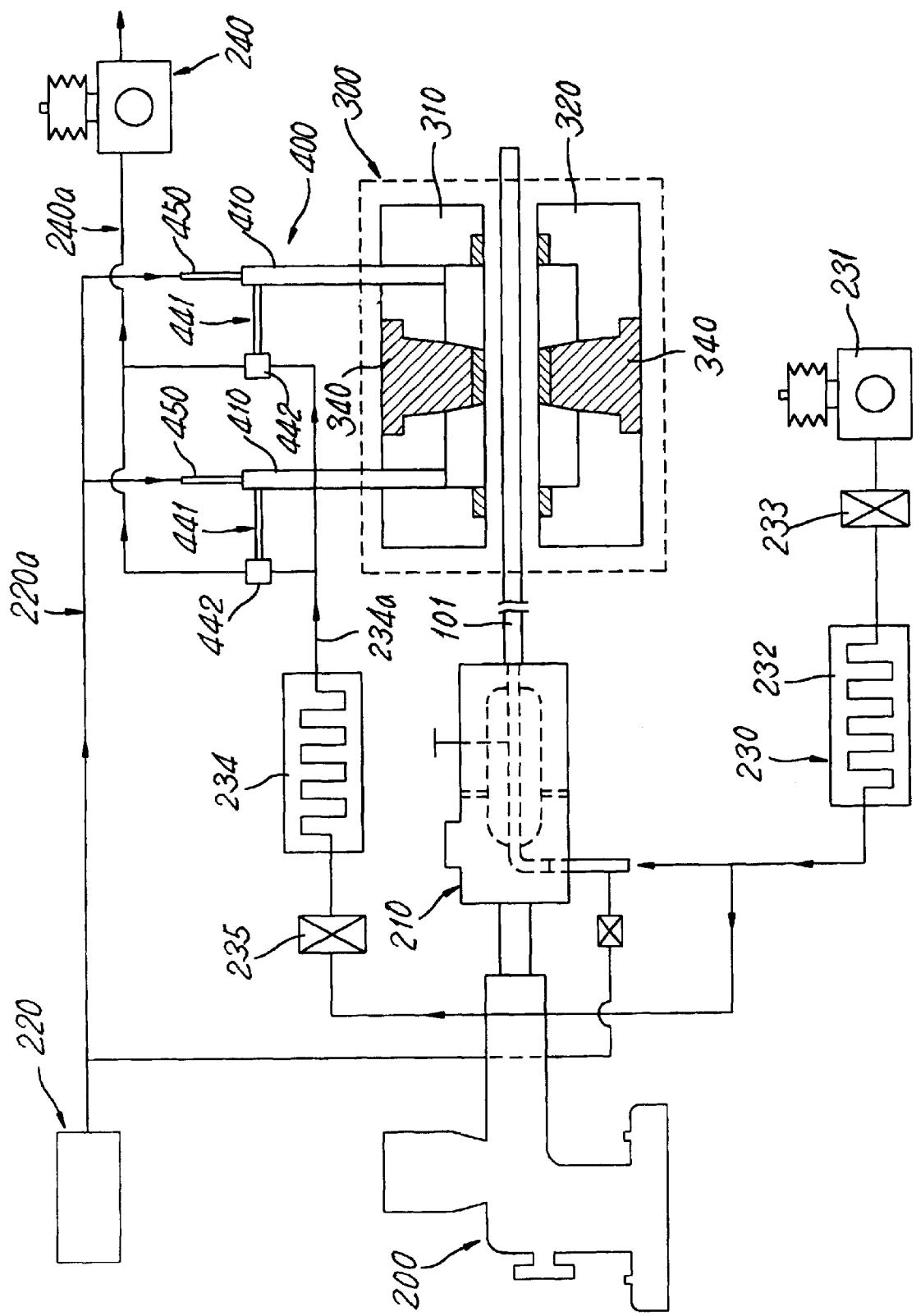
FIG. 10 is a schematic view of a plastic forming device in accordance with the present invention.
Figure 12:
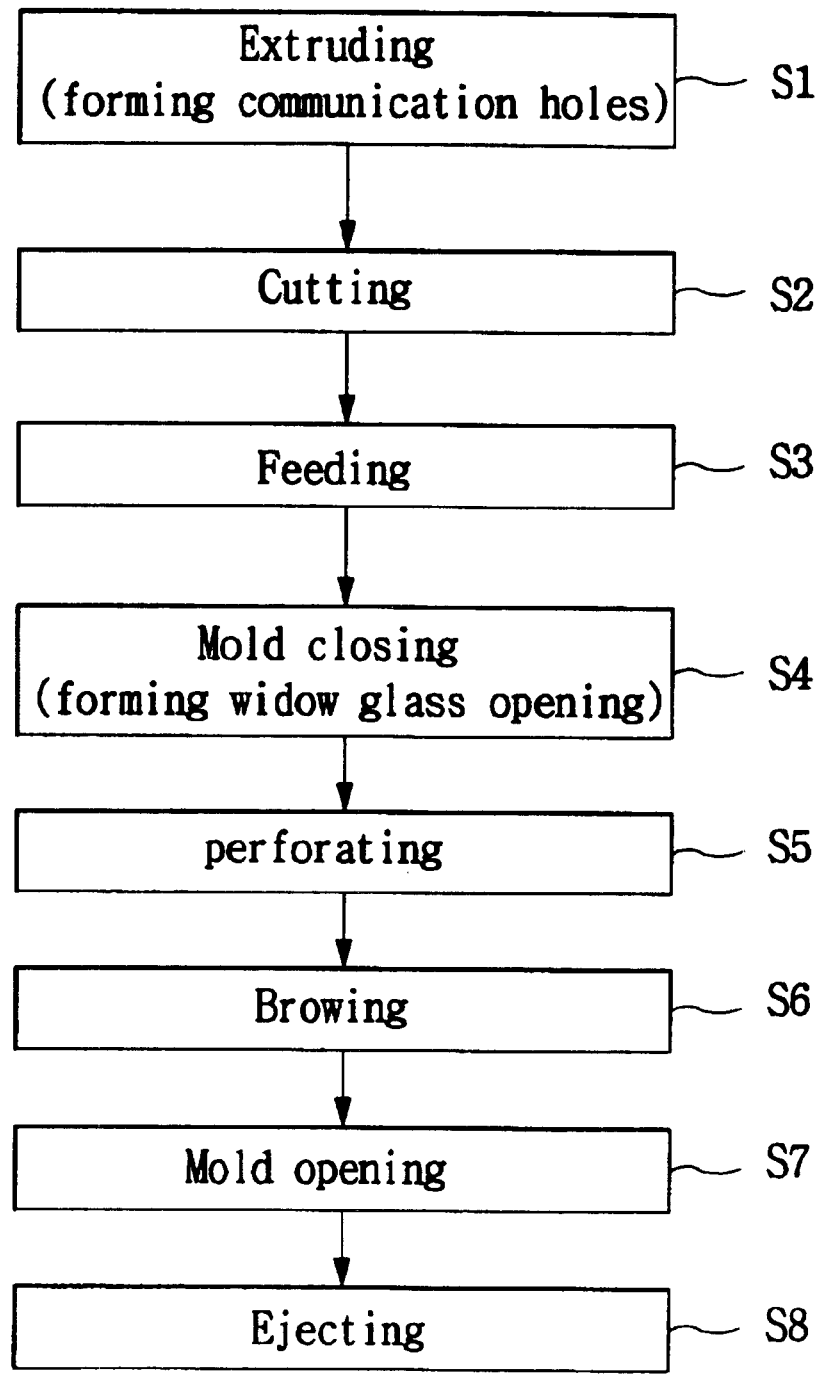
FIGS. 12 to 14 are flowcharts of plastic forming processes in accordance with the present invention.
Figure 13:
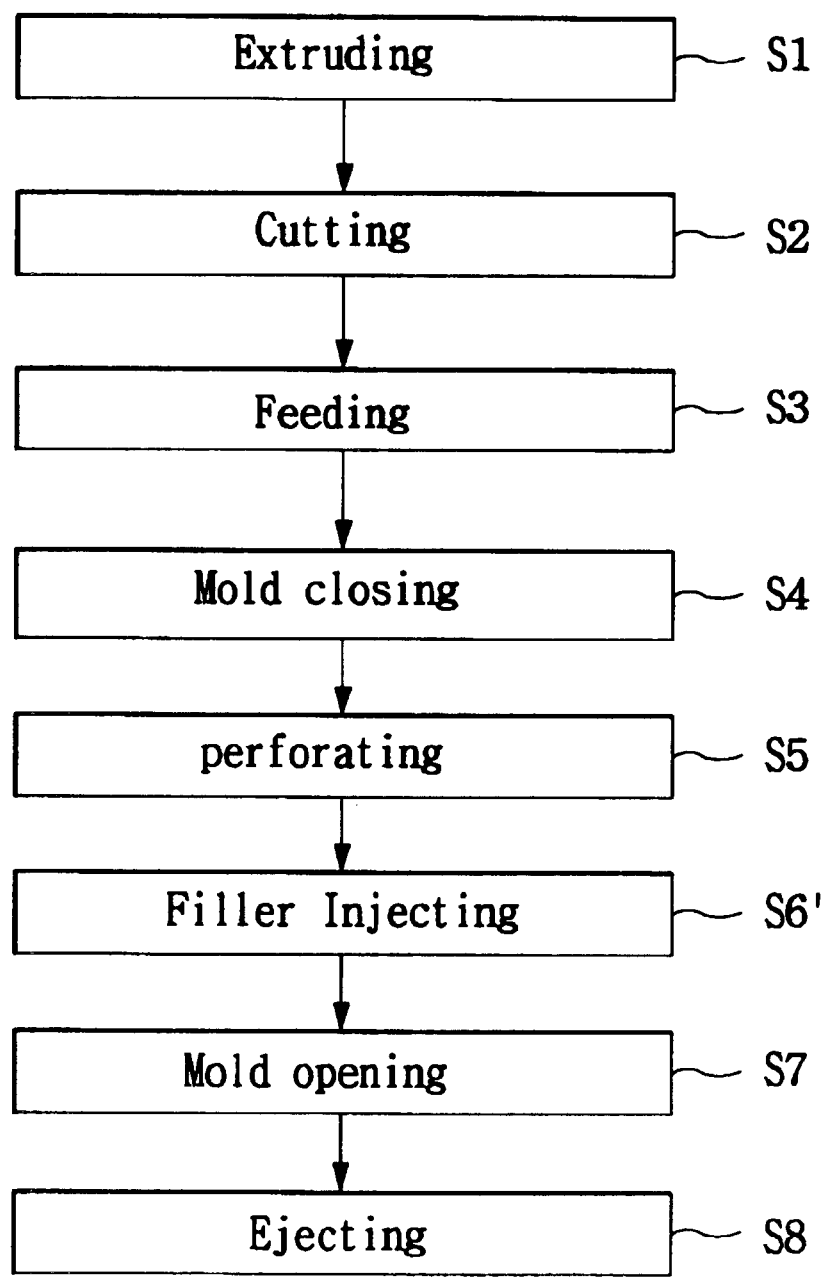
Figure 14:
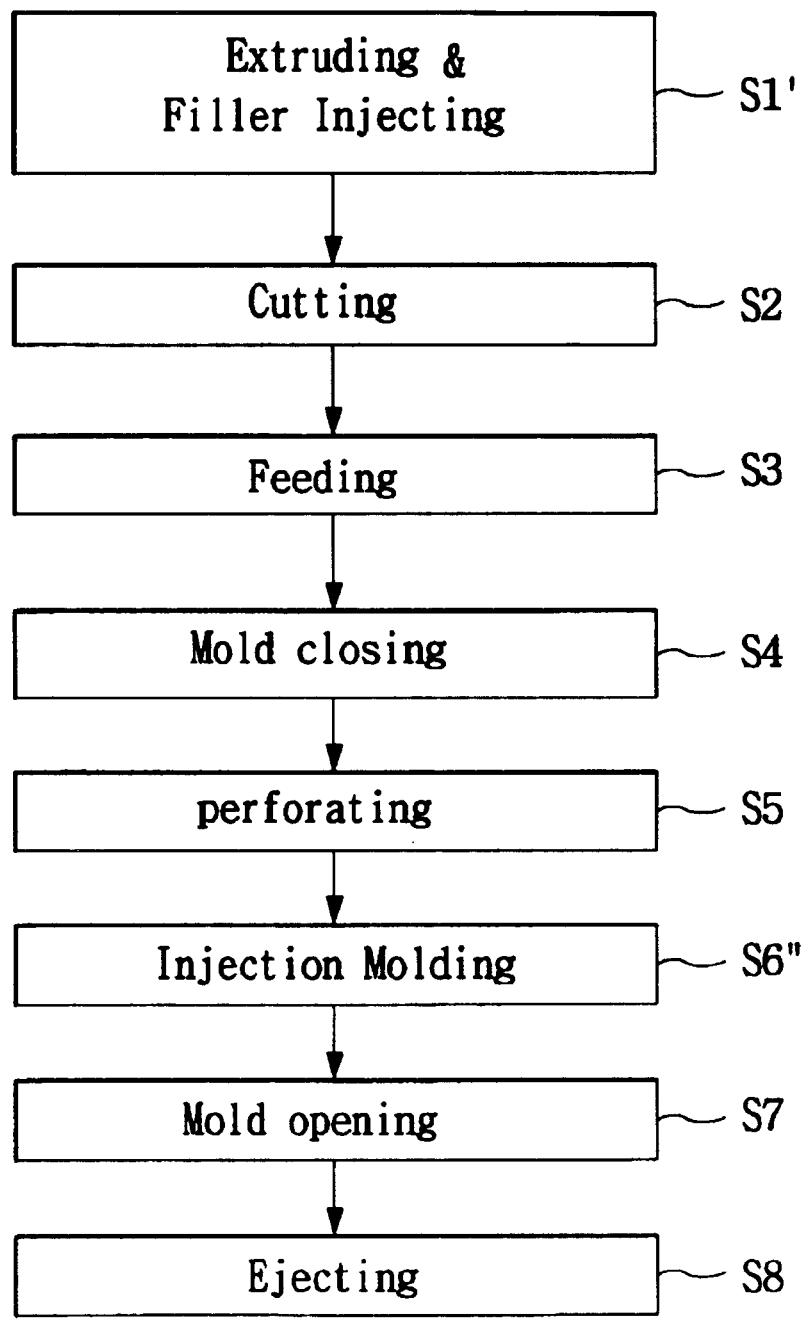

FIG. 10 is a schematic view of a plastic forming device in accordance with the present invention. FIGS. 11a to 11g are views of a plastic forming process in accordance with the present invention. FIGS. 12 to 14 are flowcharts of plastic forming processes in accordance with the present invention. First, a plastic forming process of producing each of the plastic products 100 of FIGS. 1, 3, 5a to 5f according to the primary embodiment will be described herein below with reference to FIGS. 10, 11 and 12.

The plastic forming process of producing products 100 according to the primary embodiment comprises: an extrusion step (S1) of extruding a plastic structural body 101 as shown in FIG. 11a by using an extrusion molding unit 200 of FIG. 10 while injecting air into the interior of the body 101; a cutting step (S2) of cutting the body 101 to form a desired body 101 having a predetermined length as shown in FIG. 11b; a feeding step (S3) of feeding the body 101 to a mold-forming unit 300 as shown in FIGS. 11c and 11d; a mold closing step (S4) of closing the top and bottom molds of the mold-forming unit 300 to each other to cut and close the both ends of the body 101 within the cavity of the top and bottom molds as shown in FIG. 11e; a perforating step (S5) of forming a plurality of holes on the sidewall of the body 101 set within the top and bottom molds of the mold-forming unit 300 as shown in FIG. 11e; a blowing step (S6) of injecting hot air into the interior of the body 101 through the holes of the sidewall 102 to shape the body 101 in accordance with the shape of the cavity of the mold-forming unit 300 as shown in FIG. 11f; a mold opening step (S7) of separating the top mold from the bottom mold of the mold-forming unit 300 as shown in FIG. 11g; and an ejecting step (S8) of ejecting the body 101 from the cavity of the molds.

The extrusion molding device of this invention does not have any dice mold installed at the manifold 216 of the extrusion head 210, any cooling unit for cooling the body 101 extruded from the head 210, or any separate cooling tank for cooling and hardening the body 101 at a position outside the head 210. Therefore, the manifold 216 of this extrusion molding device only roughly forms the shape of the body 101, but does not cool the body 101 or water-cool the body 101 for sizing and hardening the body 101 at the outside of the head 210.

In a detailed description, this extrusion molding method and device only roughly forms the shape of the body 101 at the manifold 216 of the extrusion head 210, and injects hot air into the interior of the body 101 to maintain the extruded shape and the melted gel of the body 101. The plastic structural body 101 is, thereafter, installed within a mold-forming unit 300 prior to perforating the sidewall 102 of the body 101. After perforating the sidewall 102, an appropriate fluid, such as air or melted urethane, is injected into the body 101 through the holes of the sidewall 102, thus forming a desired shape of the resulting plastic body 101. The above-mentioned plastic forming process and device has not been proposed in the prior art, but is newly proposed by the inventor of this invention.

In addition, the plastic forming process and device of this invention injects low temperature air into the product 100 using a perforating and injecting unit 400 after forming the product 100 using the mold-forming unit 300. The process and device also uses a separate air pneumatic spraying unit (not shown), which sprays low temperature air to the interior or exterior of the mold-forming unit 300, thus cooling the mold-forming unit 300 and hardening the product 100 prior to ejecting the product 100 from the mold-forming unit 300.

The air spraying unit may be designed such that an air passage longitudinally arranged along both the top and bottom molds 310 and 320 of the mold-forming unit 300, with a plurality of air spraying nozzles formed along the air passage at regular intervals, thus spraying highly pressurized air to the mold-forming unit 300 through the air injection nozzles and cooling the top and bottom molds 310 and 320.

Second, a plastic forming process of producing the plastic product 100 of FIGS. 6a and 6b according to the second embodiment will be described herein below with reference to FIG. 13.

In the plastic forming process of producing product 100 according to the second embodiment, the extrusion step (S1), cutting step (S2), feeding step (S3), mold closing step (S4), and perforating step (S5) are sequentially performed in the same manner as that described for the primary embodiment. However, after the perforating step (S5), a filler-injecting step (S6') in place of the blowing step (S6) of the primary embodiment of FIG. 11f is performed to fill the cavity of the body 101 with filler 110. After the filler-injecting step (S6'), the mold opening step (S7) and the ejecting step (S8) is sequentially performed in the same manner as that described for the primary embodiment.

Third, a plastic forming process of producing the plastic product 100 of FIGS. 7a and 7b according to the third embodiment further includes the step of forming the rectangular opening 107 on the product 100, which is different from the process according to the second embodiment. This additional step is performed with a movable core installed in the molds of the mold-forming unit 300.

That is, in the plastic forming process of producing the plastic product 100 according to the third embodiment, the extrusion step (S1), cutting step (S2) and feeding step (S3)

are sequentially performed in the same manner as that described for the second embodiment. However, the desired rectangular opening 107 is formed on the product 100 using a movable core installed at the mold-closing step (S4). After the opening 107 is formed on the product 100 at the mold closing step (S4), the perforating step (S5), filler injecting step (S6'), the mold opening step (S7) and the ejecting step (S8) are sequentially performed in the same manner as that described for the second embodiment.

Fourth, a plastic forming process of producing the plastic product 100 of FIGS. 4 and 5g according to the fourth embodiment further includes a step of forming the communication hole 103a at each rib 103 to allow the cavities 104 of the body 101 to communicate with each other, different from the process according to the primary embodiment. In such a case, a machine installed at the core 218 of the extrusion-molding unit 200 forms the communication holes 103a of the ribs 103.

That is, in the plastic forming process of producing the plastic product 100 of the oil tank type according to the fourth embodiment, the desired communication holes 103a are formed at the ribs 103 at the extrusion step (S1). Thereafter, the cutting step (S2), feeding step (S3), mold closing step (S4), perforating step (S5), blowing step (S6), mold opening step (S7) and the ejecting step (S8) are sequentially performed in the same manner as that described for the primary embodiment.

Fifth, a plastic forming process of producing a plastic product 100 of the flat or corrugated panel type of FIGS. 8a and 8b according to the fifth embodiment includes an extrusion and filling step (S1') prior to performing the cutting step (S2) as shown in FIG. 14. In the extrusion and filling step (S1'), filler 110 is injected into the body 101 while forming the body through an extrusion molding process, thus integrating the filler 110 with the sidewall 102 of the body 101. The remaining steps of this plastic forming process will be described in detail later herein.

The plastic forming process of producing the plastic product 100 of FIGS. 6a and 6b according to the second embodiment may be added with an injection molding step as shown in FIG. 14, different from the process of FIG. 13. This process having the injection molding step is accomplished by installing the product 100 of FIGS. 8a and 8b according to the fifth embodiment in the cavity of the top and bottom molds of a mold-forming unit 300 prior to injecting another melted resin into the cavity of the molds, thus forming desired walls at the open ends of the plastic structural body 101 of the product 100.

That is, the plastic forming process of producing the product 100 according to the fifth embodiment of FIG. 14 comprises: an extrusion and filling step (S1') of injecting a hot filler 110 in place of hot air into the body 101 while forming the body 101 through an extrusion process; a cutting step (S2) of cutting the body 101 to form a desired body 101 having a predetermined length; a feeding step (S3) of feeding the body 101 to a mold-forming unit 300; a mold closing step (S4) of closing the top and bottom molds of the mold-forming unit 300 to each other to cut and close the both ends of the body 101 within the cavity of the upper and lower mold; a perforating step (S5) of forming a plurality of holes on the sidewall of the body 101 set within the top and bottom molds of the mold-forming unit 300; an injection molding step (S6") of injecting melted resin into the cavity of the two molds to form desired walls at the open ends of the body 101; a mold opening step (S7) of separating the top mold from the bottom mold of the mold-forming unit 300; and an ejecting step (S8) of ejecting the body 101 from the cavity of the molds.

Figure 15:
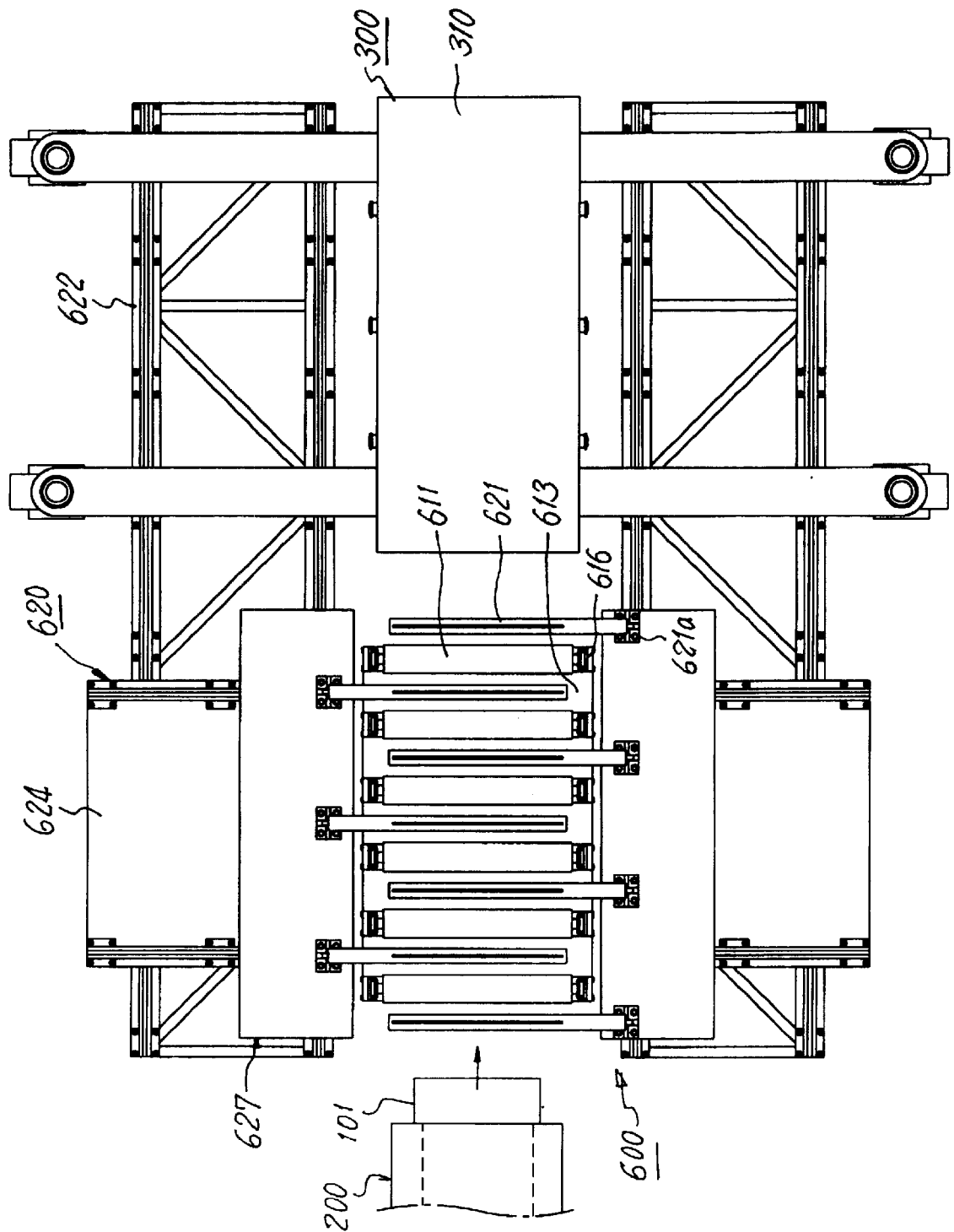
Figure 16:
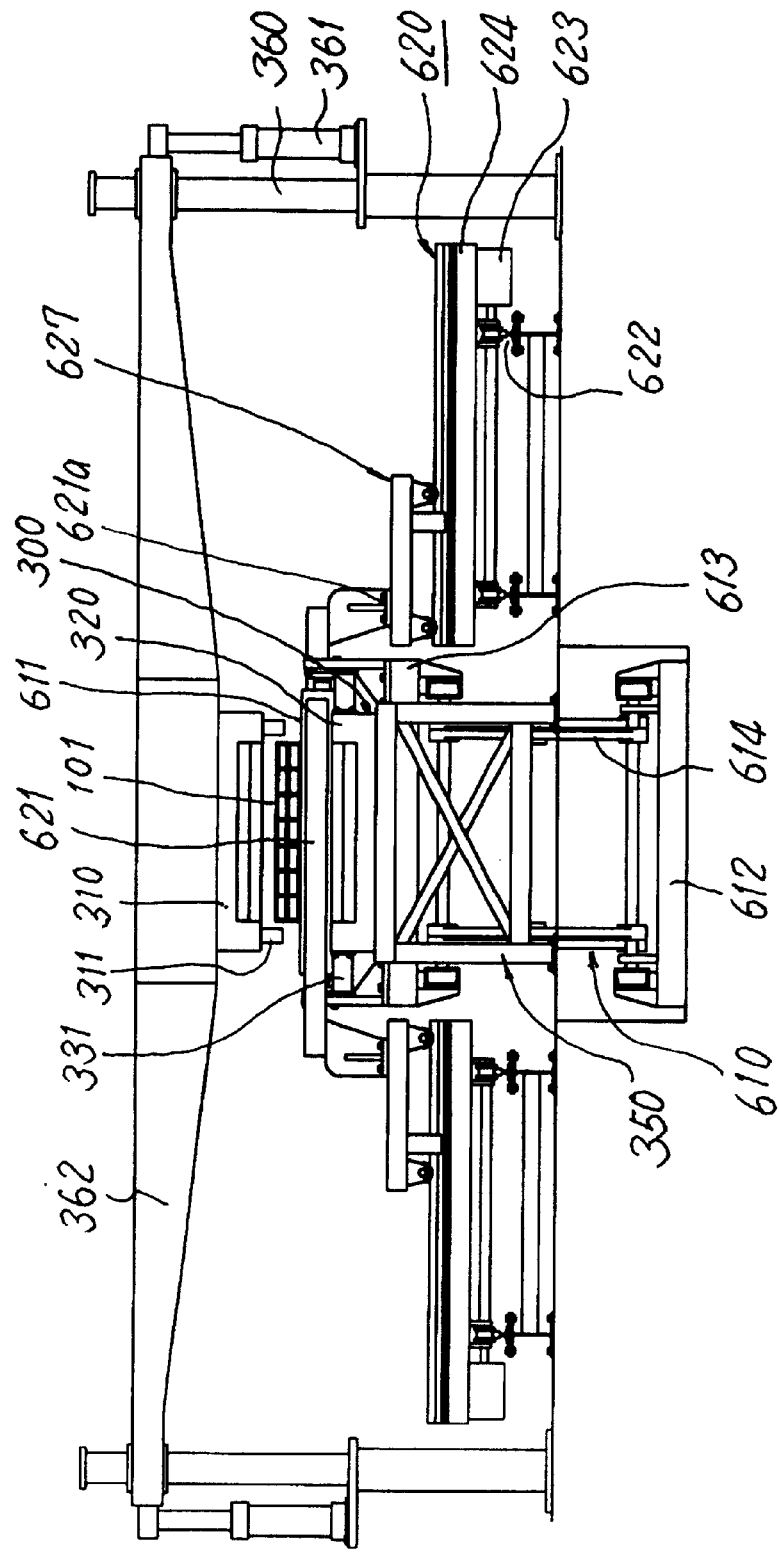
Figure 17:
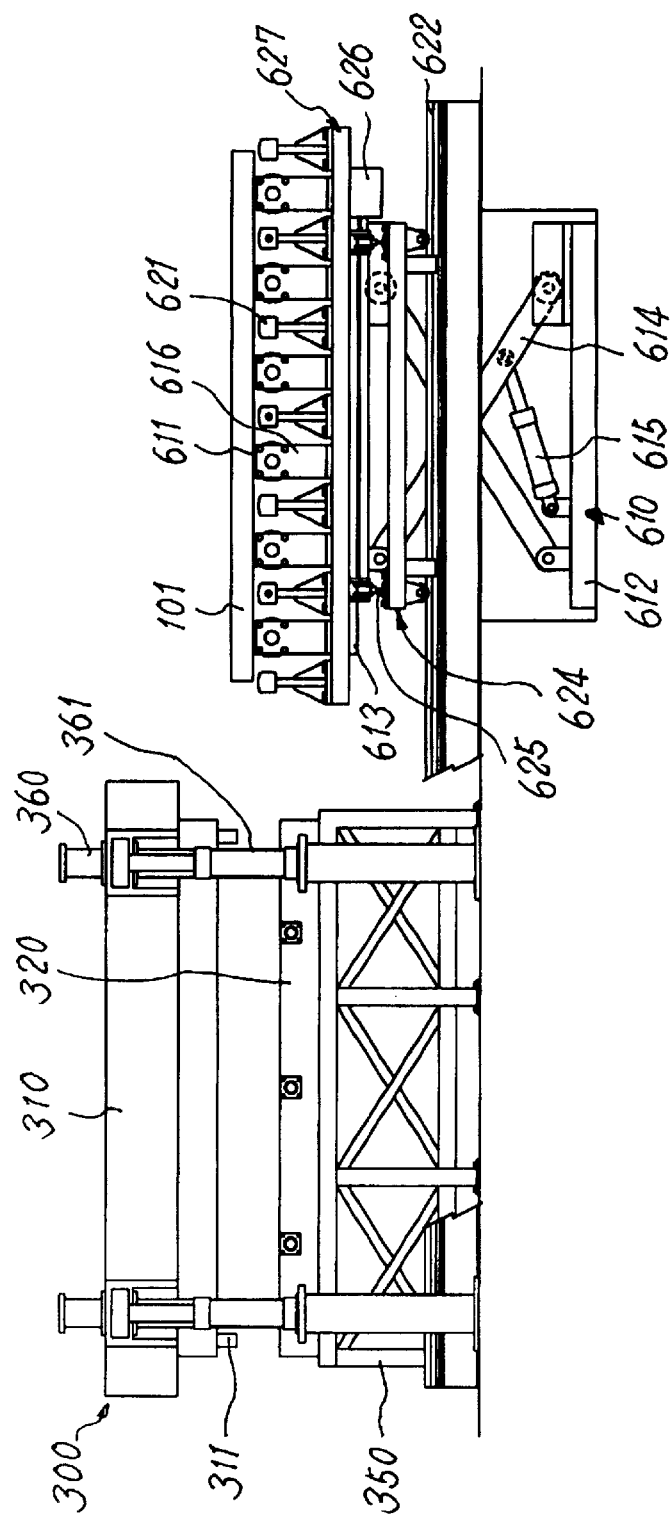
Figure 18:
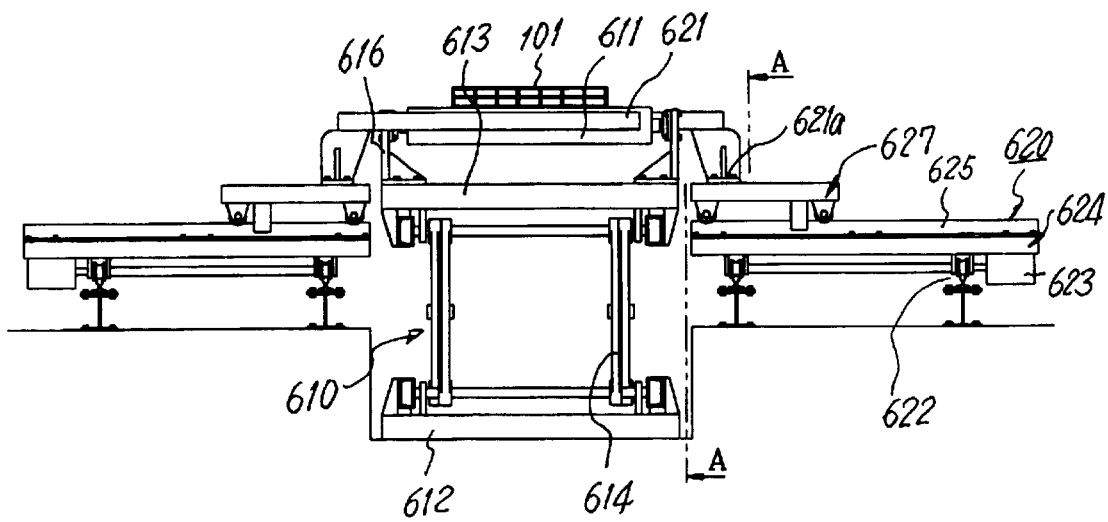
Figure 18:
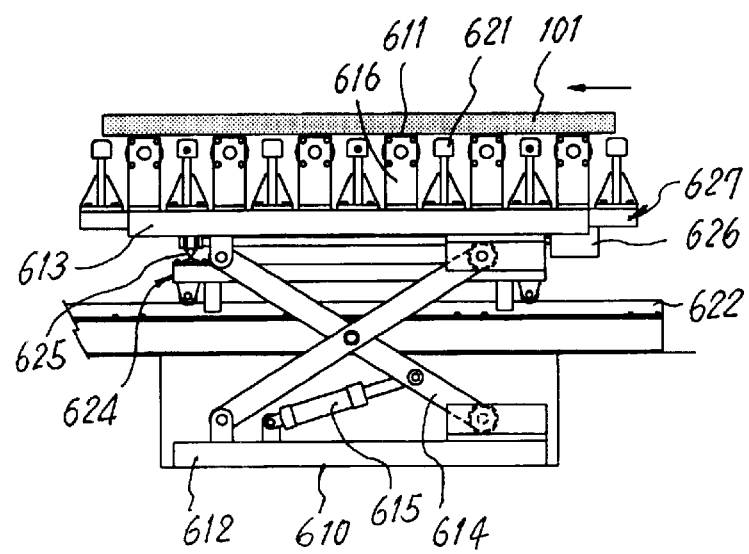
Figure 19:
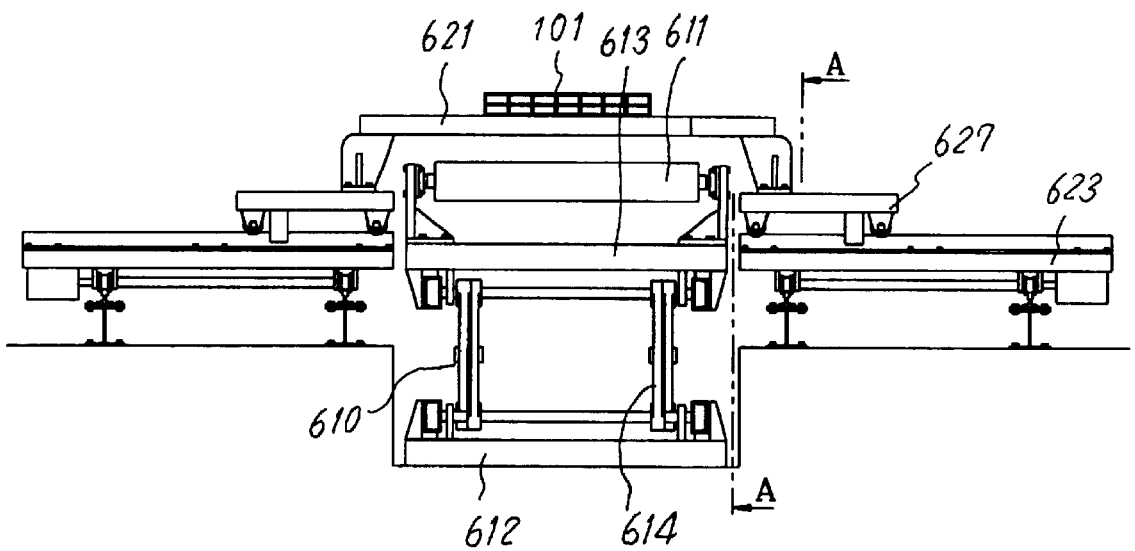
Figure 19:
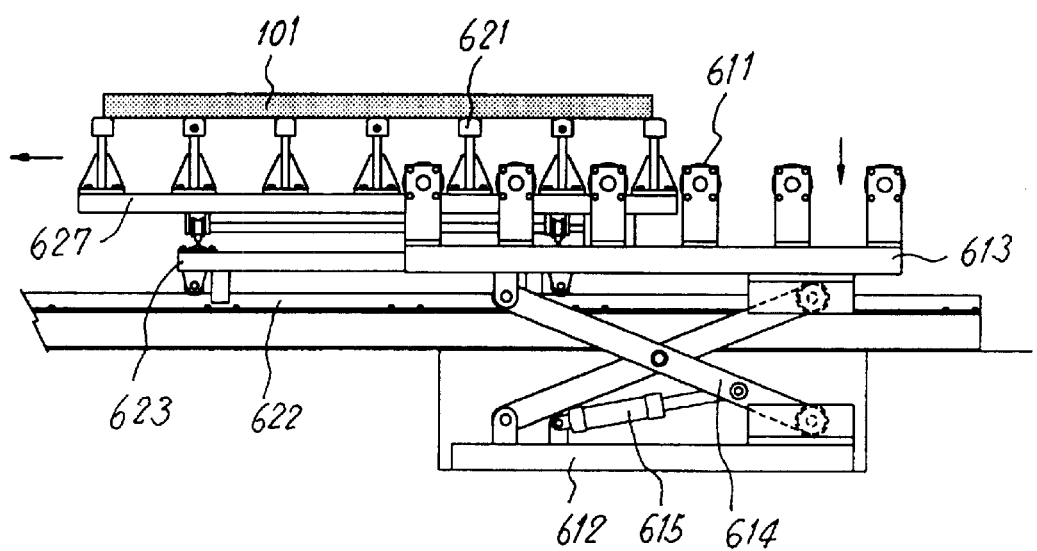

FIGS. 15 to 40 are views of the plastic forming devices in accordance with the present invention. In the drawings, FIG. 15 shows a plastic forming device in accordance with an embodiment of the present invention, FIG. 16 shows both the feeding unit and the mold-forming unit included in the plastic forming device, and FIG. 17 shows both the feeding unit and the mold-forming unit of FIG. 16.

Figure 35:
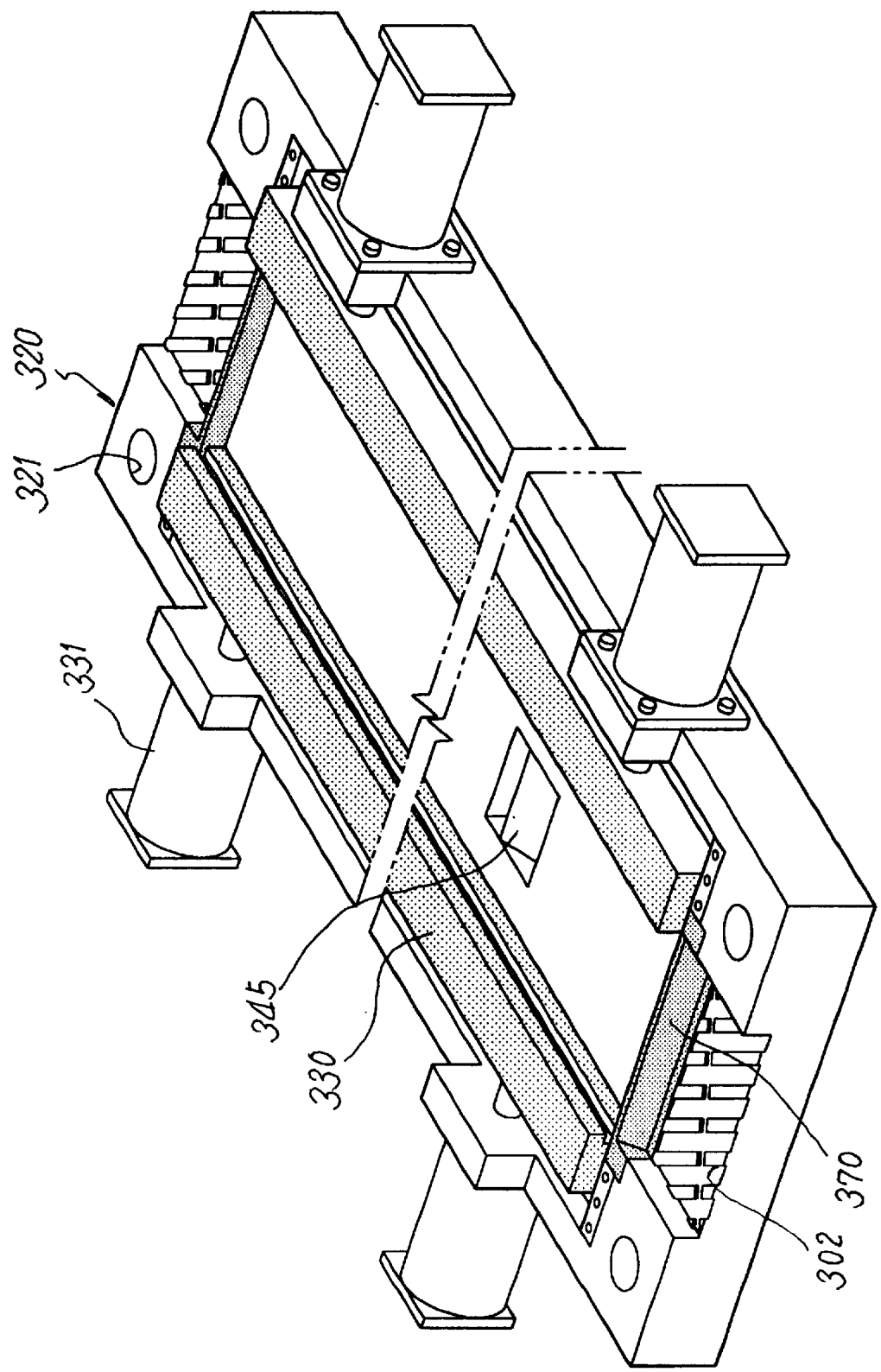
Figure 36:
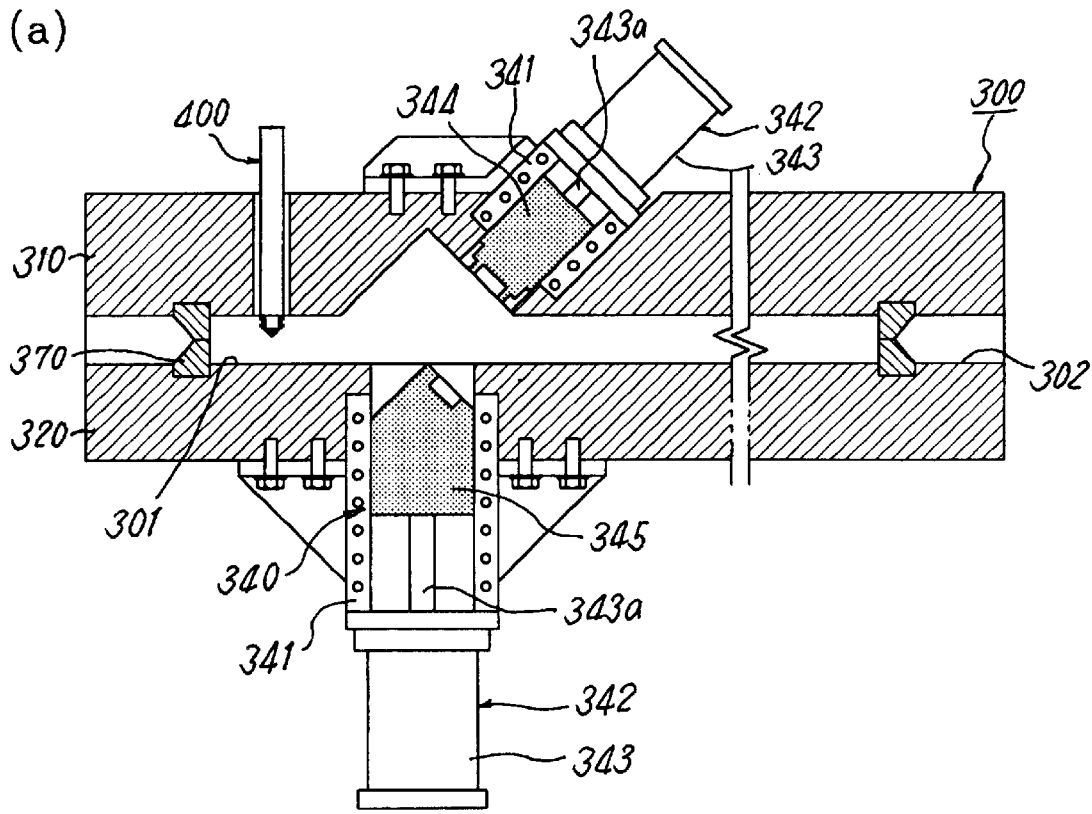
Figure 36:
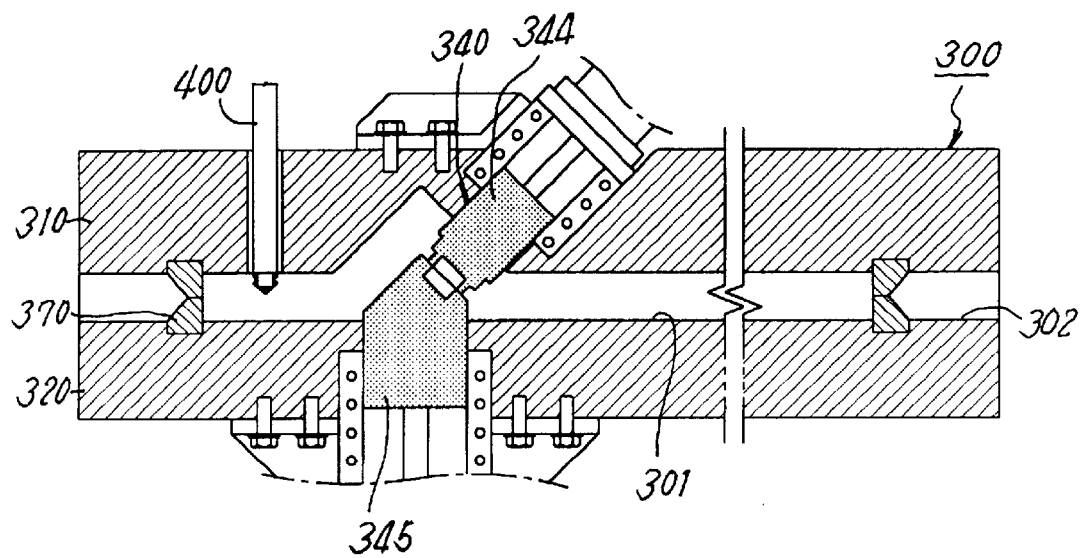
Figure 37:
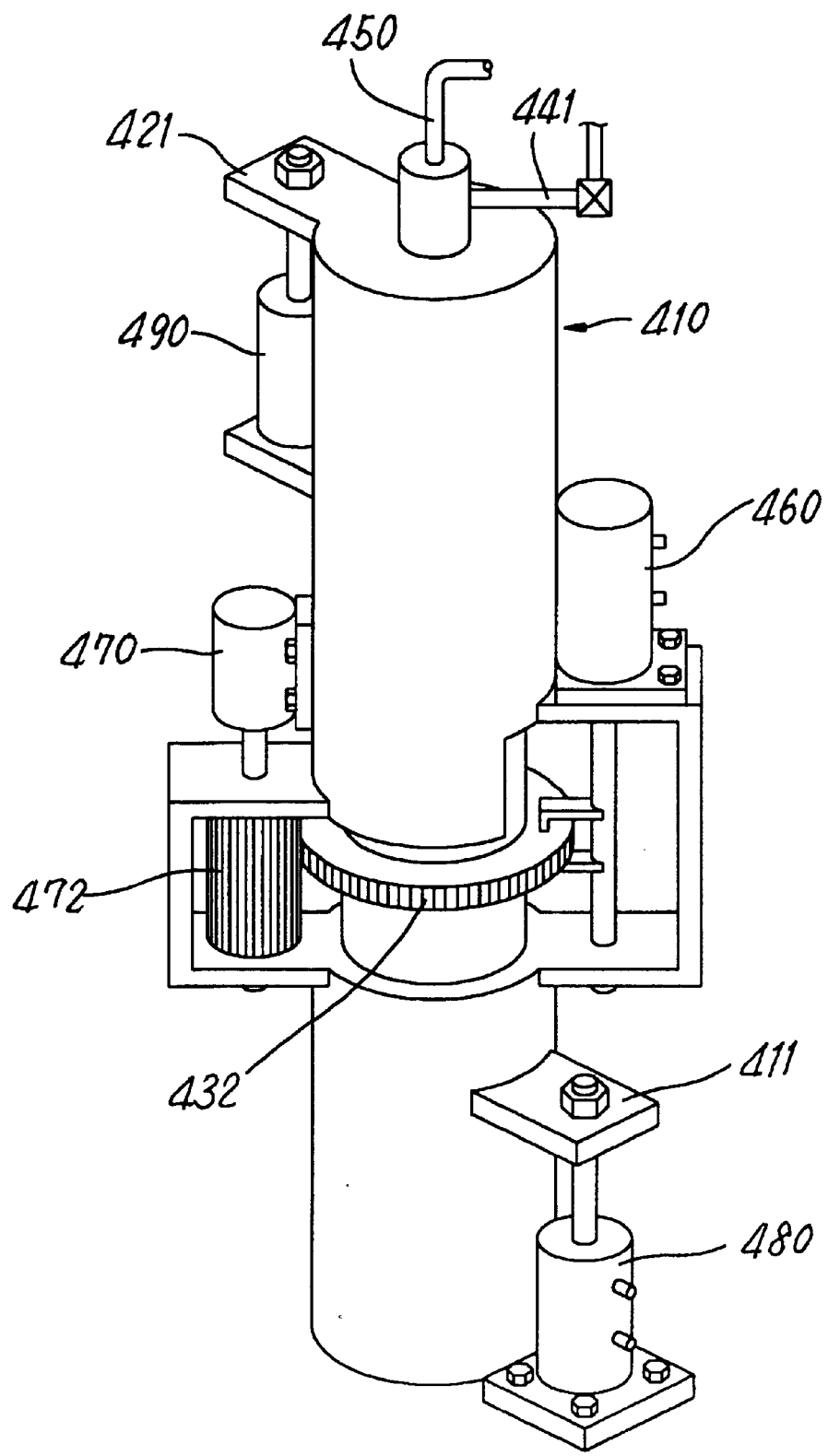
Figure 38:
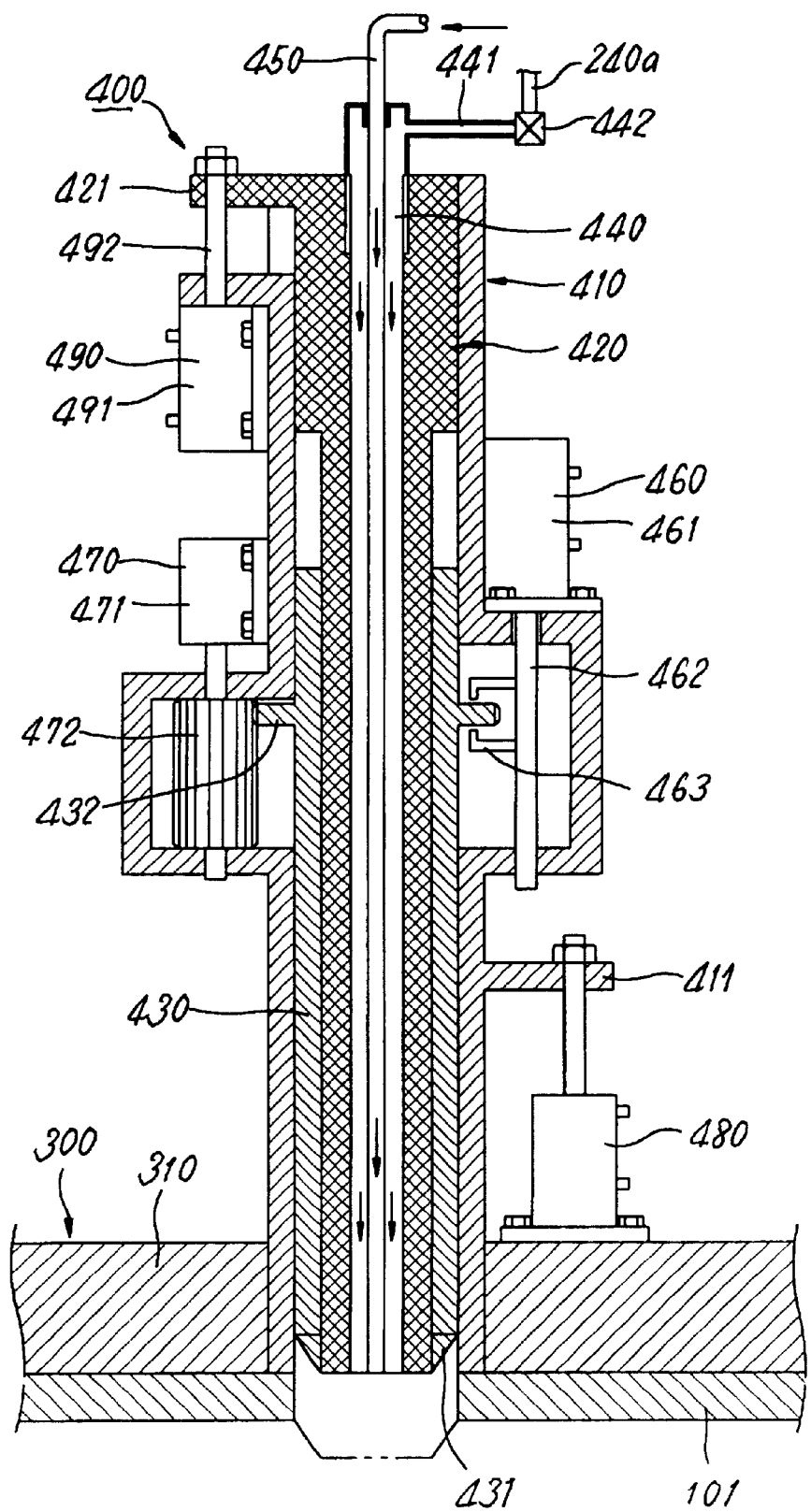
Figure 39:
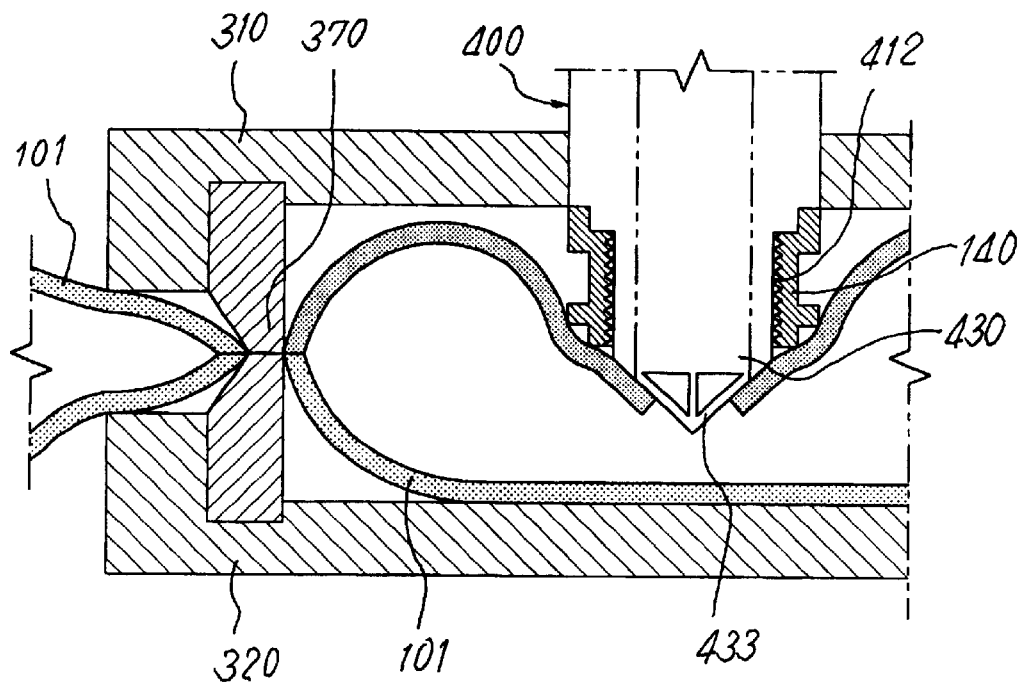
Figure 39:
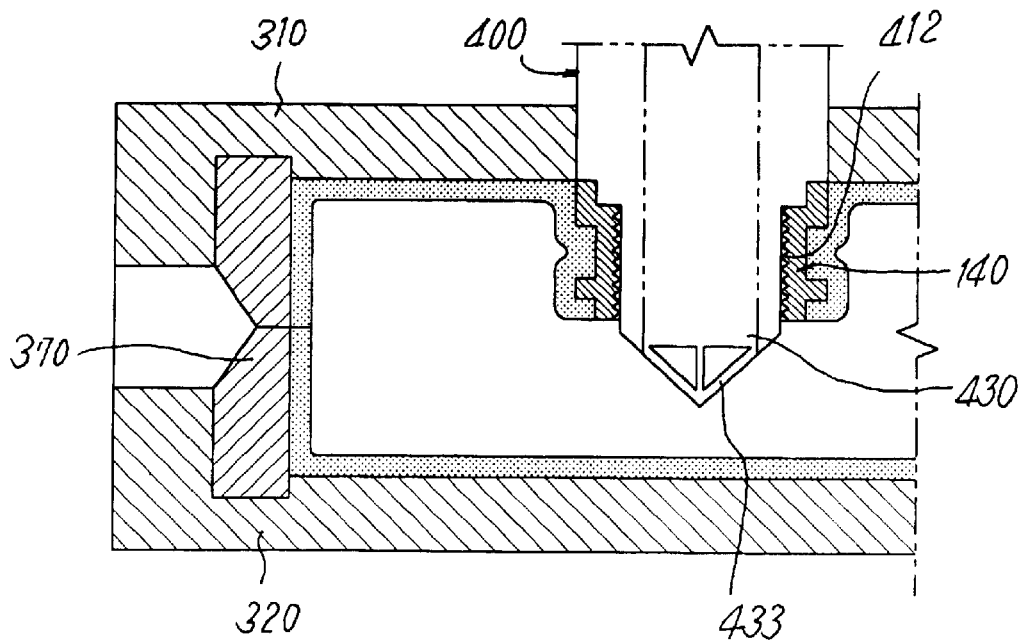

FIGS. 22 to 33 are views, showing both the manifold and the rib thickness-adjusting unit included in the plastic forming device of this invention. FIG. 35 is a perspective view, showing the construction of the mold included in the mold-forming unit of the present invention. FIGS. 36a and 36b are views, showing the operation of the mold-forming unit of the present invention. FIGS. 37 and 38 are perspective and longitudinal sectioned views of the perforating and injecting unit included in the plastic forming device of the present invention.

As shown in the drawings, the plastic forming device of the present invention comprises an extrusion-molding unit 200, a mold-forming unit 300, and a feeding unit 600. The extrusion-molding unit 200 extrudes a melted plastic material to produce a plastic structural body 101, in addition to injecting air or urethane into the interior of the body 101. The mold-forming unit 300 seats the body 101 fed from the extrusion-molding unit 200 to perform a blowing step, an injection step, and a filling step, in addition to forming the body 101. The feeding unit 600 feeds the body 101 from the extrusion-molding unit 200 to the mold-forming unit 300 so as to seat the body 101 in the mold-forming unit 300.

In a preferred embodiment of this invention, the plastic forming device has an extrusion molding unit 200 used for extruding a plastic structural body 101 having one or more cavities 104 inside its sidewall 102. A plurality of injection pipes 215 are installed in the extrusion head 210 of the unit 200 for injecting hot air or a filler 110, such as urethane, into the cavities 104 of the body 101. A mold-forming unit 300 is installed in back of the extrusion-molding unit 200. A feeding unit 600 feeds the body 101 from the extrusion-molding unit 200 to the mold-forming unit 300 so as to seat the body 101 in the mold-forming unit 300. A plurality of perforating and injecting units 400 are installed at the mold-forming unit 300 for perforating the sidewall 102 of the body 101 and injecting hot air into the cavities 104 of the body 101 to perform a blowing step or injecting a filler 110 into the cavities 104 of the body 101. The plastic forming device thus produces a desired plastic structural body 101, of which the sidewall 102 is completely continuous and seals the cavities 104, by continuously performing the desired steps selected from the extrusion step, blowing step, injection forming step, and filling step.

Figure 22:
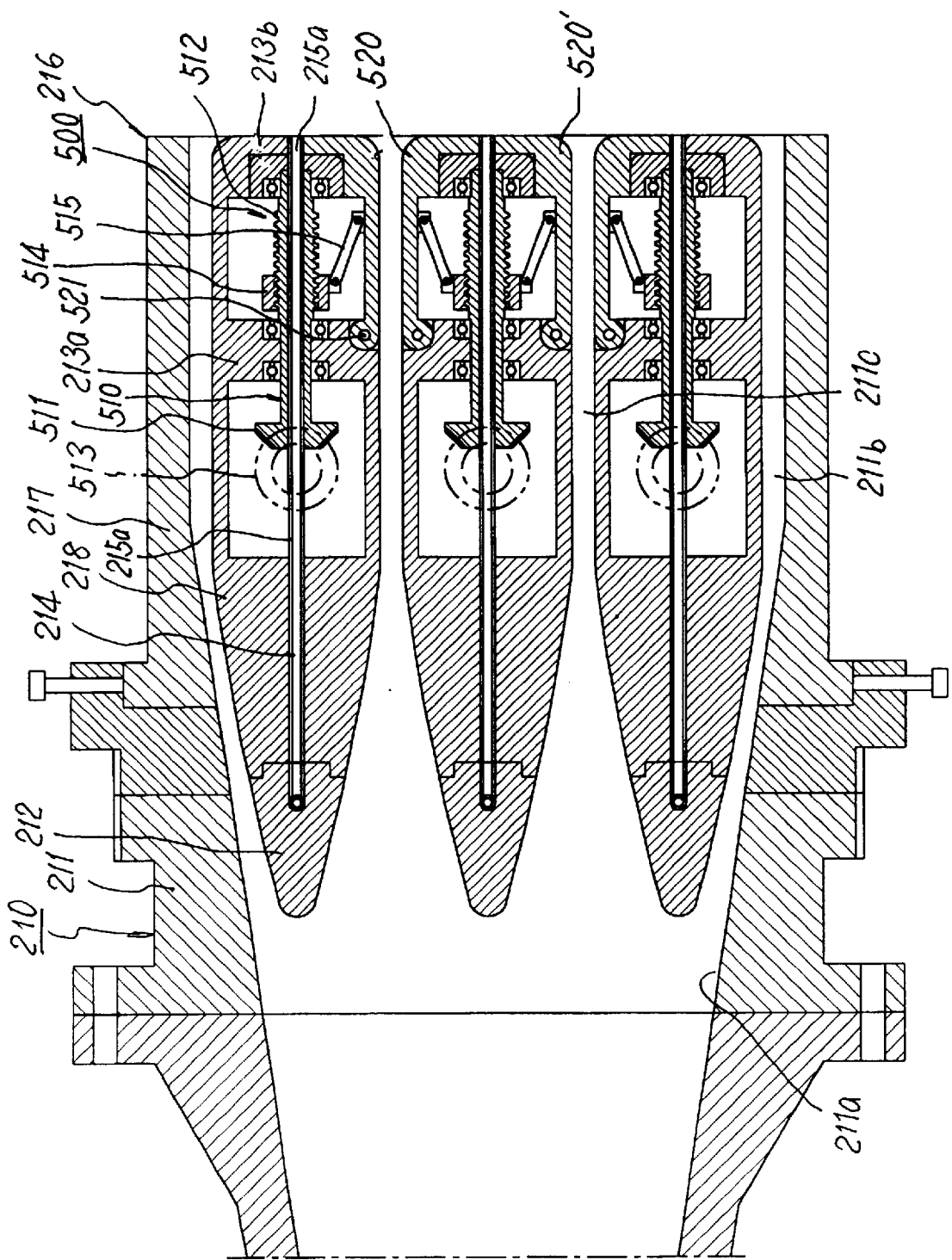
Figure 23:
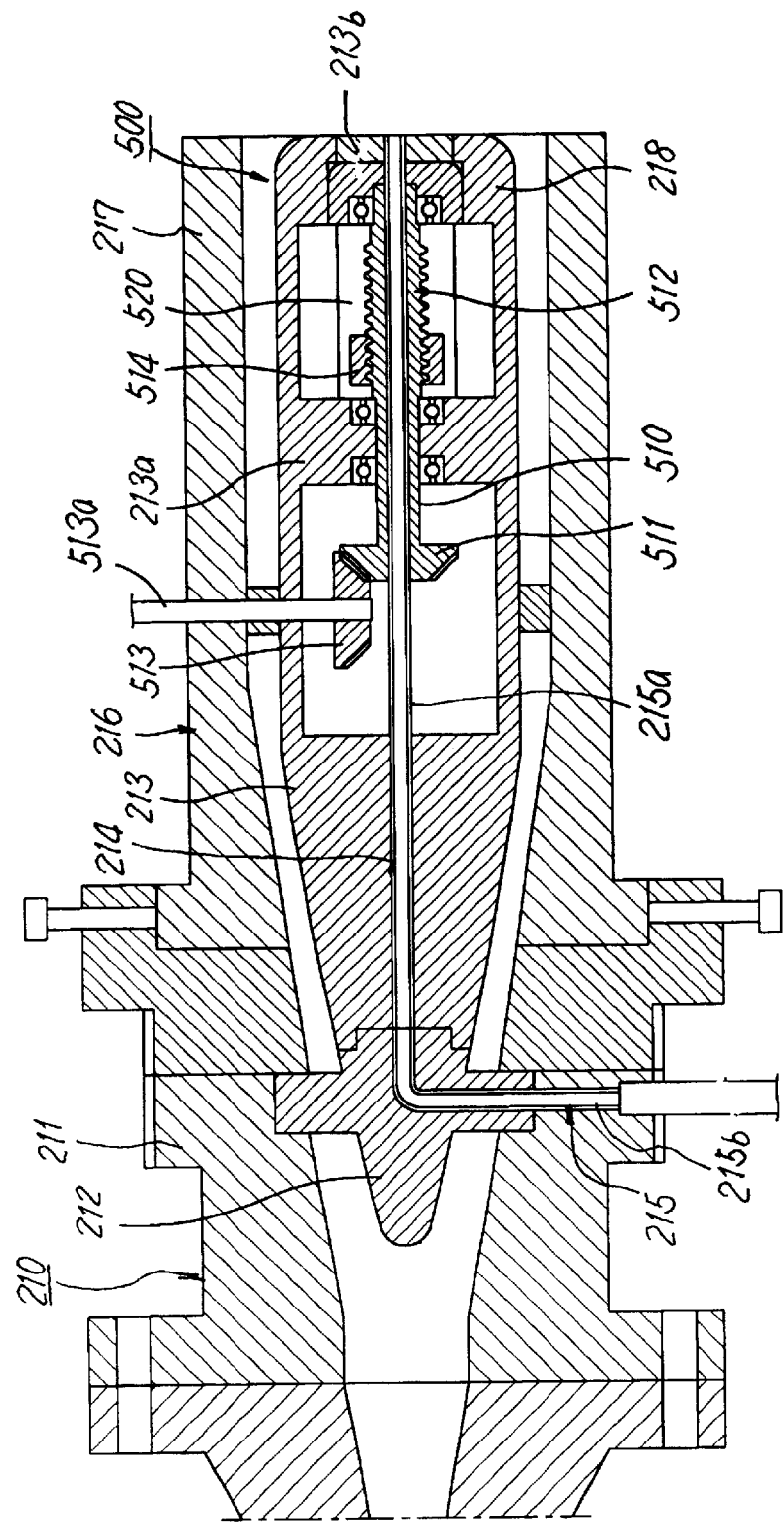
Figure 24:
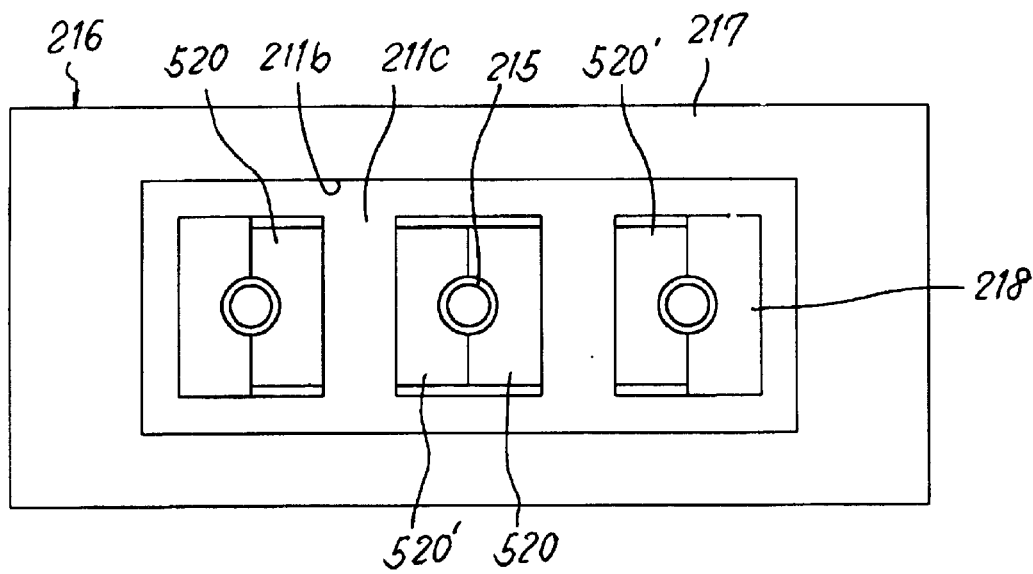
Figure 24:
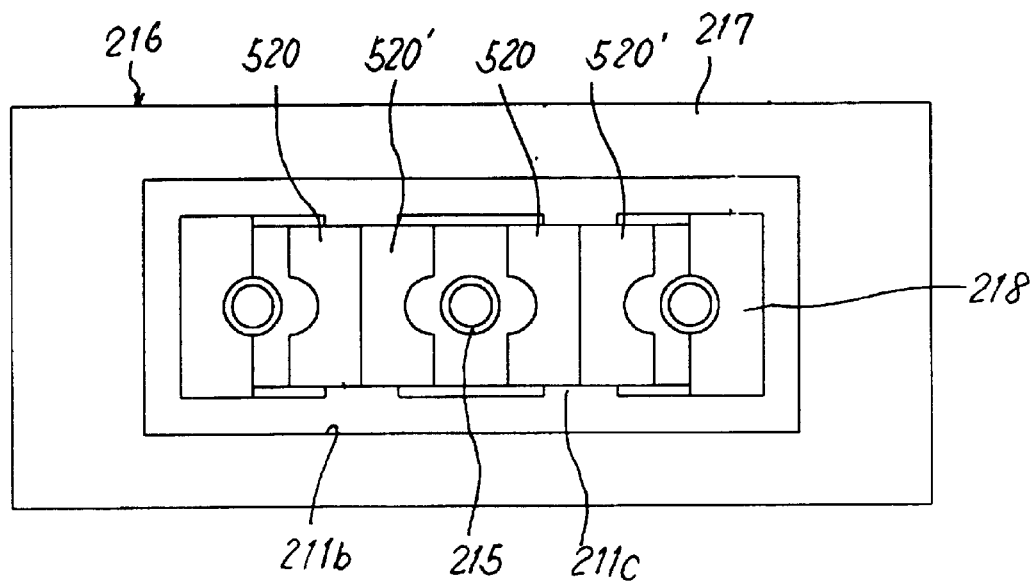
Figure 25:
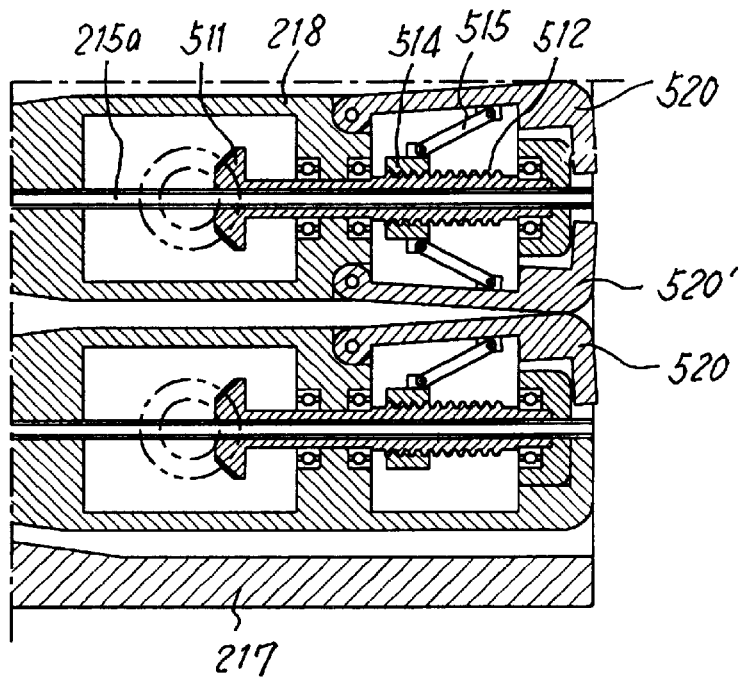
Figure 25:
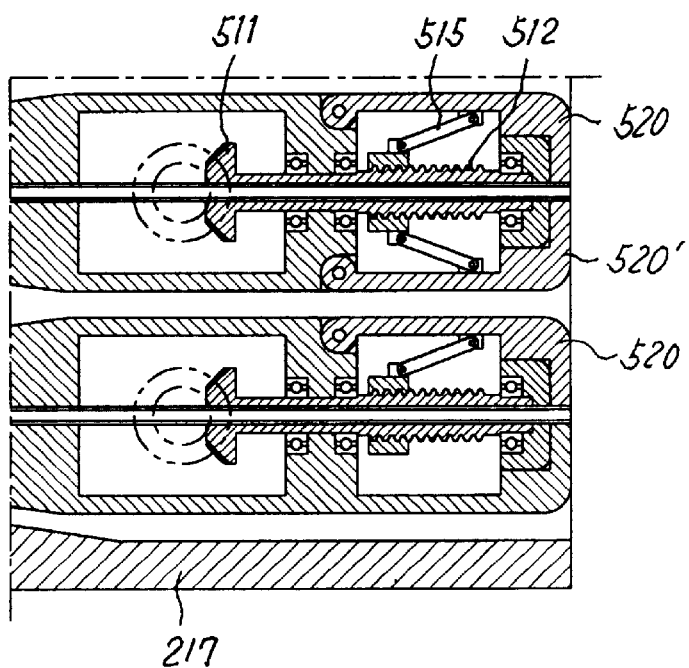

As shown in FIGS. 22 to 24, in the extrusion head 210 of the extrusion molding unit 200, the manifold 216 of the head body 211 comprises a housing 217 and a plurality of cores 218 set within the housing 217, with a plastic feeding part 211a provided at the tip of the housing 217 for longitudinally feeding a melted plastic material to the manifold 216. A torpedo 212 is assembled with the tip of each core 218, while an injection passage 214 is longitudinally formed along the central axis of both the torpedo 212 and the core 218 for accomplishing an injection of fluid, such as air or urethane. An injection pipe 215 extends from the outside of the extrusion-molding unit 200, and passes through each injection passage 214. A melted plastic material is fed to the plastic feeding part 211a of the unit 200, and is extruded through the molding part 211b defined by the housing 217 and the cores 218 of the manifold 216, thus becoming a plastic structural body 101. In such a case, a fluid injected from the injection pipes 215 and the injection passages 214 fills in the interior of the body 101.

Each of the cores 218 are connected to the inner surface of the manifold 216 by means of a curved connector 218d designed to be less likely to resist the flow of melted plastic material within the manifold 216. In the case of an arrangement of a plurality of upper and lower cores 218 inside the manifold 216, the upper and lower cores 218 are connected to each other by means of such curved connectors 218d.

In the present invention, air or urethane as the fluid may be injected into the body 101 through the injection passages 214 and the injection pipes 215. Of course, it should be understood that another fluid instead of air or urethane might be injected into the interior of the body 101.

In the device of this invention, the extrusion molding unit 200, mold-forming unit 300, and feeding unit 600 are arranged along the same line. The feeding unit 600 is used for feeding the body 101 from the extrusion-molding unit 200 to the mold-forming unit 300 prior to seating the body 101 in the mold-forming unit 300.

As shown in FIGS. 15 to 17, the feeding unit 600 comprises a plurality of feeding guide rollers 611 arranged between the extrusion-molding unit 200 and the mold-forming unit 300, and feeds the body 101 from the extrusion-forming unit 200 to the mold-forming unit 300 prior to seating the body 101 in the mold-forming unit 300. A roller supporter 610 supports the guide rollers 611 such that the guide rollers 611 are movable in a vertical direction in a predetermined stroke. A plurality of feeding bars 621 are arranged between the guide rollers 611, and feed the body 101 from the extrusion-molding unit 200 to the mold-forming unit 300 in cooperation with the guide rollers 611. A truck unit 620 is provided at each side of the roller supporter 610, and supports the feeding bars 621 such that the bars 621 are movable in longitudinal and transverse directions to the structural body feeding passage.

The roller supporter 610 has a base plate 612, which is seated on the bottom of a depression formed on the support surface for the plastic forming device. A lifting plate 613 is installed on the base plate 612. The roller supporter 610 also has a X-shaped link mechanism 614, which is actuated by a cylinder actuator 615 to move the lifting plate 613 in a vertical direction. The feeding guide rollers 611 are held onto brackets 616, which are installed at opposite sides of the top surface of the lifting plate 613.

The truck unit 620 comprises a plurality of longitudinal rails 622, longitudinally and parallel arranged along both sides of the structural body feeding passage. Two longitudinal trucks 624, actuated by drive motors 623, are seated on the longitudinal rails 622 to be movable along the rails 622. Two transverse rails 625 are provided on the top surface of each of the two trucks 624. Two transverse trucks 627, actuated by drive motors 626, are seated on the transverse rails 625 to be movable along the rails 625. The feeding bars 621 are held on the top surfaces of the transverse trucks 627 at their fixed ends 621a.

In the mold-forming unit 300, the bottom mold 320 is fixed onto a base plate 350 installed on the support surface, while the top mold 310 is positioned above the bottom mold 320 such that it has lifting ability and does not interfere with the feeding unit 600 during movement of the feeding unit 600. That is, a plurality of guide columns 360 stand upright at positions outside the longitudinal moving area of the feeding unit 600. A movable beam 362, having the top mold 310 and actuated by cylinder actuators 361, is assembled with the guide columns 360 such that the movable beam 362 is movable along the guide columns 360 in a vertical direction.

The top and bottom molds 310 and 320 of the mold-forming unit 300 are provided with a plurality of positioning projections 311 and positioning grooves 321 respectively for precisely aligning the two molds 310 and 320 to each other.

The feeding unit 600 is operated as follows:

When a plastic structural body 101 is discharged from the manifold 216 of the extrusion molding unit 200, the body 101 is primarily laid on the top of the guide rollers 611 and feeding bars 621 of the feeding unit 600 as shown in FIGS. 11, and 15 to 17.

When a predetermined length of the body 101 is discharged from the manifold 216 onto the top of the rollers 611 and bars 621 of the feeding unit 600, the body 101 is cut by the cutter 250 installed at the discharge terminal of the extrusion-molding unit 200.

FIGS. 18a and 18b show the body 101 laid on the guide rollers 611 and the feeding bar 621 of the feeding unit 600.

Figure 20:
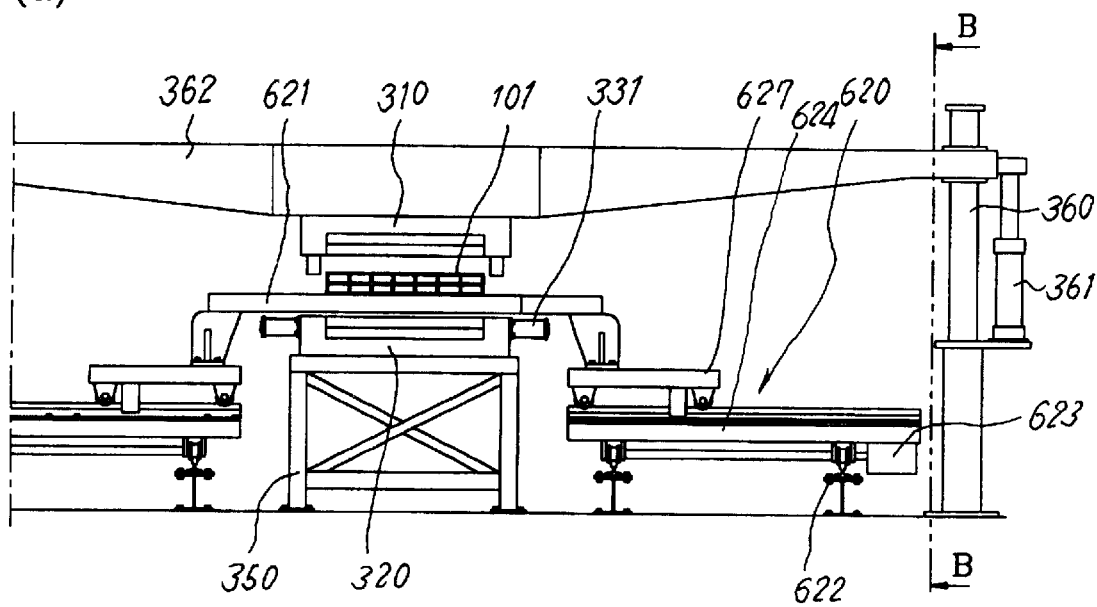
Figure 20:
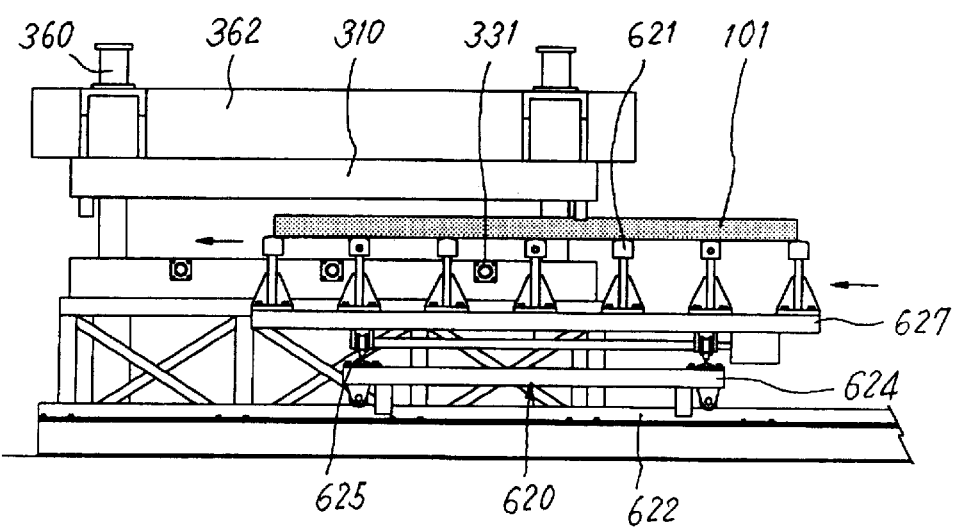
Figure 21:
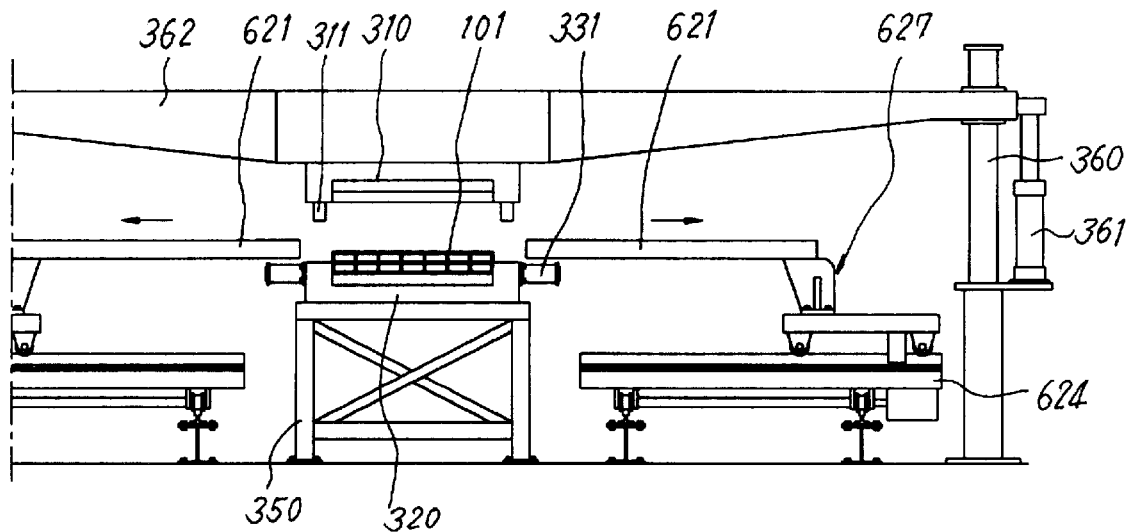
Figure 21:
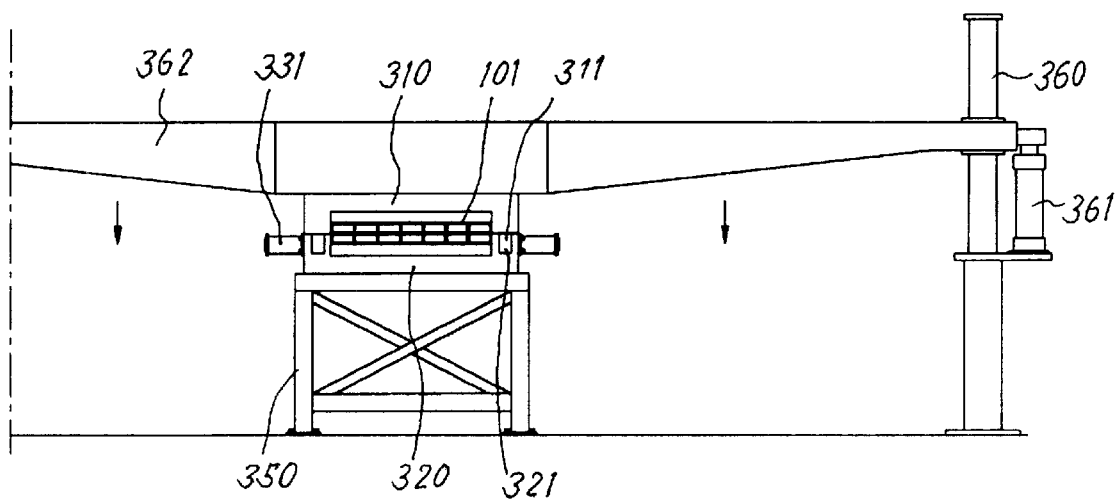

In such a case, the guide rollers 611 are lowered to a predetermined height by the roller supporter 610 as shown in FIGS. 19a and 19b so as to be free from interfering with the feeding bars 621 during longitudinal movement of the bars 621. Thereafter, the longitudinal trucks 624 of the feeding unit 600 are moved in a longitudinal direction, the body 101 on the guide bars 621 is moved in the same direction to reach the gap between the top and bottom molds 310 and 320 of the mold-forming unit 300 as shown in FIGS. 11c and 20. Thereafter, the transverse trucks 627 on the longitudinal trucks 624 are moved away from each other as shown in FIGS. 11d and 21a, and so the feeding bars 621 are moved in the same directions to install the body 101 into the lower mold 320 of the mold-forming unit 300. Thereafter, the trucks 624 and 627 and the feeding bars 621 of the feeding unit 600 are returned to their original positions.

When the body 101 is installed in the lower mold 320 of the mold-forming unit 300, the top mold 310 is actuated by the cylinder actuators 361 and is lowered along the guide columns 360 as shown in FIGS. 11e and 21b. In such a case, the top and bottom molds 310 and 320 are precisely aligned with each other due to the positioning projections 311 and the positioning grooves 321. A cutter 370 of the mold-forming unit 300 cuts both end portions of the body 101.

The rib thickness-adjusting unit 500 is installed in the extrusion head 210 of the extrusion-molding unit 200 as shown in FIGS. 22 to 25. In the rib thickness-adjusting unit 500, each injection pipe 215 is bent to have both a rotating support part 215a and a bent part 215b. The rotating support part 215a longitudinally extends through the central axis of the core 218, while the bent part 215b extends in a transverse direction to the cores 218.

A double gear unit 510, having a first bevel gear 511 and a feed screw 512, is fitted over the rotating support part 215a of the injection pipe 215, and is rotatably held by the middle and rear connectors 213a and 213b of each core 218. A second bevel gear 513 is mounted on a shaft 513a in each core 218, and engages with the first bevel gear 511.

A plurality of communication hole forming plates 520 and 520' are coupled to the middle connector 213a of the core 218 by means of hinge pins 521 such that the plates 520 and 520' are openable in opposite directions. A feeding nut 514 engages with the feed screw 512. The opposite ends of a lever 515 are hinged to the communication hole forming plates 520 and 520' and the both ends of the feed screw 512.

During a plastic forming process, the communication hole forming plates 520 and 520' of the rib thickness-adjusting unit 500 are repeatedly closed as shown in FIGS. 24a and 25a, and opened as shown in FIGS. 24b and 25b.

When the second bevel gears 513 of the rib thickness adjusting unit 500 are rotated in a direction by a driving unit, such as a drive motor, at a position shown in FIGS. 22, 23, 24a and 25a, the first bevel gears 511 are rotated since the first gears 511 engage with the second gears 513. Therefore, the feed screw 512 of the double gear 510 is rotated to make the feeding nut 514 move outward in a longitudinal direction while being rotated. The communication hole forming plates 520 and 520' are opened as shown in FIGS. 24b and 25b. When the second bevel gears 513 are rotated in a reverse direction by the driving unit, the communication hole forming plates 520 and 520' are closed as shown in FIGS. 24a and 25a.

When the communication hole forming plates 520 and 520' are closed as shown in FIGS. 24a and 25a, the rib forming passages 211c of the head body 211 are opened. When the communication hole forming plates 520 and 520' are opened as shown in FIGS. 24b and 25b, the rib forming passages 211c of the head body 211 are closed, thus blocking the flow of the melted plastic material for predetermined portions, and so desired communication holes 103a are formed at the predetermined portions of the ribs 103.

Figure 34:
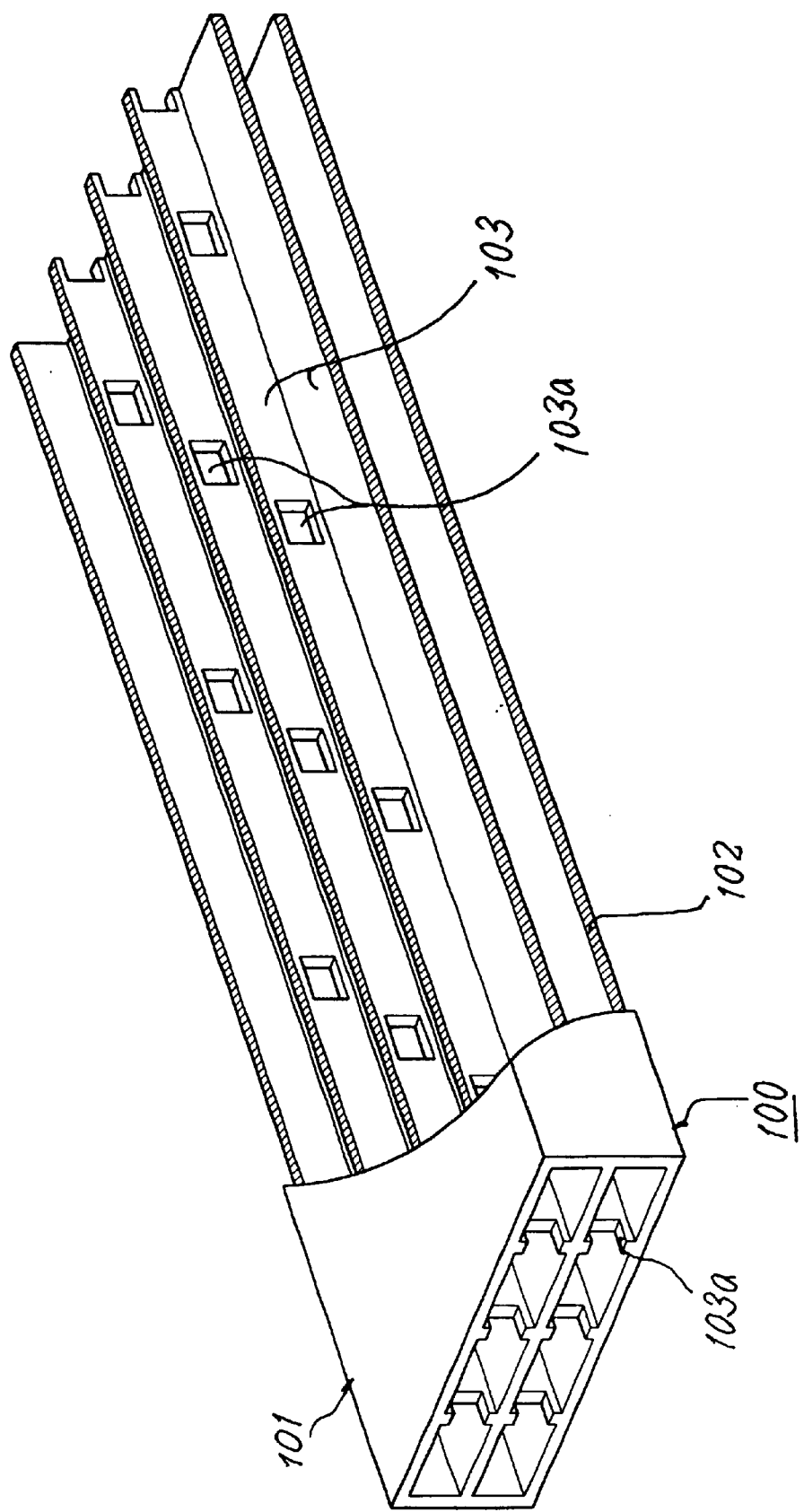

FIG. 34 is a partially broken perspective view of the plastic structural body 101 having such communication holes 103a at the ribs 103.

When the communication holes 103a are formed at the ribs 103 such that the holes 103a are linearly aligned with each other, the holes 103a undesirably reduce the structural strength of the ribs 103. Therefore, it is preferred to form the holes 103a at the ribs 103 such that the holes 103a are misaligned from each other.

In addition, it is preferred to form the communication holes 103a such that the holes 103a provided at both end portions of ribs 103 have a U-shaped profile and are linearly aligned with each other. Such a linear arrangement of the holes 103a provided at both end portions of the ribs 103 allows air to be quickly and uniformly injected into the cavities 104 during an air injecting process performed by the perforating and injecting units 400. However, it should be understood that the number, position and shape of the communication holes 103a might be changed without affecting the functioning of this invention.

In addition, it is possible to adjust the size of the holes 103a by controlling the size of the communication hole forming plates 520 and 520' and/or the time interval between the closing and opening actions of the plates 520 and 520'.

Figure 26:
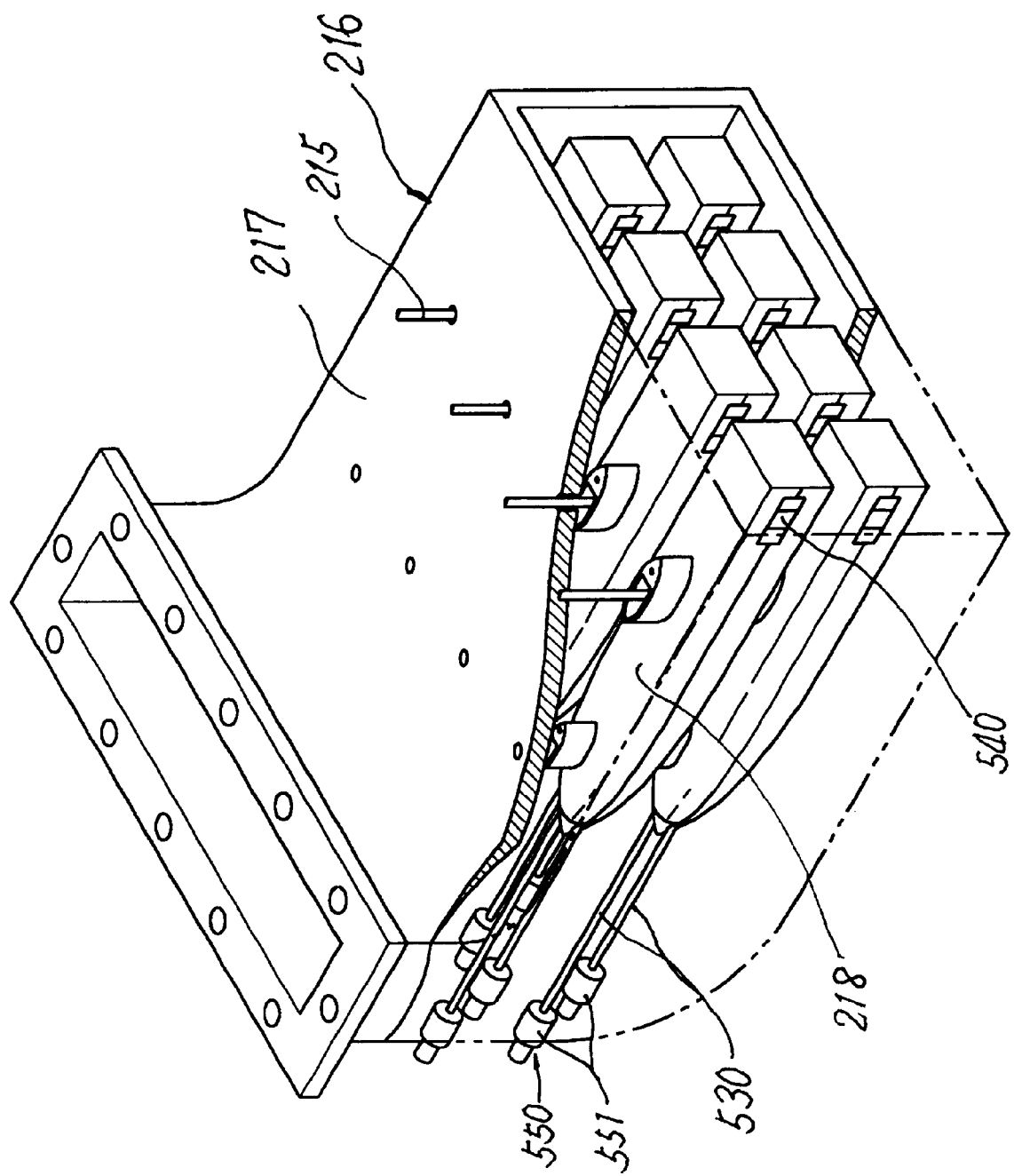
Figure 27:
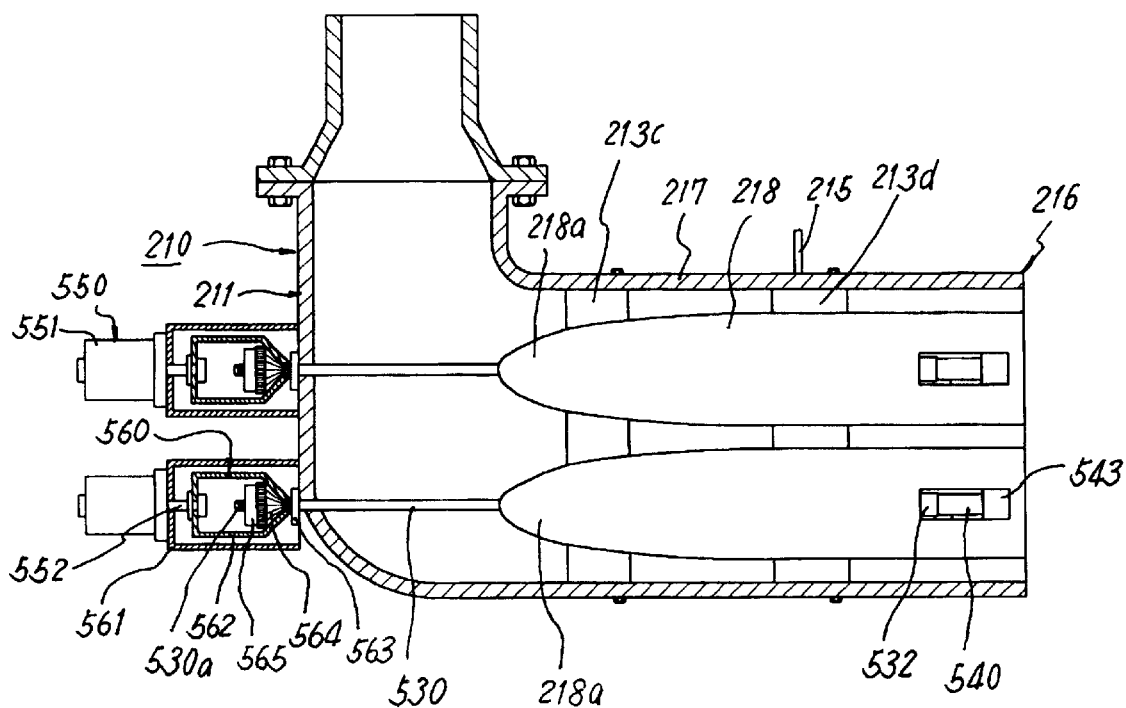
Figure 28:
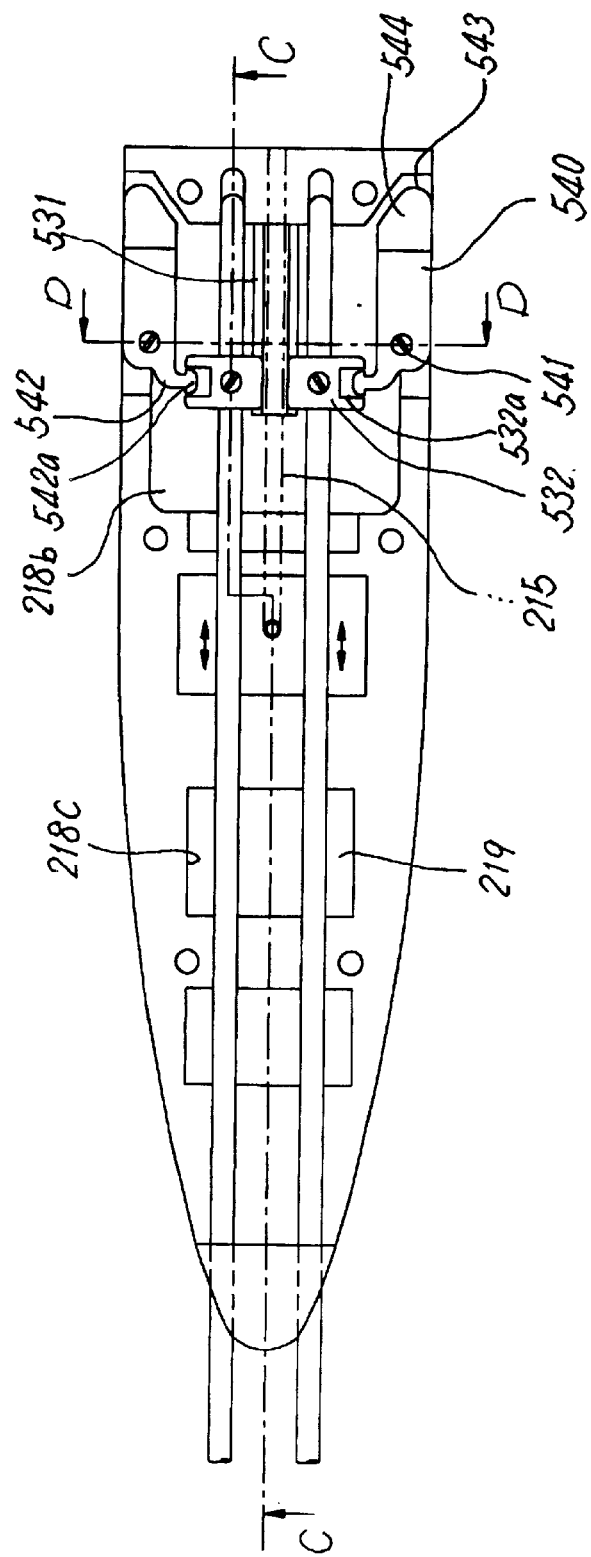
Figure 29:
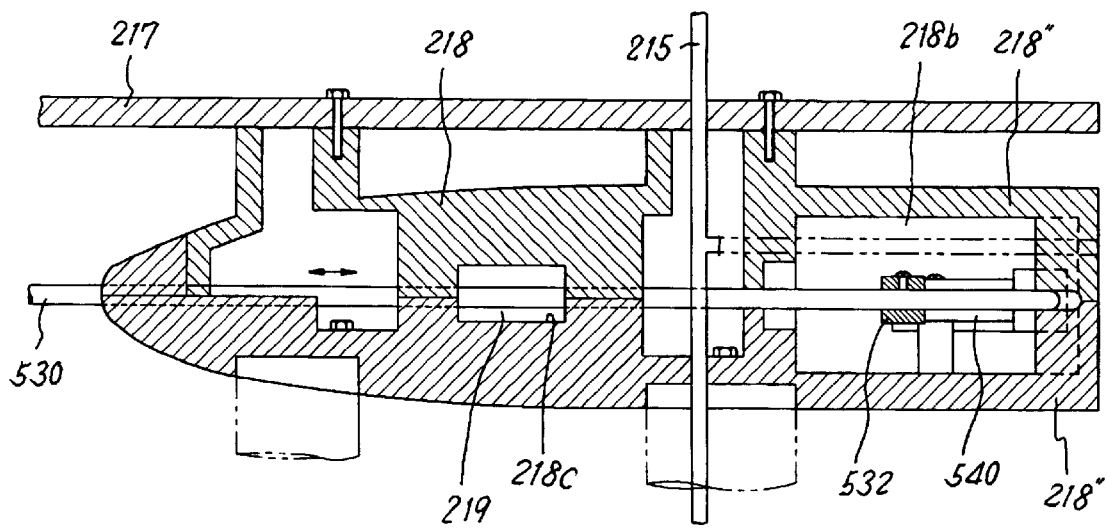
Figure 30:
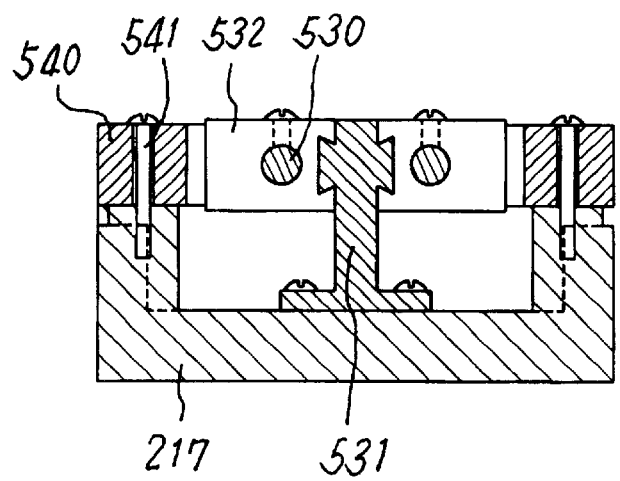
Figure 31:
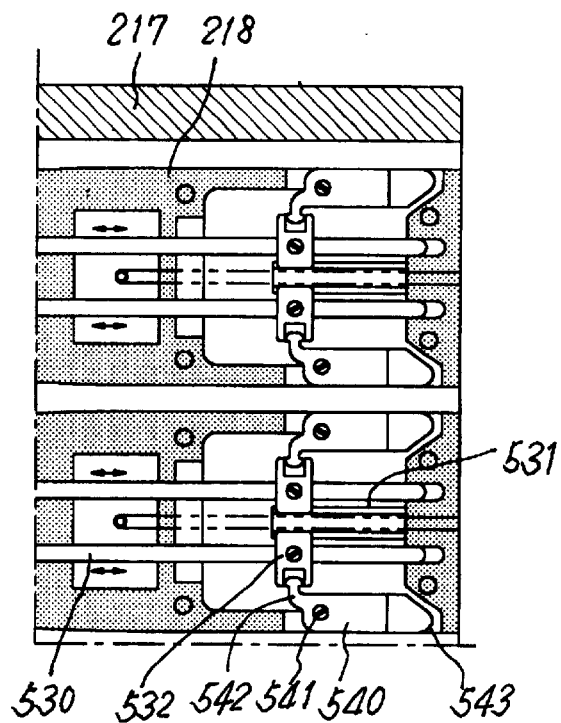
Figure 31:
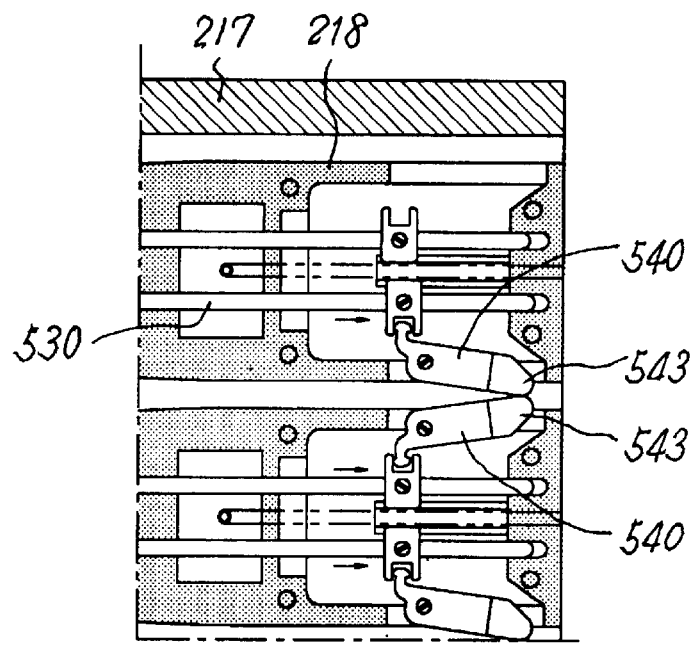
Figure 32:
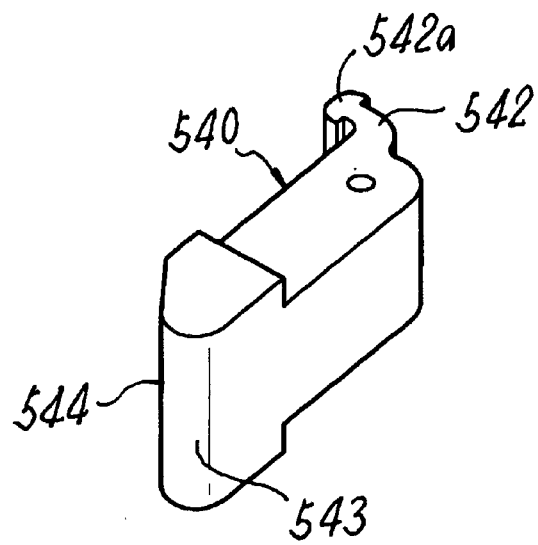

FIGS. 26 to 32 are views, showing both a manifold and a rib thickness-adjusting unit in accordance with another embodiment of this invention. Of the drawings, FIG. 26 is a partially broken perspective view of the manifold and the rib thickness-adjusting unit. FIG. 27 is a longitudinal sectioned view of the manifold and the rib thickness-adjusting unit. FIG. 28 is a plan view of a core unit and the rib thickness-adjusting unit. FIG. 29 is a sectional view of the core unit and the rib thickness-adjusting unit taken along the line C—C of FIG. 28. FIG. 30 is a sectional view of the core unit and the rib thickness-adjusting unit taken along the line D—D of FIG. 28. FIGS. 31a and 31b are views, showing the operation of a communication hole-forming unit included in the plastic forming device. FIG. 32 is a perspective view of the communication hole-forming unit of FIGS. 31a and 31b. In the embodiment, the plastic feeding part 211a, provided at the tip of the manifold's housing 217, is bent at a right angle to feed a melted plastic material to the manifold 216 through a bent passage. A plurality of cores 218 are set within the manifold's housing 217. Each of the cores 218 consists of upper and lower core bodies 218' and 218", and has a curved tip 218a at its front end.

The sidewall of each core 218 has two connectors 213c and 213d, at which the core 218 is mounted to the inner surface of the manifold's housing 217.

The rib thickness-adjusting unit 500 according to the embodiment is installed in the extrusion head 210 of the extrusion-molding unit 200. This rib thickness-adjusting unit 500 comprises a plurality of drive shafts 530, which are axially and rotatably connected to the cores 218. A guide part 531 is provided in the mounting cavity 218b of each core 218, while two sliders 532 are fitted over the middle drive shafts 530, and are assembled with the opposite sides of the guide part 531 such that the sliders 532 are movable in an axial direction. A communication hole-forming member 540 is coupled to the rear portion of each core 218 by a pin 541, and has a connection arm 542 at one end thereof. A hemispherical connector 542a is provided at the tip of the connection arm 542, and is movably coupled to the connection groove 532a of the slider 532. The rib thickness-adjusting unit 500 also has a drive unit 550 used for rectilinearly moving each of the drive shafts 530.

Each of the communication hole forming members 540 has the connection arm 542 at one end thereof, with a communication hole forming part 544 provided at the other end of the forming member 540. The forming part 544 has a communication hole-forming surface 543.

A cylinder actuator 551, mounted to the outer surface of the manifold's housing 217, is used as the drive unit 550. The drive shaft 530 may be directly connected to the actuator 551. However, it is preferred to indirectly connect the drive shaft 530 to the actuator 551, with a length adjusting means 560 installed between the shaft 530 and the actuator 551.

In the case of using the length adjusting means 560, the actuator 551 is mounted to a bracket 561 provided on the outer surface of the housing 217. The piston rod 552 of the actuator 551 extends into the bracket 561, and is connected to a connector 562 inside the bracket 561. A bolt part 530a, formed at the end of the drive shaft 530, passes through the sidewall of the housing 217 to be projected into the bracket 561, and is locked to the bracket 561 using a spacer 564 and two nuts 563 and 565 such that it is possible to adjust the effective length of the shaft 530.

In FIGS. 28 and 29, the reference numeral 219 denotes a heater installed at a heater mount 218c of the core 218.

During a plastic forming process, a melted plastic material is fed to the plastic feeding part 211a of the unit 200, and is extruded through the molding part 211b defined by the housing 217 and the cores 218 of the manifold 216, thus becoming a plastic structural body 101. The body 101 is discharged from the end of the housing 217. During such a process of forming the body 101, the cylinder actuators 551 of the drive unit 550 are operated to move the drive shafts 530 in a direction as shown by the arrows of FIGS. 28, 29 and 31a. The sliders 532 of the drive shafts 530 are moved along with the shafts 530. Therefore, as shown in FIG. 31b, the communication hole forming members 540 connected to the sliders 532 through the connection arms 542 rotate to be opened.

When the communication hole forming members 540 are opened as described above, the forming surfaces 543 of the forming members 540 come into contact with each other to block the flow of melted plastic material, thus forming desired communication holes 103a at the ribs 103 of the body 101.

In such a case, it is possible to adjust the size of the holes 103a by controlling the size of the communication hole forming members 544 and/or the time interval between the closing and opening actions of the members 544.

Figure 33:
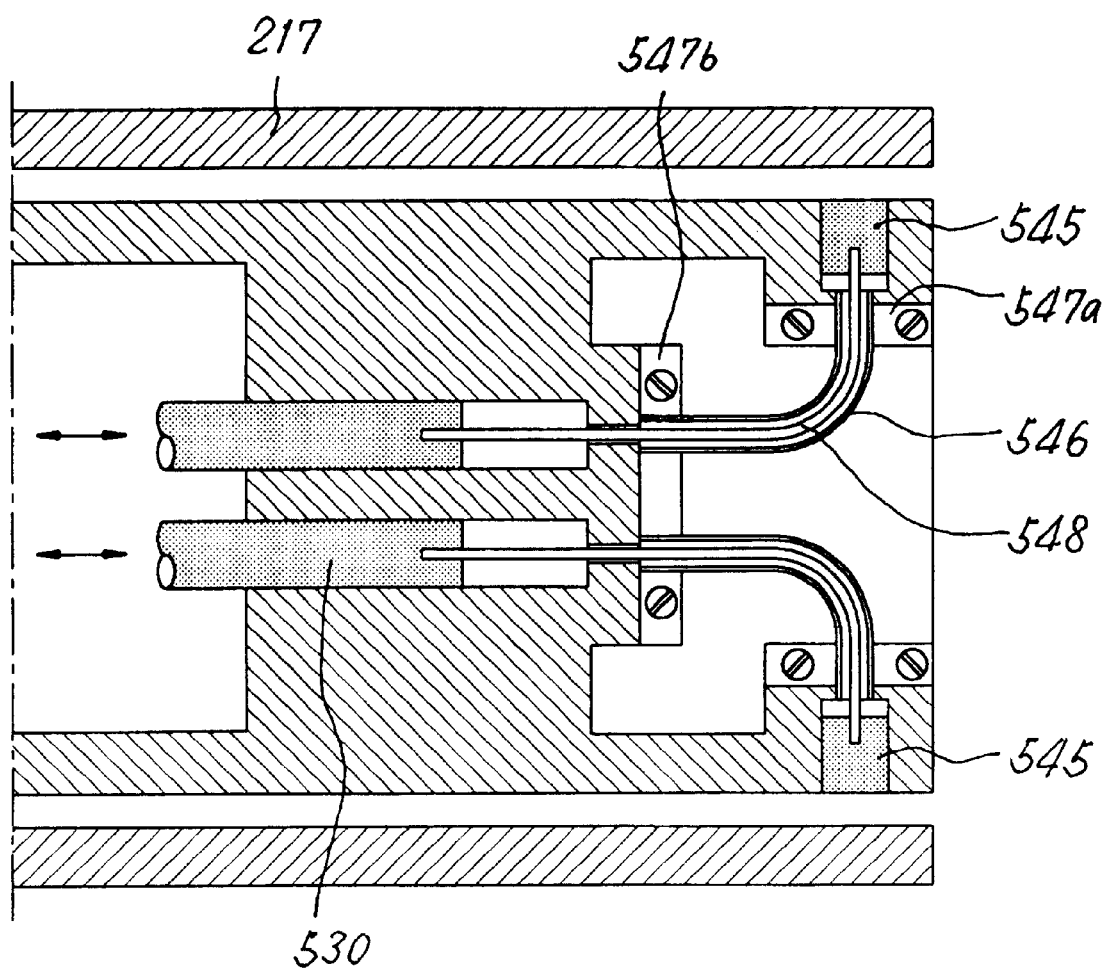

FIG. 33 is a sectional view, showing the construction of a rib thickness-adjusting unit in accordance with a further embodiment of this invention. As shown in the drawing, the rib thickness adjusting unit of this embodiment comprises two communication hole forming members 545, which are installed at opposite sides of the outlet end of each core 218 such that the members 545 are extendable and retractable relative to the sidewall of the core 218 as desired. Two drive shafts 530 provided at the middle portion of each core 218, with a guide tube 546 connected to the end of each shaft 530 and an associated communication forming member 545 at its opposite ends by two fixing members 547a and 547b. A wire 548 extends through each of the guide tubes 546, and is connected to the end of each shaft 530 and an associated communication hole forming member 545 at its end.

During a plastic forming process, the cylinder actuators 551 of the drive unit 550 are operated to move the drive shafts 530 in a direction as shown by the arrows of FIG. 33. The wires 548 thus move in the guide tubes 546, and so the communication hole forming members 545 connected to the wires 548 projected from the sidewall of the core 218. When the communication hole forming members 545 of each core 218 project from the sidewall of the core 218, the communication hole forming members 545 of the cores 218 come into contact with each other to block the flow of melted plastic material, thus forming desired communication holes 103a at the ribs 103 of the plastic structural body 101.

As shown in FIGS. 35, 36a and 36b, a cutter 370 is provided at each end of each of the top and bottom molds 310 and 320 of the mold-forming unit 300. Two longitudinal slide blocks 330 are provided along both sides of each of the top and bottom molds 310 and 320 such that the blocks 330 are movable in both directions by actuators 331. A movable core 340 is provided at the middle portion of each of the two molds 310 and 320, and is movable upward and downward by an actuator 342. A cylinder actuator is preferably used as each of the actuators 331 and 342.

In the embodiment of FIG. 10, a fixed core 340 is installed at each of the top and bottom molds 310 and 320 of the mold-forming unit 300. However, in the embodiment of FIGS. 35, 36a and 36b, the movable core 340 in place of the fixed core is installed at each of the top and bottom molds 310 and 320. Of course, it should be understood that the structure of the cores 340 might be changed as desired without affecting the functioning of this invention.

A clip groove 302 is formed at each end of the top and bottom molds 310 and 320 at a position outside a cutter 370. The clip grooves 302 of the molds hold the both end portions of the plastic structural body 101 while cutting the both ends of the body 101 by the cutters 370. The bottom of each clip groove 302 has an uneven surface suitable for firmly holding the ends of the body 101.

In a detailed description of the movable cores 340 and the actuators 342, a cylinder actuator 343 is set in a guide bore 341 formed at the middle portion of each of the top and bottom molds 310 an 320. A core 344 or 345 is mounted to the end of the piston rod 343a of each actuator 343. The movable core 340 is selectively used in the case of forming the plastic product 100 according to the fourth embodiment. In addition, the core 340 may have a variety of shapes as desired.

The two movable cores 344 and 345 are preferably used in the case of forming the rectangular opening 107 of the door panel-type product 100 of FIG. 7a.

Figure 40:
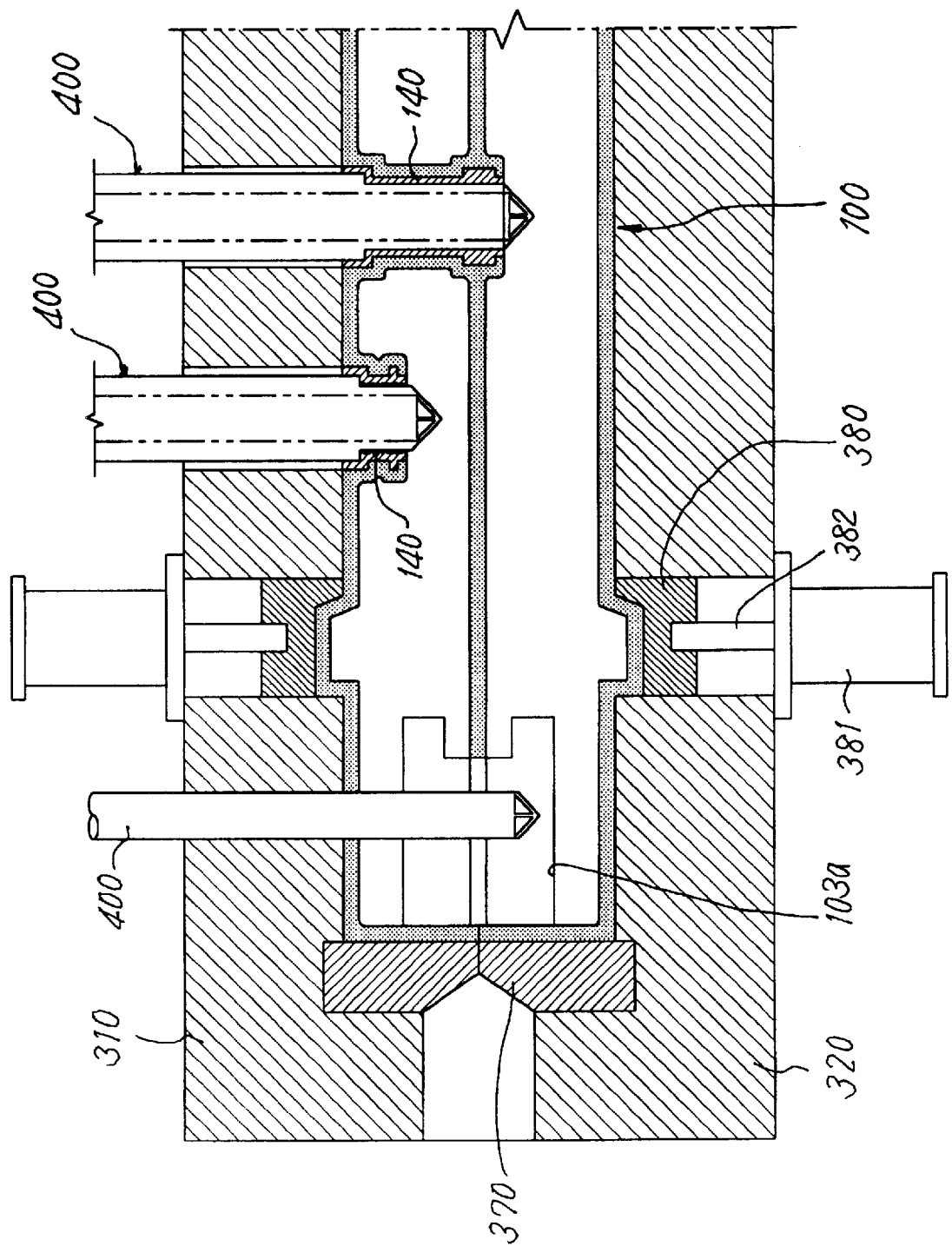

FIG. 40 is a longitudinal sectioned view, showing the construction and operation of a mold-forming unit 300 having two types of cutters 370 and 380 in accordance with still another embodiment of the present invention. In this embodiment, each end of the top and bottom molds 310 and 320 has a fixed cutter 370 and a movable cutter 380. The movable cutter 380 is positioned inside the fixed cutter 370.

In order to actuate the movable cutter 380, a cylinder actuator 381 is provided at each of the two molds 310 and 320. The movable cutter 380 is connected to the end of the piston rod 382 of the actuator 381, thus being movable by the operation of the actuator 381.

When the molds 310 and 320 are provided with the fixed and movable cutters 370 and 380 as described above, the fixed cutters 370 of the two molds 310 and 320 cut the both end portions of the structural body 101 when the two molds 310 and 320 are compressed to each other. After a desired plastic product 100 is completely formed in the cavity of the top and bottom molds 310 and 320, the movable cutters 380 are operated by the cylinder actuators 381 to cut the both end portions of the product 100. The mold-forming unit having the two types of cutters: fixed and movable cutters 370 and 380, more smoothly cut the both end portions of the product 100 in comparison with the mold-forming unit, which has only one type of cutter 370.

A plurality of perforating and injecting units 400 are arranged at the top mold 310 of the mold-forming unit 300 at positions corresponding to the cavities 104 of a plastic product 100. When two perforating and injecting units 400 are arranged at the top mold 310 such that the two units 400 are aligned with the both end portions of each cavity 104 of the product 100, it is possible to more smoothly inject and discharge air into/from the cavities 104. However, it should be understood that the position and number of the units 400 might be freely changed in accordance with mold-forming conditions and use of resulting products 100.

Of course, the mold-forming unit 300 may be added to a variety of conventional elements, such as a cooling unit, heating unit, cutting unit, ejecting unit, and slide cores, as desired.

As shown in FIGS. 10, 37 and 38, each of the perforating and injecting units 400 consists of an outer pipe 410 mounted to the top mold 310, a middle support pipe 420 fitted in the outer pipe 410, and a cutting pipe 430 set in a cylindrical gap between the outer pipe 410 and the middle support pipe 420 such that the cutting pipe 430 is movable in a vertical direction. The cutting pipe 430 has a cutting blade 431 at its lower end. A hot air injection pipe 440 is fitted in the middle support pipe 420, and is tightened to the support pipe 420 at its upper end through a screw-type engagement. A filler injection pipe 450 is fitted in the hot air injection pipe 440, and is tightened to said hot air injection pipe 440 at its upper end through a screw-type engagement. Each of the perforating and injecting units 400 also has a first lifting unit 460 used for moving the cutting pipe 430 in a vertical direction, and a rotating unit 470 used for rotating the cutting pipe 430 as desired.

As shown in FIG. 10, an air inlet pipe 441 is connected to the inlet end of the hot air injection pipe 440. A second heater 234 is connected to a first heater 232 of a hot air supply unit 230, with a solenoid valve 235 mounted to a pipe extending between the two heaters 232 and 234. The air inlet pipe 441 is connected to the second heater 234 through a pipe 234a. During operation of the plastic forming device, hot air from the first heater 232 of the hot air supply unit 230 is subsequently heated by the second heater 234 prior to being fed to the hot air injection pipe 440 through the pipe 234a. The air inlet pipe 441 is connected to an air suction pipe 240a through a solenoid valve 442. The suction pipe 240a is connected to an air suction pump 240, and so it is possible to discharge air from the interior of the product 100 by controlling the solenoid valve 442 when necessary.

In such a case, the second heater 234 is selectively used when the capacity of the first heater 232 does not meet desired heating capacity. Therefore, it is possible to remove the second heater 234 from the device when the first heater 232 has a sufficient heating capacity.

The rotating unit 470, used for rotating the cutting pipe 470, consists of a drive motor 471, a driven gear 432 and a drive gear 472. The drive motor 472 is mounted to the middle portion of the outer pipe 410. The driven gear 432 is formed on the upper portion of the cutting pipe 430, and is movable along with the cutting pipe 430. The drive gear 472 is long and axially mounted to the output shaft of the motor 471, and thus always engages with the driven gear 432 regardless of the movement of the said driven gear 432.

The first lifting unit 460 consists of a cylinder actuator 461 mounted to the middle portion of the outer pipe 410, with a holder 463 provided at the middle portion of the piston rod 462 of the actuator 461. The holder 463 movably holds the driven gear 432.

The perforating and injecting unit 400 also consists of a second lifting unit 480 and a third lifting unit 490. The second lifting unit 480 is used for moving the outer pipe 410 in a vertical direction. The third lifting unit 490 moves the middle support pipe 420 in a vertical direction, thus moving both the hot air injection pipe 440 and the filler injection pipe 450 in the same direction.

The second lifting unit 480 consists of a cylinder actuator mounted to the top mold 310, with a connection arm 411 provided at the lower portion of the outer pipe 410 and connected to the piston rod of said cylinder actuator. The third lifting unit 490 of the middle support pipe 420 consists of a cylinder actuator 491 mounted to the upper portion of the outer pipe 410, with a connection arm 421 provided at the upper portion of the middle support pipe 420 and connected to the piston rod 492 of the actuator 491.

FIGS. 39a and 39b show a perforating and injecting unit 400 in accordance with still another embodiment of the present invention. In this embodiment, a ring mount 412 is formed on the external surface of the lower portion of the outer pipe 410, and engages with a valve-locking ring 140. A conical cutting blade 433 is mounted to the lower end of the cutting pipe 430.

The above-mentioned plastic forming device of this invention is used for producing a variety of plastic products 100 as follows.

During a process of producing the products 100 of FIGS. 1, 3, 5a to 5f using the plastic forming device, the mold-forming unit 300, installed along the same line of the extrusion molding unit 200, forms the plastic structural body 101 discharged from the extrusion molding unit 200, thus closing both end portions of the sidewall of the body 101 and sealing the interior of the body 101. of course, it is possible to partially open the ends of the body 101 when necessary.

In a detailed description, a plastic structural body 101 having a plurality of cavities 104 within its sidewall 102 by a plurality of ribs 103 is initially produced by the extrusion-molding unit 200. The body 101 is, thereafter, fed from the extrusion-molding unit 200 to the mold-forming unit 300 by means of the feeding unit 600. The mold-forming unit 300 thus forms a plastic product 100 of the panel type or the boat type according to the primary embodiment as shown in FIG. 1 or 3, with the sidewall of the product 100 being completely continuous and sealing the cavities 104. In such a case, the shape of the cavity 301 of the top and bottom molds 310 and 320 determines the appearance of the resulting product 100.

During an extrusion forming process of producing the body 101 according to the primary embodiment using the extrusion-molding unit 200, hot air flows from the hot air supply unit 230 into the interior of the body 101 through an injection passage 214 and an injection pipe 215.

The hot air supply unit 230 consists of an air compressor 231 used for compressing air, the first heater 232 used for heating the compressed air from the compressor 231, and a solenoid valve 233 mounted to a pipe extending from the compressor 231 to the heater 232 so as to control the flow of compressed air. The hot air supply unit 230 thus supplies hot air from the air compressor 231 to the injection pipe 215.

When a plastic structural body 101 is extruded from the extrusion head 210 of the extrusion-molding unit 200, the front end of the body 101 discharged from the unit 200 may be manually closed, or automatically closed by using the mold-forming unit 300. In addition, hot air supplied from the hot air supply unit 230 is fed to the forming part 211b, defined by the housing 217 and the cores 218 of the manifold 216, through the injection passage 214 of the extrusion head 210, thus being introduced into the cavities 104 of the body 101. The cavities 104 of the body 101 are filled with the hot air to be expanded, and so the body 101 is fed from the extrusion-molding unit 200 to the mold-forming unit 300 while maintaining its expanded shape.

In the process of producing the body 101 according to the primary embodiment of FIG. 1 or 3, filler 110, such as urethane foam, injected from filler supply unit 220 may be injected into the cavities 104 of the body 101 through the injection passage 214 and the injection pipe 215. In such a case, the filler 110 within the cavities 104 is integrated with both the sidewall 102 and the ribs 103 of the body 101.

When a plastic filler 110 is injected into the cavities 104 of the body 101 of the flat panel type or of the corrugated panel type of FIG. 6a or 6b through the injection passage 214 and the injection pipe 215 during an extrusion molding process, the filler 110 within the cavities 104 is integrated with both the sidewall 102 and the ribs 103 of the body 101.

In the present invention, plastic foam, such as urethane foam, may be preferably used as the filler 110. The urethane filler 110 is supplied from a filler supply unit 220. When the urethane filler 110 is fed from the filler supply unit 220 to the body 101, it is desired to mix the filler 110 with air at an appropriate ratio and to maintain the temperature of the filler 110 at a point no less than room temperature and no higher than 60° C.

In the present invention, it is preferable to allow the filler 110 to be completely integrated with the body 101 by controlling the temperature, injection pressure and injection rate of the filler 110. In such a case, the extrusion and injection conditions may be somewhat changed in accordance with the use of desired products 100 and/or the processing conditions.

Figure 11:
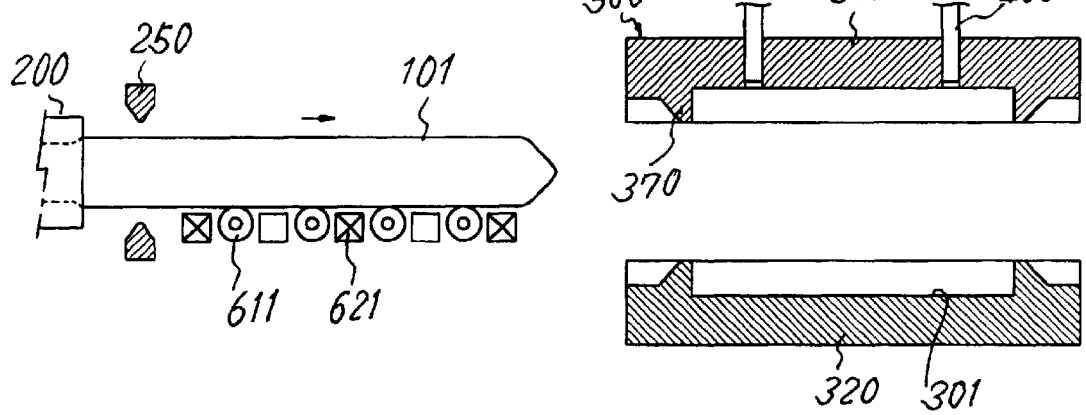
FIGS. 11a to 11g are views of a plastic forming process in accordance with the present invention.
Figure 11:
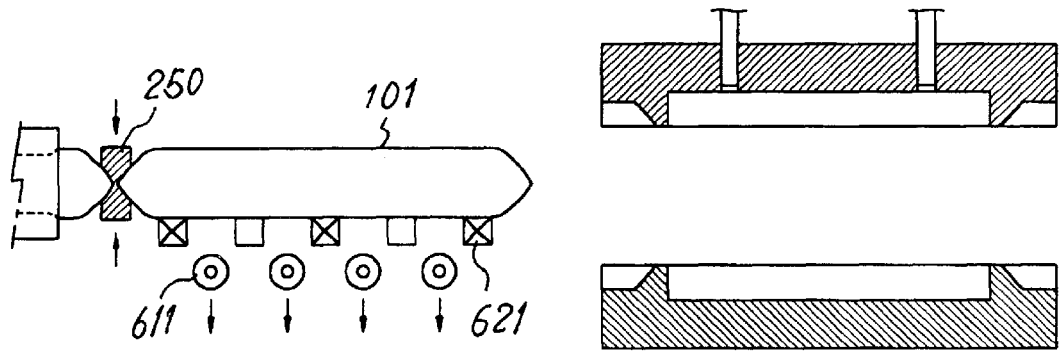
Figure 11:
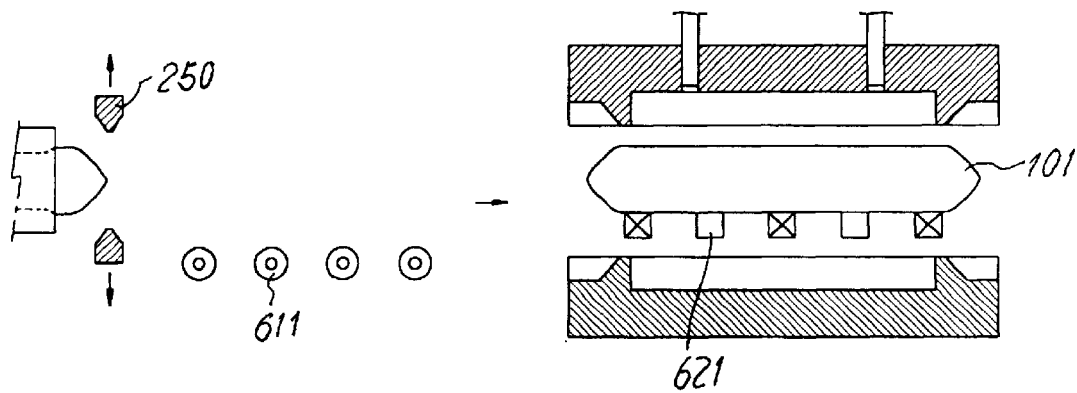
Figure 11:
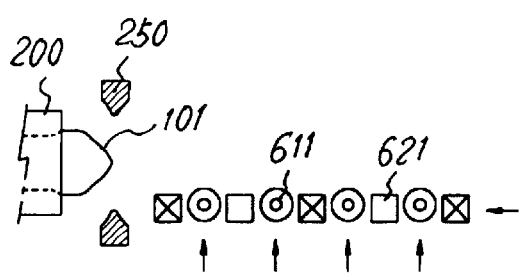
Figure 11:
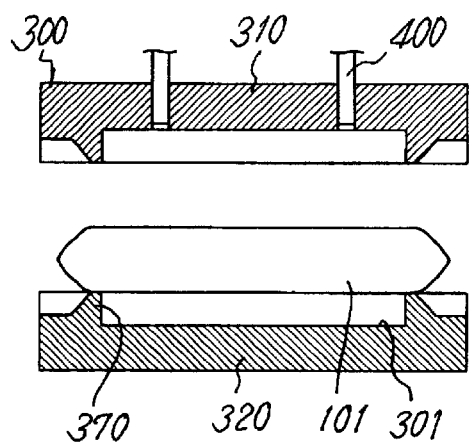
Figure 11:
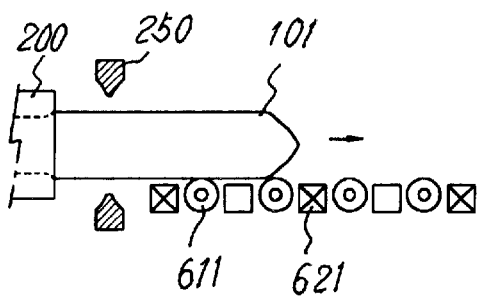
Figure 11:
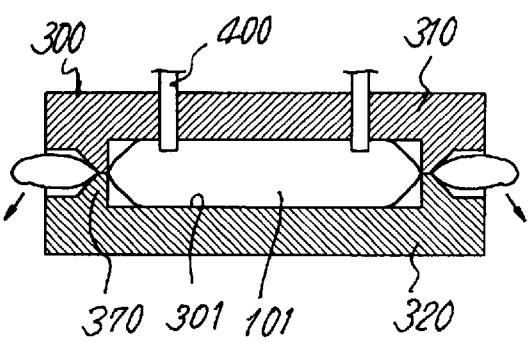
Figure 11:
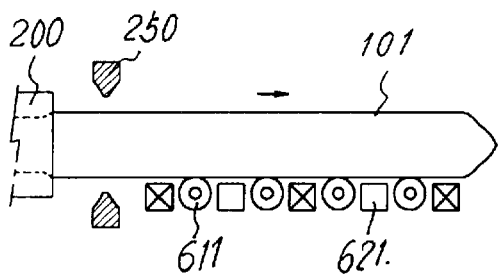
Figure 11:
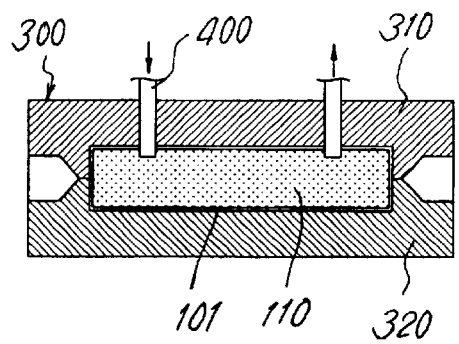
Figure 11:
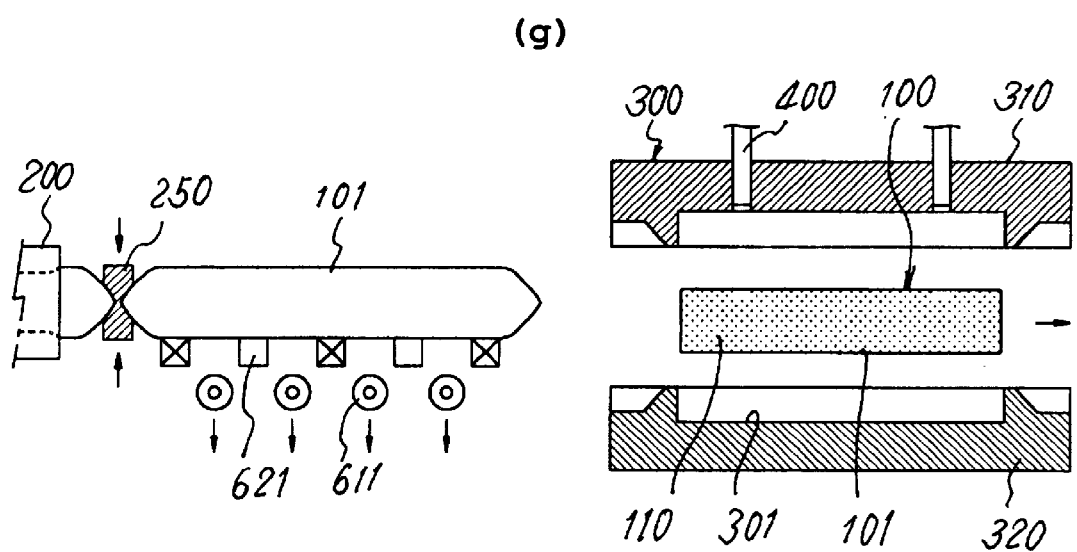

In order to produce the plastic product 100 according to the third embodiment of FIGS. 11 and 13a, a filler 110 is injected into the interior of a plastic structural body 101 through the injection passage 214 and the injection pipe 215 while forming the body 101 at the extrusion forming unit 200, thus primarily producing a product 100 according to the primary embodiment. The product 100 is, thereafter, seated in the cavity 301 of the top and bottom molds 310 and 320 of the mold-forming unit 300, and is subject to a mold-forming process. Therefore, the desired plastic product 100 according to the third embodiment is produced. In this product 100, the sidewall 102 is completely sealed, with the filler 110 completely contained in the sealed cavities 104 of the product 100.

When the product 100 is completely fed to the mold-forming unit 300, the top and bottom molds 310 and 320 of the unit 300 are closed. In such a case, the both end portions of the product 100 are cut by the cutters 370 of the molds 310 and 320, and are welded closed. Therefore, the sidewall 102 of the product 100 is completely sealed.

Thereafter, the actuator 461 of the first lifting unit 460 included in the perforating and injecting unit 400 of the top mold 310 is operated to extend its piston rod 462, and so the holder 463 moves the driven gear 432 of the cutting pipe 430 downward. The cutting pipe 430 is moved downward. Thereafter, the drive motor 471 of the rotating unit 470 is operated to rotate the drive and driven gears 472 and 432, thus rotating the cutting pipe 430. Therefore, the cutting blades 431 of the rotatable cutting pipes 430 perforate the sidewall 102 of the body 101 at several positions, thus forming a plurality of holes.

After the holes are formed on the sidewall 102 of the body 101, hot air supplied from the hot air supply unit 230 is injected into the interior of the body 101 through the air injection pipe 440, thus expanding the body 101. The body 101 is thus shaped in accordance with the shape of the cavity 301 of the top and bottom molds 310 and 320. The desired plastic product 100 having a plurality of cavities 104 formed by the sealed sidewall 102 is produced.

During such a process of seating the plastic structural body 101 in the cavity 301 of the mold-forming unit 300 and expanding the body by injecting hot air into the interior of the body 101 to form a desired shape of the body 101, it is possible to inject a melted plastic material into the cavity 301 or to use an additional element, such as movable cores, in the mold-forming unit 300 when necessary.

The product 100 according to the second embodiment of FIGS. 6a and 6b is produced by the following two steps. That is, the plastic structural body 101 having the sealed cavities 104 according to the second embodiment is produced through an extrusion process, a blow molding process, and an injection molding process that are sequentially performed. In such a case, filler 110, such as urethane foam in place of hot air flowing in the air injection pipe 440, is injected into the plastic structural body 101 through the filler injection pipe 450, thus producing a desired plastic product 100.

The process of producing the plastic product 100 according to the second embodiment of FIGS. 6a and 6b will be described in more detail herein below.

In order to produce the plastic product 100 according to the second embodiment of FIGS. 6a and 6b, hot air supplied from the hot air supply unit 230 is injected into the interior of a plastic structural body 101 through the injection passage 214 and the injection pipe 215 while forming the body 101 at the extrusion molding unit 200. The body 101 is thus expanded by the air, and fed to the cavity 301 of the top and bottom molds 310 and 320 of the mold-forming unit 300 while maintaining its expanded shape.

When the body 101 is completely fed to the cavity 301 of the mold-forming unit 300, the top and bottom molds 310 and 320 are closed. Both end portions of the body 101 are cut by the single type cutters 370, or the two type cutters 370 and 380 of the top and bottom molds 310 and 320, and are welded closed.

Thereafter, the cylinder actuators 461 of the first lifting units 460, included in the perforating and injecting units 400 provided at the inlet and outlet portions of the top mold 310, are operated to extend their piston rods 462, and so the holders 463 move the drive gears 432 of the cutting pipes 430 downward. The cutting pipes 430 are thus moved downward, and so the cutting blades 431 of the cutting pipes 430 are projected downward from the middle support pipes 420, the hot air injection pipe 440, and the filler injection pipe 450. Thereafter, the drive motors 471 of the rotating units 470 are operated to rotate the drive and driven gears 472 and 432, thus rotating the cutting pipes 430. Therefore, the cutting blades 431 of the rotating cutting pipes 430 perforate the sidewall 102 of the body 101 at several positions, thus forming a plurality of holes.

After the holes are formed on the sidewall 102 of the body 101, the cylinder actuators 461 of the first lifting units 461 included in the perforating and injecting units 400 are rotated in a reverse direction to slightly move the cutting pipes 430 upward. Thereafter, the third lifting units 490 are operated to move the middle support pipes 420, hot air injection pipes 440 and filler injection pipes 450 downward such that the lower ends of said pipes 420, 440 and 450 are positioned at the same height of the sidewall 102 of the body 101. When the height of the lower ends of the three pipes 420, 440 and 450 are not positioned at the same height, the formed surface of the body may be undesirably depressed or projected after the next blow molding process or filler injecting process. Thereafter, hot air is injected into the interior of the body 101 through the hot air injection pipes 440, thus expanding the body 101 of the product 100.

When a filler 110 from the filler supply unit 220 is continuously injected into the body 101 through, for example, the filler injection pipe 450 of the inlet-side perforating and injecting unit 400, in addition to discharging air from the body 101 through, for example, the hot air injection pipe 440 of the outlet-side perforating and injecting unit 400 during such a blow molding process, the filler 110 fills the cavities 104 inside the sidewall 102 of the body 101.

In such a case, it is possible to change the operational functions of the inlet- and outlet-side units 400 with each other as desired in accordance with desired plastic products 100. As described above, the hot air injection pipe 440 of each perforating and injecting unit 400 may be used for injecting hot air into the body 101 or expelling air from the body 101 as desired. When the pipe 440 is used for injecting hot air into the body 101, the hot air is fed to the pipe 440 through the air inlet pipe 441. When the pipe 440 is used for expelling air from the body 101, the suction valve 240 is operated after the port of the solenoid valve 443 mounted on the air inlet pipe 441 is controlled such that the suction pipe 240a is opened. Air is thus discharged from the body 101 through the suction pipe 240a by the suction force of the suction pump 240.

When it is desired to set the air exhaust valve 120 and the air suction valve 130 on the sidewall 102 of the plastic structural body 101, it is possible to perform the plastic forming process using the perforating and injecting unit 400 of FIGS. 39a and 39b in place of the unit 400 of FIGS. 37 and 38. During a perforating and injecting process using the perforating and injecting unit 400 of FIGS. 39a and 39b, a valve-locking ring 140 is set in the ring mount 412 formed at the lower portion of the outer pipe 410 of the unit 400.

When the perforating and injecting process is carried out with the valve-locking ring 140 set in the ring mount 412 of the outer pipe 410, the conical cutting blade 433 mounted to the lower end of the cutter 370 as shown in FIGS. 39a and 39b form a hole on the sidewall 102 of the body 101. Thereafter, hot air is injected into the interior of the body 101 through the hole, and so the valve-locking ring 140 is firmly set in the ring mount 108 of the body 101 through an insert mounting process.

FIG. 2 shows two valve-locking rings 140 firmly set in the sidewall 102 of the product 100, with one air exhaust valve 120 and one air suction valve 130 aligned with the two locking rings 140 before the two valves 120 and 130 are tightened to the rings 140 through a screw fitting process.

The plastic product 100 having the cavities 104 thus performs a respiration through the air suction and exhaust valves 130 and 120 in response to thermal expansion or contraction of the cavities 104. In the case of a plastic product having a double-layered cavity structure and designed to be used in place of a conventional pair glass panel, one air suction valve 130 and one air exhaust valve 120 are set in the product 100 so as to communicate with each cavity 104 and allow the cavities 104 to perform independent respiration.

That is, during a plastic forming process of producing a plastic product 100 having a double-layered cavity structure, the valve locking ring 140 for an upper cavity 104 is set on the top wall part of the sidewall 102 of the body 101, while the valve locking ring 140 for a lower cavity 104 is set in the body 101 such that the ring 140 commonly passes through the top wall part and the middle wall part of the sidewall 102 as shown in FIG. 40. The movable cutters 380 cut both end portions of the body 101, at which the cavities communicate with each other by the communication holes 104. The air suction and exhaust valves 130 and 120 are set in the valve-locking rings 140 of the body 101. The cavities 104 of the body 101 do not communicate with each other, but are isolated from each other while forming a double-layered cavity structure. The cavities 104 of the body 101 perform independent respiration.

In order to produce the plastic product 100 of the door panel type according to the third embodiment of FIGS. 7a and 7b, the plastic forming process is carried out with the slide core 340 installed on the top and bottom molds 310 and 320 of the mold-forming unit 300 for forming the rectangular opening 107 in the product 100. In the plastic forming process of producing the product 100 according to the third embodiment, the opening 107 is formed in a plastic structural body 101 by means of the movable core at the mold closing step (S4) after the extrusion molding step (S1), the cutting step (S2) and feeding step (S3). After the mold-closing step (S4), the perforating step (S5), blowing step (S6), mold opening step (S7) and the ejecting step (S8) are sequentially performed to produce a desired product 100 of the door panel type.

In order to produce the plastic product 100 of the oil tank type according to the fourth embodiment of FIGS. 4 and 5g, the extrusion molding step (S1) is carried out, with the rib thickness adjusting units 500 installed in the extrusion molding unit 200 to form the communication holes 103a at the ribs 103 of a plastic structural body 101 while extruding the body 101 at the extrusion molding unit 200. The resulting plastic product 100 thus has a plurality of cavities 104 communicating with each other through the holes 103a. After the extrusion molding step (S1), the cutting step (S2), feeding step (S3), mold closing step (S4), perforating step (S5), blowing step (S6), mold opening step (S7) and ejecting step (S8) are sequentially performed to produce a desired product 100 of the oil tank type.

Figure 8:
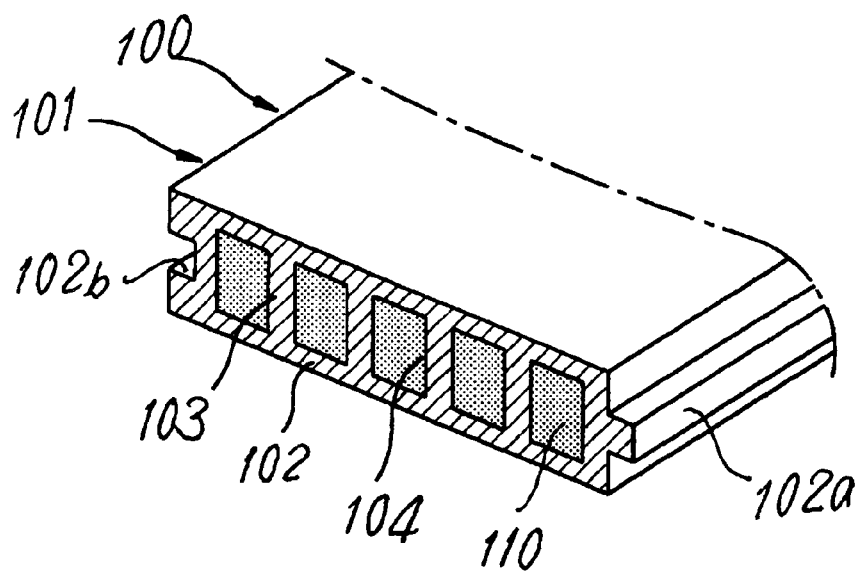
Figure 8:
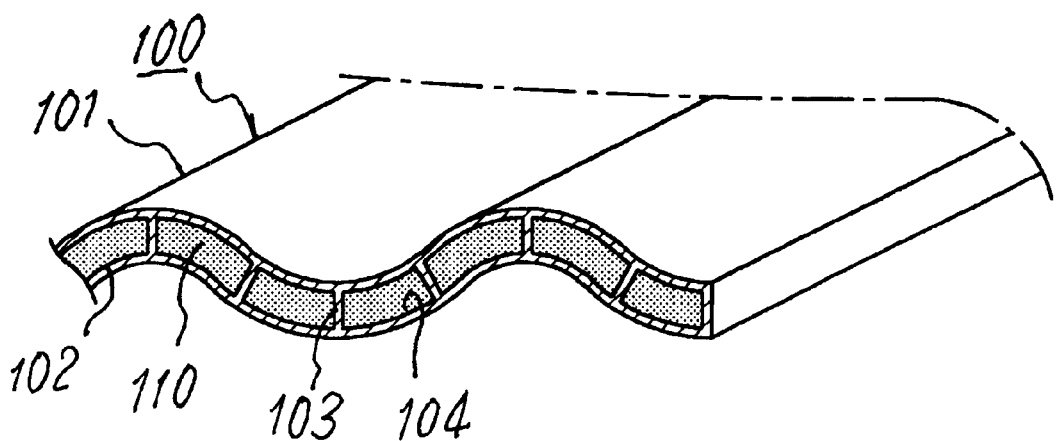

In order to produce the plastic product 100 of the flat or corrugated panel type according to the fifth embodiment of FIG. 8 or 8b, the extrusion molding step is carried out while injecting a filler 110, such as urethane foam, from the filler supply unit 220 to the cavities 104 of a plastic structural body 101 through the injection passage 214 of the extrusion head 210 and the injection pipe 215 connected to the injection passage 214. Therefore, the filler 110 is contained in the cavities 104, and is integrated with the body 101 extruded from the extrusion head 210.

In the present invention, a variety of plastic foams, such as urethane foam, are preferably used as the filler 110. The urethane foam is supplied from the filler supply unit 220. In such a case, the urethane foam is mixed with air at an appropriate ratio and maintains a temperature of no less than room temperature and no higher than 60° C. while being fed from the filler supply unit 220 to the body 101.

It is also preferable to allow the filler 110 to be completely integrated with the body 101 by controlling the temperature, injection pressure and injection rate of the filler 110. In addition, the extrusion and injection conditions may be somewhat changed in accordance with the use of the desired products 100 and/or the processing conditions.

The plastic product 100 according to the second embodiment of FIGS. 6a and 6b is produced through the process of FIG. 13 added with an injection-molding step as shown in FIG. 14. That is, in order to produce the plastic product 100 according to the second embodiment, a product according to the fifth embodiment of FIGS. 8a and 8b is primarily produced. The primarily produced product is seated in the cavity 301 of the top and bottom molds 310 and 320 of the mold-forming unit 300 103, thus being secondarily formed by the molds 310 and 320. During the mold-forming process, a separate melted plastic material is injected into the cavity 301 to form end walls at the both openings of the end portions of the body 101. Therefore, the sidewall 102 of the resulting plastic product 100 according to the second embodiment is completely sealed, with the filler 110 completely filling the sealed cavities 104 of the body 101.

As described above, the present invention provides a plastic product, and method and device for producing such plastic products. In order to produce such a plastic product, a plastic structural body having at least one cavity is primarily produced through an extrusion molding process. Hot air is injected into the interior of the structural body to expand the body. The body is moved from the extrusion-molding unit to a mold-forming unit while maintaining its expanded shape. After the body is seated in the cavity of the top and bottom molds of the mold-forming unit, a perforating and injecting unit to form a hole perforates the sidewall of the body. Hot air is injected into the cavity of the body through the hole, thus performing a blow molding process for finally forming a desired plastic product. Alternatively, filler is injected into the cavity of the body through the hole to form a desired plastic product having the filler contained in the cavity and integrated with the sidewall. The present invention thus produces a plastic product having a completely sealed sidewall defining at least one cavity therein, or a plastic product filled with a filler, such as urethane foam, in the cavity, or a plastic product having both a sidewall with opposite open ends and a filler contained in the cavity. The plastic forming process and device of the present invention thus effectively produces a variety of plastic products, such as a variety of panels, pipes, channels, columns, boats, oil tanks, door panels, vehicle door panels, bumpers, vehicle hoods, and small-sized submarines, which are not produced through conventional plastic forming processes or devices.

Such plastic products of the present invention are produced through a continued process in commercial quantities, and are preferably usable as interior or exterior materials for a variety of applications, such as automobiles, ships, airplanes, buildings, structural frames, and other industrial applications.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A method of forming a plastic product, comprising the steps of:
    extruding a plastic structural body having one or more cavities from a manifold of an extrusion head while expanding the structural body by injecting hot air into the cavities of said structural body;
    continuously feeding the structural body to a mold-forming unit to seat the structural body in the mold-forming unit, and perforating a plurality of holes on the sidewall of the structural body using a plurality of perforating and injecting units installed at the mold-forming unit;
    blowing the structural body by injecting hot air into the structural body and/or injection-molding the structural body by injecting a melted plastic material to the structural body at the mold-forming unit, thus producing a desired plastic product having one or more sealed cavities inside its completely sealed and continuous sidewall; and
    installing a rib thickness adjusting unit at the manifold of the extrusion head for forming a rib with a communication hole inside the structural body when the structural body is extruded from the manifold.

2. The method according to claim 9, wherein the structural body is subject to the blow molding process and/or the injection-molding process at the mold-forming unit, and is also subject to a filling step of injecting a filler into said cavities by a perforating and injecting unit at the mold-forming unit, thus having the completely sealed and continuous sidewall with the sealed cavities filled and integrated with said filler.

3. The method according to claim 1, wherein the structural body is seated in the mold-forming unit provided with a movable core, and is subject to the blow molding process and/or the injection-molding process at the mold-forming unit, and so the structural body is specifically shaped at least a partial area thereof by a forming part of said movable core.

4. A method of forming a plastic product, comprising the steps of:
    extruding a plastic structural body from a manifold of an extrusion-molding unit, with one or more cavities formed inside a sidewall of said structural body;
    injecting hot air into the cavities of the structural body through an injection pipe connected to the manifold, thus expanding the structural body;
    cutting both end portions of the structural body after feeding the expanded structural body from the manifold to a mold-forming unit;
    forming one or more holes on the sidewall of the structural body using one or more perforating and injecting units provided at the mold-forming unit;
    injecting hot fluid into the cavities of the structural body, thus blowing the structural body;
    injecting low temperature air into the cavities of the structural body using the perforating and injecting units, and spraying low temperature air to the interior or exterior of the mold-forming unit by an air spraying unit, thus cooling the structural body; and
    ejecting the structural body from the mold-forming unit, whereby a desired plastic product having one or more sealed cavities inside its completely sealed sidewall is produced; and
    installing a rib thickness adjusting unit at the manifold of the extrusion head for forming a rib with a communication hole inside the structural body when the structural body is extruded from the manifold.

5. A method of forming a plastic product, comprising the steps of:
    extruding a plastic structural body having one or more cavities from a manifold of an extrusion head while expanding the structural body by injecting hot air into the cavities of said structural body;
    continuously feeding the structural body to a mold-forming unit to seat the structural body in the mold-forming unit, and perforating a plurality of holes on the sidewall of the structural body using a plurality of perforating and injecting units installed at the mold-forming unit;
    blowing the structural body by injecting hot air into the structural body and/or injection-molding the structural body by injecting a melted plastic material to the structural body at the mold-forming unit, thus producing a desired plastic product having one or more sealed cavities inside its completely sealed and continuous sidewall; and
    injecting a filler into said cavities by means of a perforating and injecting unit at the mold-forming unit.

6. A method of forming a plastic product, comprising the steps of:
    extruding a plastic structural body having one or more cavities from a manifold of an extrusion head while expanding the structural body by injecting hot air into the cavities of said structural body;
    continuously feeding the structural body to a mold-forming unit to seat the structural body in the mold-forming unit, and perforating a plurality of holes on the sidewall of the structural body using a plurality of perforating and injecting units installed at the mold-forming unit;
    blowing the structural body by injecting hot air into the structural body and/or injection-molding the structural body by injecting a melted plastic material to the structural body at the mold-forming unit, thus producing a desired plastic product having one or more sealed cavities inside its completely sealed and continuous sidewall; and
    providing the mold-forming unit with a movable core having a forming part wherein the movable core shapes at least part of the structural body.

* * * * *